United States Patent
Dekker et al.

(10) Patent No.: US 8,345,717 B2
(45) Date of Patent: Jan. 1, 2013

(54) CONTINUOUS-WAVE LASER

(75) Inventors: Peter Dekker, Avalon (AU); Helen Margaret Pask, Seaforth (AU); James Austin Piper, Huntley's Cove (AU); David James Spence, Forestville (AU)

(73) Assignee: Macquarie University, North Ryde (AU)

( * ) Notice: Subject to any disclaimer, the term of this patent is extended or adjusted under 35 U.S.C. 154(b) by 644 days.

(21) Appl. No.: 12/297,051

(22) PCT Filed: Apr. 5, 2007

(86) PCT No.: PCT/AU2007/000433
§ 371 (c)(1),
(2), (4) Date: Jul. 30, 2009

(87) PCT Pub. No.: WO2007/118269
PCT Pub. Date: Oct. 25, 2007

(65) Prior Publication Data
US 2010/0054284 A1   Mar. 4, 2010

(30) Foreign Application Priority Data
Apr. 13, 2006  (AU) ................ 2006901966

(51) Int. Cl.
*H01S 3/30* (2006.01)
(52) U.S. Cl. .................. 372/3; 372/21; 372/20
(58) Field of Classification Search ........... 372/3, 21, 372/20
See application file for complete search history.

(56) References Cited

U.S. PATENT DOCUMENTS

| 5,331,656 | A | | 7/1994 | Tanaka |
| 5,673,281 | A | * | 9/1997 | Byer ............................ 372/3 |
| 5,721,748 | A | | 2/1998 | Injeyan et al. |
| 6,151,337 | A | * | 11/2000 | Carlsten et al. ............ 372/3 |
| 6,901,084 | B2 | | 5/2005 | Pask et al. |
| 2004/0028090 | A1 | * | 2/2004 | Pask et al. ................ 372/3 |

FOREIGN PATENT DOCUMENTS

WO   WO 02/09246 A1   1/2002

(Continued)

OTHER PUBLICATIONS

Dekker et al., Continuous-wave, all-solid-state, yellow laser source at 588 nm, Australian Institute of Physics 17th National Congress 2006, Paper No. WC016, pp. 1-4, Brisbane, Dec. 3-8, 2006.

(Continued)

*Primary Examiner* — Kinam Park
(74) *Attorney, Agent, or Firm* — Knobbe Martens Olson & Bear LLP

(57) ABSTRACT

A continuous wave Raman laser for producing visible laser output comprising: a resonator cavity; at least a first reflector and a second reflector said first and second reflectors being located at opposite ends of the resonator cavity; a laser gain medium located in the resonator cavity for generating a continuous wave fundamental beam which resonates within the resonator cavity when pumped by a pump beam from a pump source external to the resonator cavity; a solid Raman-active medium positioned in the resonator cavity for Raman shifting the fundamental beam to produce a continuous wave Raman beam which resonates within the resonator cavity; and a non-linear medium positioned in the resonator cavity for frequency converting the continuous wave Raman beam to a converted wavelength to produce a continuous wave converted beam.

20 Claims, 27 Drawing Sheets

FOREIGN PATENT DOCUMENTS

WO    WO 2006/032105 A1    3/2006

OTHER PUBLICATIONS

Blows et al. Thermal lensing measurements in line-focus end-pumped neodymium yttrium aluminium garnet using holographic lateral shearing interferometry. Journal of Applied Physics, 83(6):2901-2906 (1998).

Dekker et al. All-solid-state 704 mW continuous-wave yellow source based on an intracavity, frequency-doubled crystalline Raman laser. Optics Letters, 32(9):1114-1116 (2007).

Dekker et al. Continuous-wave self-Raman and intracavity doubled laser operation in Nd:GdVO$_4$ at 586.6 nm. ECLEO Conference, p. 1 (2007).

Dekker et al. Design and Operation of All-Solid-State, 320 mW Continuous-Wave Yellow Laser. ASSP Conference Proceedings, 3 pgs. (2007).

Dekker et al., Continuous-wave, intracavity doubled, self-Raman laser operation in Nd:GdVO$_4$ at 586.5 nm, Optics Express, 15(11):May 28, 2007.

Dekker et al., Continuous-wave, All-Solid-State, Yellow Laser Source at 588 nm, Australian Institute of Physics 17th National Congress 2006—Brisbane, Dec. 3-8, 2006.

Demidovich et al. Continuous-wave Raman generation in a diode-pumped Nd$^{3+}$:KGd(WO$_4$)$_2$ laser. Optics Letters, 30(13):1701-1703 (2005).

Grabtchikov et al. Multimode pumped continuous-wave solid-state Raman laser. Optics Letters, 29(21):2524-2526 (2004).

Hodgson and Weber. Optical Resonators—Fundamentals, Advanced Concepts and Applications. Springer-Verlag London Limited, pp. 6-87 (1997).

Koechner. Solid-State Laser Engineering. Springer-Verlag, pp. 8-223 (1992).

Lee et al. All-solid-state continuous-wave yellow laser based on intracavity frequency-doubled self-Raman laser action. Applied Physics B, 6 pgs. (2007).

Omatsu et al. Compact continuous-wave yellow laser based on a self-stimulating Raman Nd:YVO$_4$ laser. ASSP Conference Proceedings, 3 pgs. (2007).

Omatsu et al. Compact continuous-wave yellow laser based on a self-stimulating Raman Nd:YVO$_4$ laser. Poster presentation at ASSP Conference (2007).

Pask et al. Thermal lensing in a Barium nitrate Raman laser. ASSL Conference Proceedings, pp. 441-444 (2001).

Pask. Continuous-wave, all-solid-state, intracavity Raman laser. Optics Letters, 30(18):2454-2456 (2005).

Pask. Developments of cw and pulsed crystalline Raman lasers for the near-infrared and visible. LEOS Conference, pp. 115-116 (2005).

Pask. The design and operation of solid-state Raman lasers. Progress in Quantum Electronics 27:3-56 (2003).

Piper and Pask. Crystalline Raman Lasers. IEEE Journal of Selected Topics in Quantum Electronics (Invited Paper), 13(3):692-704 (2007).

Revermann et al. Thermal lensing measurements in an intracavity LiIO$_3$ Raman laser. ASSL Conference Proceedings, pp. 1-4 (2000).

Saleh and Teich. Fundamentals of Photonics. John Wiley and Sons, New York, pp. 92-101 (1991).

Spence et al., Modeling of Continuous Wave Intercavity Raman Lasers, IEEE JQE 13(3): May/Jun. 2007.

Extended European Search Report dated Jan. 17, 2011, for European Application No. 07718680.7.

* cited by examiner

CONTINUOUS-WAVE LASER

TECHNICAL FIELD

The present invention relates to continuous wave lasers and in particular to continuous wave Raman lasers. The invention has been developed primarily for use as a continuous wave Raman laser providing output in the visible region of the optical spectrum and will be described hereinafter with reference to this application. However, it will be appreciated that the invention is not limited to this particular field of use.

BACKGROUND OF THE INVENTION

There has been a recent surge in interest for continuous-wave, solid-state yellow laser sources, for a diverse range of applications including ophthalmology, biomedicine, guide stars and visual display. Currently, CW dye lasers and krypton ion lasers offer CW output powers of up to 1 W. Recently, frequency doubled neodymium lasers have become available, typically producing 100 mW output at 563 nm wavelength. Among the recently reported approaches to demonstrating CW laser sources are a 40 mW, 575 nm frequency doubled Yb fibre laser, a 1.52 W, 590 nm frequency doubled Raman fibre laser pumped by a diode-pumped Yb fibre laser, and 0.7 W, 593.5 nm laser source based on sum frequency mixing of the 1064 and 1342 nm lines of two Nd:YVO$_4$ lasers.

Crystalline solid-state Raman lasers have attracted considerable interest in the past few years as a means of increasing the versatility of fixed wavelength infrared gain media, in particular as a means to generating multi-watt visible wavelengths in the 500-600 nm spectral range with high conversion efficiency, up to 8% with respect to the diode pump power. These have provided resonator designs which are very straightforward to implement. This has been achieved for example by intracavity Raman-shifting of a Nd:YAG laser in KGW with intracavity frequency doubling in LBO. Alternatively, using a simple extracavity arrangement, Raman shifting in KGW of a high peak power green laser at 532 nm has been used to generate wavelengths between 555 nm and 658 nm.

To initiate the Raman process these systems have only operated in the pulsed regime (typically Q-switched with ns pulses) as the Raman threshold was considered too high for cw operation. Recently continuous wave Raman shifted operation in Ba(NO$_3$)$_2$ has been demonstrated using an external resonator with a Ar+ pump source resulting in a 1st stokes power of 164 mW at the visible wavelength of 543 nm [see A. S. Grabtchikov et al., Optics Letters, 29, 2524 (2004)]. Also a diode-pumped self-Raman converting laser based on Nd:KGW has been reported, that produced 54 mW (at 1181 nm) [see Demidovich, et al. "Continuous-wave Raman generation in a diode-pumped Nd3+:KGd(WO4)2 laser" Optics Letters, 30, 1701-1703 (2005)]. Thresholds as low as 1.15 W were recorded. Output powers of about 800 mW have recently been reported from a intracavity Raman shifted Nd:YAG/KGW laser using a simple diode end-pumped configuration. None of these continuous wave Raman lasers have incorporated intracavity frequency doubling, nor provided any indication on how such intracavity frequency doubling could be accomplished.

There are however very few solid-state continuous-wave (CW) lasers which operate at yellow wavelengths. There is therefore a need for an efficient and practical system for generating CW laser output.

OBJECT OF THE INVENTION

It is the object of the present invention to substantially overcome or at least ameliorate one or more of the above disadvantages.

SUMMARY OF THE INVENTION

In a first aspect, there is provided a continuous wave laser comprising:
a resonator cavity;
at least a first reflector and a second reflector said first and second reflectors being located at opposite ends of the resonator cavity;
a laser gain medium located in the resonator cavity for generating a continuous wave fundamental beam which resonates within the resonator cavity when pumped by a pump beam from a pump source external to the resonator cavity;
a solid Raman-active medium positioned in the resonator cavity for Raman shifting the fundamental beam to produce a continuous wave Raman beam which resonates within the resonator cavity;
a non-linear medium positioned in the resonator cavity for frequency converting the continuous wave Raman beam to a converted wavelength to produce a continuous wave converted beam;
wherein the resonator cavity is a high finesse resonator cavity at the wavelength of the continuous wave fundamental beam and the Raman beam and a low finesse resonator cavity at the wavelength of the continuous wave converted beam.

In a second aspect, there is provided a continuous wave laser comprising:
a resonator cavity;
at least a first reflector and a second reflector said first and second reflectors being located at opposite ends of the resonator cavity;
a laser gain medium located in the resonator cavity for generating a continuous wave fundamental beam which resonates within the resonator cavity when pumped by a pump beam from a pump source external to the resonator cavity;
a solid Raman-active medium positioned in the resonator cavity for Raman shifting the fundamental beam to produce a continuous wave Raman beam which resonates within the resonator cavity;
a non-linear medium positioned in the resonator cavity for frequency converting the continuous wave Raman beam to a converted wavelength to produce a continuous wave converted beam;
wherein the resonator cavity is a high Q cavity at the wavelengths of the continuous wave fundamental beam and the Raman beam and a low Q cavity resonator cavity at the wavelength of the continuous wave converted beam.

In a third aspect, there is provided a continuous wave laser comprising:
a resonator cavity;
at least a first reflector and a second reflector said first and second reflectors being located at opposite ends of the resonator cavity;
a laser gain medium located in the resonator cavity for generating a continuous wave fundamental beam which resonates within the resonator cavity when pumped by a pump beam from a pump source external to the resonator cavity;

a solid Raman-active medium positioned in the resonator cavity for Raman shifting the fundamental beam to produce a continuous wave Raman beam which resonates within the resonator cavity;

a non-linear medium positioned in the resonator cavity for frequency converting the continuous wave Raman beam to a converted wavelength to produce a continuous wave converted beam;

wherein the first and second reflectors are highly reflective at the wavelengths of both the fundamental beam and the Raman beam, and highly transmissive at the wavelength of the converted beam such that the continuous wave converted beam is output from the resonator cavity.

In the first to third aspects, the continuous wave Raman laser may be a stable continuous wave Raman laser. In the first to third aspects, the continuous wave Raman laser may be a stable continuous wave Raman laser for generating output laser radiation in the visible region of the optical spectrum. The output wavelength may be in the range of 500 to 800 nm.

In a fourth aspect, there is provided a stable continuous wave Raman laser comprising:

a resonator cavity;

at least a first reflector and a second reflector said first and second reflectors being located at opposite ends of the resonator cavity;

a laser gain medium located in the resonator cavity for generating a continuous wave fundamental beam which resonates within the resonator cavity when pumped by a pump beam from a pump source external to the resonator cavity;

a solid Raman-active medium positioned in the resonator cavity for Raman shifting the fundamental beam to produce a continuous wave Raman beam which resonates within the resonator cavity; and a non-linear medium positioned in the resonator cavity for frequency converting the continuous wave Raman beam to a converted wavelength to produce a continuous wave converted beam.

In a fifth aspect, there is provided a stable continuous wave visible Raman laser comprising:

a resonator cavity;

at least a first reflector and a second reflector said first and second reflectors being located at opposite ends of the resonator cavity;

an output coupler;

a laser gain medium located in the resonator cavity for generating a continuous wave fundamental beam which resonates within the resonator cavity when pumped by a pump beam from a pump source external to the resonator cavity;

a solid Raman-active medium positioned in the resonator cavity for Raman shifting the fundamental beam to produce a continuous wave Raman beam which resonates within the resonator cavity; and a non-linear medium positioned in the resonator cavity for frequency converting the continuous wave Raman beam to a converted wavelength to produce a continuous wave converted beam in the visible region of the optical spectrum;

wherein the visible continuous wave converted beam is output from the resonator cavity by the output coupler.

In an arrangement of any one of the first to fifth aspects, the laser may also comprise a cooling element for cooling the laser gain medium. In an arrangement of any one of the first to fifth aspects, the laser may also comprise a cooling element for cooling the Raman-active medium. In an arrangement of any one of the first to fifth aspects, the laser may also comprise a first cooling element for cooling the laser gain medium and a second cooling element for cooling the Raman-active medium.

In a sixth aspect, there is provided a continuous wave laser comprising:

a resonator cavity;

at least a first reflector and a second reflector said first and second reflectors being located at opposite ends of the resonator cavity;

a laser gain medium located in the resonator cavity for generating a continuous wave fundamental beam which resonates within the resonator cavity when pumped by a pump beam from a pump source external to the resonator cavity;

a first cooling element for cooling the laser gain medium;

a solid Raman-active medium positioned in the resonator cavity for Raman shifting the fundamental beam to produce a continuous wave Raman beam which resonates within the resonator cavity;

a second cooling element for cooling the Raman-active medium; and a non-linear medium positioned in the resonator cavity for frequency converting the continuous wave Raman beam to a converted wavelength to produce a continuous wave converted beam.

In an alternative aspects, there is provided a continuous wave laser comprising:

a resonator cavity;

at least a first reflector and a second reflector said first and second reflectors being located at opposite ends of the resonator cavity;

a laser gain medium located in the resonator cavity for generating a continuous wave fundamental beam which resonates within the resonator cavity when pumped by a pump beam from a pump source external to the resonator cavity;

a solid Raman-active medium positioned in the resonator cavity for Raman shifting the fundamental beam to produce a continuous wave Raman beam which resonates within the resonator cavity;

a non-linear medium positioned in the resonator cavity for frequency converting the continuous wave Raman beam to a converted wavelength to produce a continuous wave converted beam;

wherein the resonator cavity is a small mode volume resonator cavity at the wavelength of the continuous wave fundamental beam and the Raman beam; or the resonator cavity is a small mode volume and high Q resonator cavity at the wavelength of the continuous wave fundamental beam and the Raman beam; or the resonator cavity is a small mode volume resonator cavity and high finesse cavity at the wavelength of the continuous wave fundamental beam and the Raman beam; or the resonator cavity is a small mode volume, high Q and high finesse resonator cavity at the wavelength of the continuous wave fundamental beam and the Raman beam.

The mode volume, $V_{mode}$, may be related to the mode area (ie. with reference to the beam size, spot size, beam radius and or diameter, $1/e^2$ value) by the relation $V_{mode}=A_{mode}/L_{mode}$ where $A_{mode}$ is the cross-sectional mode area and $L_{mode}$ is the length of the mode. The beam size may be in the range of 25 µm mm to 500 µm, or 50 µm to 300 µm, 50 µm to 250 µm, 50 µm to 200 µm, 50 µm to 150 µm, 50 µm to 100 µm.

The resonator cavity may be a low Q cavity resonator cavity at the wavelength of the continuous wave converted beam.

The resonator cavity may be a low finesse cavity resonator cavity at the wavelength of the continuous wave converted beam.

The resonator cavity may be a low Q and a low finesse cavity resonator cavity at the wavelength of the continuous wave converted beam.

In further alternative aspects still, there is provided a continuous wave laser, comprising
  a resonator cavity;
  at least a first reflector and a second reflector, said first and second reflectors being located at opposite ends of the resonator cavity;
  a laser gain medium located in the resonator cavity for generating a continuous wave fundamental beam which resonates within the resonator cavity when pumped by a pump beam from a pump source external to the resonator cavity;
  a solid Raman-active medium positioned in the resonator cavity for Raman shifting the fundamental beam to produce a continuous wave Raman beam which resonates within the resonator cavity;
  a first non-linear medium positioned in the resonator cavity for frequency converting the continuous wave Raman beam to a converted wavelength to produce a first continuous wave converted beam;
  a second non-linear medium positioned in the resonator cavity for frequency converting the continuous wave Raman beam to a converted wavelength to produce a second continuous wave converted beam.

In an arrangement of any one of the first to sixth aspects or alternative aspects, the resonator cavity may have a high finesse at the optical wavelengths of both the fundamental beam and the Raman beam simultaneously and simultaneously a low finesse at the optical wavelength of the converted beam. The finesse of the resonator cavity at both the fundamental beam and the Raman beams simultaneously may be greater than 100. In other arrangements, the finesse of the resonator cavity at both the fundamental beam and the Raman beams simultaneously may be greater than 500, or greater than 1000, greater than 2000, greater than 3000, greater than 4000, greater than 5000, greater than 6000, greater than 7000, greater than 8000, greater than 9000, greater than 10000, greater than 15000, greater than 20000, greater than 25000, greater than 30000, greater than 35000, greater than 40000, greater than 45000. The finesse of the resonator cavity at both the fundamental beam and the Raman beams simultaneously may be in the range 100 to 50000, 100 to 45000, 100 to 40000, 100 to 35000, 100 to 30000, 100 to 25000, 100 to 20000, 100 to 15000, 100 to 10000, 100 to 9000, 100 to 8000, 100 to 7000, 100 to 6000, 100 to 5000, 100 to 4000, 100 to 3000, 100 to 2000, 100 to 1000, or 100 to 500, and may be approximately 100, 150, 200, 250, 300, 350, 400, 450, 500, 550, 600, 650, 700, 750, 800, 850, 900, 950, 1000, 1100, 1200, 1300, 1400, 1500, 1600, 1700, 1800, 1900, 2000, 2250, 2500, 2750, 3000, 3250, 3500, 3750, 4000, 4250, 4500, 4750, 5000, 6000, 7000, 80000, 9000, 10000, 11000, 12000, 13000, 14000, 15000, 16000, 17000, 18000, 19000, 20000, 25000, 30000, 35000, 40000, 45000, 50000.

In an arrangement of any one of the first to sixth aspects or alternative aspects, the resonator cavity may have a finesse at the wavelength of the converted beam in the range of approximately 0 to 5. In a further arrangement, the resonator cavity finesse at the wavelength of the converted beam may be in the range of approximately 0 to 4.5, 0 to 4, 0 to 3.5, 0 to 3, 0 to 2.5, 0 to 2.4, 0 to 2.3, 0 to 2.2, 0 to 2.1, 0 to 2.0, 0 to 1.9, 0 to 1.8, 0 to 1.7, 0 to 1.6, 0 to 1.5, 0 to 1.4, 0 to 1.3, 0 to 1.2, 0 to 1.1, 0 to 1.0, 0 to 0.9, 0 to 0.8, 0 to 0.7, 0 to 0.6, 0 to 0.5, 0 to 0.4, 0 to 0.3, 0 to 0.2, 0 to 0.1, 0.5 to 5, 0 to 4.5, 0 to 4, 0.5 to 3, 0.5 to 3.5, 0.5 to 2, 0.5 to 1.5, 0.5 to 1.0, 1 to 4, 0 to 3, 1 to 2.5, 1 to 2, and the resonator finesse at the wavelength of the converted beam may be approximately 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.5, 4.0, 4.5 or 5.

In an arrangement of any one of the first to sixth aspects or alternative aspects, the resonator cavity may have a roundtrip resonator loss at the wavelength of both the fundamental beam and the Raman beams simultaneously in the range of 0.001% to 5%. In further arrangements, the roundtrip resonator loss at both the fundamental beam and the Raman beams simultaneously may be in the range of 0.001% to 4.5%, 0.001% to 4%, 0.001% to 3.5%, 0.001% to 3%, 0.001% to 2.5%, 0.001% to 2%, 0.001% to 1.9%, 0.001% to 1.8%, 0.001% to 1.7%, 0.001% to 1.6%, 0.001% to 1.5%, 0.001% to 1.4%, 0.001% to 1.3%, 0.001% to 1.2%, 0.001% to 1.1%, 0.001% to 1.0%, 0.001% to 0.9%, 0.001% to 0.8%, 0.001% to 0.7%, 0.001% to 0.6%, 0.001% to 0.5%, 0.001% to 0.3%, 0.001% to 0.2%, 0.001% to 0.1%, 0.01% to 4.5%, 0.01% to 4%, 0.01% to 3.5%, 0.01% to 3%, 0.01% to 2.5%, 0.01% to 2%, 0.01% to 1.9%, 0.01% to 1.8%, 0.01% to 1.7%, 0.01% to 1.6%, 0.01% to 1.5%, 0.01% to 1.4%, 0.01% to 1.3%, 0.01% to 1.2%, 0.01% to 1.1%, 0.01% to 1.0%, 0.01% to 0.9%, 0.01% to 0.8%, 0.01% to 0.7%, 0.01% to 0.6%, 0.01% to 0.5%, 0.01% to 0.3%, 0.01% to 0.2%, 0.01% to 0.1%, 0.1% to 4.5%, 0.1% to 4%, 0.1% to 3.5%, 0.1% to 3%, 0.1% to 2.5%, 0.1% to 2%, 0.1% to 1.9%, 0.1% to 1.8%, 0.1% to 1.7%, 0.1% to 1.6%, 0.1% to 1.5%, 0.1% to 1.4%, 0.1% to 1.3%, 0.1% to 1.2%, 0.1% to 1.1%, 0.1% to 1.0%, 0.1% to 0.9%, 0.1% to 0.8%, 0.1% to 0.7%, 0.1% to 0.6%, 0.1% to 0.5%, 0.1% to 0.3%, 0.1% to 0.2%, or 0.1% to 0.15%. In an arrangement of any one of the first to sixth aspects or alternative aspects, the roundtrip resonator loss at the wavelength of the fundamental beam may be 0.001%, 0.005%, 0.01%, 0.02%, 0.03%, 0.04%, 0.05%, 0.06%, 0.07%, 0.08%, 0.09%, 0.1%, 0.2%, 0.3%, 0.4%, 0.5%, 0.65%, 0.7%, 0.8%, 0.9%, 1.0%, 1.1%, 1.2%, 1.3%, 1.4%, 1.5%, 1.6%, 1.7%, 1.8%, 1.9%, 2.0%, 2.5%, 3.0%, 3.5%, 4.0%, 4.5%, or 5%. In an arrangement of any one of the first to sixth aspects or alternative aspects, the roundtrip resonator loss at the wavelength of the Raman beam may be 0.001%, 0.005%, 0.01%, 0.02%, 0.03%, 0.04%, 0.05%, 0.06%, 0.07%, 0.08%, 0.09%, 0.1%, 0.2%, 0.3%, 0.4%, 0.5%, 0.65%, 0.7%, 0.8%, 0.9%, 1.0%, 1.1%, 1.2%, 1.3%, 1.4%, 1.5%, 1.6%, 1.7%, 1.8%, 1.9%, 2.0%, 2.5%, 3.0%, 3.5%, 4.0%, 4.5%, or 5%. In an arrangement of any one of the first to sixth aspects or alternative aspects, the roundtrip resonator loss at the wavelength of the fundamental beam may be 0.001%, 0.005%, 0.01%, 0.02%, 0.03%, 0.04%, 0.05%, 0.06%, 0.07%, 0.08%, 0.09%, 0.1%, 0.2%, 0.3%, 0.4%, 0.5%, 0.65%, 0.7%, 0.8%, 0.9%, 1.0%, 1.1%, 1.2%, 1.3%, 1.4%, 1.5%, 1.6%, 1.7%, 1.8%, 1.9%, 2.0%, 2.5%, 3.0%, 3.5%, 4.0%, 4.5%, or 5% and the roundtrip resonator loss at the wavelength of the Raman beam may be 0%, 0.1%, 0.2%, 0.3%, 0.4%, 0.5%, 0.65%, 0.7%, 0.8%, 0.9%, 1.0%, 1.1%, 1.2%, 1.3%, 1.4%, 1.5%, 1.6%, 1.7%, 1.8%, 1.9%, 2.0%, 2.5%, 3.0%, 3.5%, 4.0%, 4.5%, or 5%.

In an arrangement of any one of the first to sixth aspects or alternative aspects, the first and second reflectors may be configured for high reflectivity at the optical wavelengths of both the fundamental beam and the Raman beam simultaneously and at least one of the first and second reflectors is configured for high transmission at the optical wavelength of the converted beam.

In an arrangement of any one of the first to sixth aspects or alternative aspects, the reflectivity of both the first and second reflectors at the wavelengths of both the fundamental beam and the Raman beam simultaneously may be greater than 97%. In a further arrangement, the reflectivity of both the first and second reflectors at the wavelengths of both the fundamental beam and the Raman beam simultaneously may be greater than 98%. In a further arrangement, the reflectivity of both the first and second reflectors at the wavelengths of both the fundamental beam and the Raman beam simultaneously may be greater than 99%. In a further arrangement, the reflectivity of both the first and second reflectors at the wavelengths of both the fundamental beam and the Raman beam simultaneously may be greater than 99.5%. In a further arrangement still, the reflectivity of both the first and second reflectors at the wavelengths of both the fundamental beam and the Raman beam simultaneously may be greater than 99.9%. In an arrangement of any one of the first to sixth aspects or alternative aspects, the reflectivity of both the first and second reflectors at the wavelengths of both the fundamental beam and the Raman beam simultaneously may be in the range of 97% to 100% or the reflectivity may be in the range of 98% to 100%, 98.5% to 100%, 99% to 100%, 99.5% to 100%, 99.6% to 100%, 99.7% to 100%, 99.8% to 100%, 99.9% to 100%, 99.95% to 100%, or 99.99% to 100%. The reflectivity of the first and the second reflectors at the wavelength of the fundamental beam may be approximately 97%, 98%, 98.5%, 99%, 99.1%, 99.2%, 99.3%, 99.4%, 99.5%, 99.6%, 99.7%, 99.8%, 99.9%, 99.91%, 99.92%, 99.93%, 99.94%, 99.95%, 99.96%, 99.97%, 99.98%, 99.99%, 99.995 or 100%. The reflectivity of the first and the second reflectors at the wavelength of the Raman beam may be approximately 97%, 98%, 98.5%, 99%, 99.1%, 99.2%, 99.3%, 99.4%, 99.5%, 99.6%, 99.7%, 99.8%, 99.9%, 99.91%, 99.92%, 99.93%, 99.94%, 99.95%, 99.96%, 99.97%, 99.98%, 99.99%, 99.995 or 100%. The reflectivity of the first and the second reflectors at the wavelength of the fundamental beam may be approximately 97%, 98%, 98.5%, 99%, 99.1%, 99.2%, 99.3%, 99.4%, 99.5%, 99.6%, 99.7%, 99.8%, 99.9%, 99.91%, 99.92%, 99.93%, 99.94%, 99.95%, 99.96%, 99.97%, 99.98%, 99.99%, 99.995 or 100% and the reflectivity of the first and the second reflectors at the wavelength of the Raman beam may simultaneously be approximately 97%, 98%, 98.5%, 99%, 99.1%, 99.2%, 99.3%, 99.4%, 99.5%, 99.6%, 99.7%, 99.8%, 99.9%, 99.91%, 99.92%, 99.93%, 99.94%, 99.95%, 99.96%, 99.97%, 99.98%, 99.99%, 99.995 or 100%.

In an arrangement of any one of the first to sixth aspects or alternative aspects, the transmission of at least one of the first or the second reflectors may be in the range of approximately 40% to 100%, or 50% to 100%, 60% to 100%, 65% to 100%, 70% to 100%, 75% to 100%, 80% to 100%, 85% to 100%, 90% to 100%, 95% to 100%, 50% to 95%, 60% to 90%, 65% to 85%, 70% to 95%, 80% to 95%, or 85% to 90%, and the transmission of at least one of the first or the second reflectors may be approximately 40%, 45%, 50%, 55%, 60%, 65%, 70%, 75%, 80%, 85%, 90%, 95%, 97%, 98%, 99% or 100%.

In an arrangement of any one of the first to sixth aspects or alternative aspects, in operation, in operation, the intracavity intensity of the continuous wave fundamental beam in the Raman crystal may be greater than the threshold intensity for continuous wave Raman operation and less than the damage threshold of the Raman-active medium.

In an arrangement of any one of the first to sixth aspects or alternative aspects, the length of the resonator cavity may be in the range of 10 mm to 2000 mm. In other arrangements the length of the resonator cavity may be in the range of 10 to 1500, 10 to 1200, 10 to 1100, 10 to 1000, 10 to 900, 10 to 800, 10 to 700, 10 to 600, 10 to 500, 10 to 400, 10 to 300, 10 to 200, 10 to 100, 10 to 90, 10 to 80, 10 to 70, 10 to 60, 10 to 50, 10 to 40, 10 to 30, 10 to 20, 50 to 1500, 50 to 1200, 50 to 1000, 50 to 900, 50 to 800, 50 to 700, 50 to 600, 50 to 500, 50 to 400, 50 to 300, 50 to 200, 50 to 100, 100 to 2000, 100 to 1500, 100 to 1000, 100 to 800, 100 to 600, 100 to 500, 100 to 400, 100 to 300, 100 to 200, 500 to 2000, 500 to 2000, 500 to 1500, 500 to 1250, 500 to 1200, 500 to 1100, 500 to 1000, 500 to 900, 500 to 800, 500 to 700, 500 to 600, 750 to 2000, 750 to 1500, 750 to 1250, 750 to 1200, 750 to 1100, 750 to 1000, 750 to 900, 750 to 800, 1000 to 2000, 1000 to 1750, 1000 to 1500, or 1000 to 1250. A feature of long resonator cavities (for example greater than 300, 400, or 500 mm) is that the laser will operate in multi-longitudinal mode which may enhance the stability of the laser.

In an arrangement of any one of the first to sixth aspects or alternative aspects, in operation, the intracavity intensity of the continuous wave fundamental beam in the Raman crystal is greater than the threshold intensity for continuous wave Raman operation and the intracavity intensity of the continuous wave Raman beam in the nonlinear medium may be greater than 80 kW/cm$^2$. In other arrangements, the intracavity intensity of the continuous wave fundamental beam in the Raman crystal is greater than the threshold intensity for continuous wave Raman operation and the intracavity intensity of the continuous wave Raman beam in the nonlinear medium may be greater than 90 kW/cm$^2$, or greater than 100, 110, 120, 130, 140, 150, 160, 170, 180, 190, 200, 210, 220, 230, 240, 250, 260, 270, 280, 290, 300, 350, 400, 450, or 500 kW/cm$^2$. The intracavity intensity of the Raman beam in the nonlinear medium may be less than the damage threshold of the nonlinear medium.

In an arrangement of any one of the first to sixth aspects or alternative aspects, in operation, the intracavity intensity of the continuous wave fundamental beam in the Raman crystal may be greater than 80 kW/cm$^2$ and the intracavity intensity of the continuous wave Raman beam in the nonlinear medium may be greater than 80 kW/cm$^2$. in other arrangements, the intracavity intensity of the continuous wave fundamental beam in the Raman crystal may be greater than 90 kW/cm$^2$, or greater than 100, 110, 120, 130, 140, 150, 160, 170, 180, 190, 200, 210, 220, 230, 240, 250, 260, 270, 280, 290, 300, 350, 400, 450, or 500 kW/cm$^2$. The intracavity intensity of the continuous wave Raman beam in the nonlinear medium may be greater than 90 kW/cm$^2$, or greater than 100, 110, 120, 130, 140, 150, 160, 170, 180, 190, 200, 210, 220, 230, 240, 250, 260, 270, 280, 290, 300, 350, 400, 450, or 500 kW/cm$^2$. The intracavity intensity of the fundamental beam in the Raman medium may be less than the damage threshold of the Raman medium and the intracavity intensity of the Raman beam in the nonlinear medium may be less than the damage threshold of the nonlinear medium. In particular, the Q, or finesse, or mode volume of the fundamental beam and the Raman beam or any combination thereof in operation in the cavity may be such that the intracavity intensity of the continuous wave fundamental beam in the Raman crystal may be greater than 80 kW/cm$^2$ and less than the damage threshold of the Raman crystal and the intracavity intensity of the continuous wave Raman beam in the nonlinear medium may be greater than 80 kW/cm$^2$ and less than the damage threshold of the nonlinear medium.

In an arrangement of any one of the first to sixth aspects or alternative aspects, the laser may also comprise a cooling element for cooling the nonlinear medium. In a further arrangement, the laser may comprise a first cooling element to cool at least one of the laser gain medium, the Raman-active medium or the nonlinear medium, and a second cooling element to cool at least a second one of the laser gain medium, the Raman-active medium or the nonlinear medium. In a further arrangement, the laser may comprise a first cooling element to cool the laser gain medium, a second cooling element to cool the Raman-active medium, and a third cooling element to cool the nonlinear medium.

In an arrangement of any one of the first to sixth aspects or alternative aspects, the continuous wave laser may be a solid state continuous wave laser. In an arrangement of any one of the first to sixth aspects or alternative aspects, the laser gain medium may be a is a solid state laser gain medium. In an arrangement of any one of the first to sixth aspects or alternative aspects, the Raman-active medium may be a solid state Raman-active medium. In an arrangement of any one of the first to sixth aspects or alternative aspects, the nonlinear medium may be a solid state nonlinear medium. In an arrangement of any one of the first to sixth aspects or alternative aspects, the laser gain medium, the Raman-active medium and the nonlinear medium may all solid state media.

In an arrangement of any one of the first to sixth aspects or alternative aspects, the reflectivity of both the first and second reflectors at the wavelength of both the fundamental and Raman beams may be in the range of 99.5% to 99.99%. The first and second reflectors may be Bragg reflectors, mirrors, or a combination thereof or other suitable relectors.

In an arrangement of any one of the first to sixth aspects or alternative aspects, the lase may further comprise an output coupler configured for output of the converted beam from the resonator cavity. The output coupler may be a reflector configured for high transmission of the wavelength of the frequency converted beam. In an arrangement, either the first or the second reflectors may be the output coupler.

In an arrangement of any one of the first to sixth aspects or alternative aspects, the laser may further comprise a cooling means for cooling the Raman-active material. The cooling means may be either a passive or an active cooling means. The cooling means may be either an air cooling means or a liquid cooling means. The liquid cooling means may be a circulating liquid cooling means.

In an arrangement of any one of the first to sixth aspects or alternative aspects, the laser gain medium, the Raman-active medium and the nonlinear medium are each plane-parallel solid state materials. The resonator cavity may have a resonator axis along which the fundamental and Raman beams propagate within the cavity in a respective cavity mode along the resonator axis. The plane-parallel surfaces of the plane-parallel solid state Raman material may lie on the resonator axis. The plane-parallel surfaces may be aligned to be substantially perpendicular to the resonator axis such that any optical reflections of the fundamental and the Raman beams from the plane-parallel surfaces of the Raman crystal are reflected into the respective cavity mode and continue to propagate within the resonator cavity. The angular offset of the normal to each of the plane-parallel surfaces of the Raman crystal with the resonator axis is may be less than 1 degree. The angular offset may be in the range of about 0 to 1 degree. The angular offset may be about 0.5 degree. The angular offset may be about 0.1 degree.

In an arrangement of any one of the first to sixth aspects or alternative aspects, the round trip losses of the resonator cavity at both the fundamental and the Raman wavelengths may be less than 2%. The round trip losses of the resonator cavity at both the fundamental and the Raman wavelengths may be in the range of 0% to 2%. The round trip losses of the resonator cavity at both the fundamental and the Raman wavelengths may be in the range of 0% to 1%.

In an arrangement of any one of the first to sixth aspects or alternative aspects, the laser material, the Raman material and the nonlinear material may be solid state materials or they each may be crystalline solid state media. The Raman material may be a high purity solid state Raman material. The amount of impurities in the Raman medium may be less than 1 ppm, less than 0.1 ppm or less than 0.01 ppm. The amount of impurities may be in the range of 0.001 ppm to 1 ppm, 0.01 ppm to 1 ppm, 0.1 ppm to 1 ppm or 0.5 ppm to 1 ppm.

In an arrangement of any one of the first to sixth aspects or alternative aspects, the laser gain medium, the Raman medium and the nonlinear medium may be high purity solid state medias.

In an arrangement of any one of the first to sixth aspects or alternative aspects, the fundamental beam may be linearly polarised. The Raman-active medium may be a solid-state Raman-active medium and the polarisation direction of the fundamental beam is aligned with a Raman-gain axis of the Raman-active medium. The Raman-gain axis may have a Raman gain coefficient which is a relative maximum for the solid-state Raman-active medium when compared with other axes within the Raman-active medium such that the linearly polarised fundamental beam is Raman shifted to a linearly polarised Raman beam.

In an arrangement of any one of the first to sixth aspects or alternative aspects, the nonlinear crystal may be a solid-state nonlinear crystal having a nonlinear conversion axis and the polarisation direction of the linearly polarised Raman beam is aligned with the nonlinear conversion axis.

In an arrangement of any one of the first to sixth aspects or alternative aspects, at least one of the laser gain medium, Raman-active medium, and the nonlinear medium may have a waveguide geometry.

In an arrangement of any one of the first to sixth aspects or alternative aspects, one or more of the laser gain medium, Raman-active medium, and the nonlinear medium may be in contact with at least one of the laser gain medium, Raman-active medium, or the nonlinear medium. One or more of the laser gain medium, Raman-active medium, and the nonlinear medium may be either diffusion bonded or glued to at least one of the laser gain medium, Raman-active medium, or the nonlinear medium.

In an arrangement of any one of the first to sixth aspects or alternative aspects, the laser may also comprise means to prevent the converted beam from impinging on the laser gain medium. The means may also to prevent the converted beam from impinging on the Raman-active medium. The means may prevent the converted beam from being absorbed in either or both of the laser gain medium, or the Raman active medium. The means may be a further reflector located in the resonator cavity. The means may be a reflector on one or more of the laser gain medium, Raman-active medium, or the nonlinear medium. The means may be an optical coating on an element of the laser and may be on one or more of the laser gain medium, Raman-active medium, or the nonlinear medium. The optical coating may be configured to reflect the wavelength of the converted beam. The optical coating may reflect a portion of the converted beam. The reflected portion may be in the range of 40% to 100% of the converted beam, or it may alternately be in the range of 45% to 100%, 50% to 100%, 55% to 100%, 60% to 100%, 65% to 100%, 70% to 100%, 75% to 100%, 80% to 100%, 85% to 100%, 90% to 100%, or 95% to 100% and the reflected portion may be about 40%, 45%, 50%, 55%, 60%, 65%, 70%, 75%, 80%, 85%, 90%, 95%, 96%, 97%, 98%, 99% or 100% of the converted beam.

In an arrangement of any one of the first to sixth aspects or alternative aspects, the nonlinear medium may comprise a tunable nonlinear medium and the continuous wave laser comprises a tuner to tune the tunable nonlinear medium. The tuner may be a temperature tuner. The tuner may be an angle tuner.

In an arrangement of any one of the first to sixth aspects or alternative aspects, the laser medium and the Raman-active medium may be provided in a Raman-active gain medium which generates both the continuous wave fundamental beam and the continuous wave Raman beam.

In an arrangement of any one of the first to sixth aspects or alternative aspects, the Raman-active gain medium may be a crystalline Raman-active gain medium which generates a linearly polarised Raman beam.

In an arrangement of any one of the first to sixth aspects or alternative aspects, the laser medium may be a frequency doubling material which frequency converts the continuous wave Raman beam to produce the continuous wave converted beam.

In an arrangement of any one of the first to sixth aspects or alternative aspects, the Raman medium may be a frequency doubling material which frequency converts the continuous wave Raman beam to produce the continuous wave converted beam.

In an arrangement of any one of the first to sixth aspects or alternative aspects, the laser medium may be a Raman-active medium which produces the continuous wave Raman beam and the laser medium may also be a frequency doubling material which frequency converts the continuous wave Raman beam to produce the continuous wave converted beam.

In an arrangement of any one of the first to sixth aspects or alternative aspects, the laser gain medium may be selected from the group of YLF, YAG, YALO and YVO4, GdVO4 YAB, YCOB, KGW and KYW and the laser gain medium is doped with an active dopant ion. The active dopant ion may be either neodymium or ytterbium.

In an arrangement of any one of the first to sixth aspects or alternative aspects, the Raman-active medium may be selected from the group of KGW (potassium gadolinium tungstate), KYW (potassium yttrium tungstate), $Ba(NO_3)_2$ (barium nitrate), $LiIO_3$ (lithium iodate), $BaWO_4$ (barium tungstate), $PbWO_4$ (lead tungstate), $CaWO_4$ (calcium tungstate), other suitable tungstates or molybdates, diamond, $GdYVO_4$ (gadolinium vanadate), $YVO_4$ (yttrium vanadate), $LiNbO_3$ (lithium niobate) and other suitable crystalline materials which are Raman-active.

In an arrangement of any one of the first to sixth aspects or alternative aspects, the nonlinear medium may be selected from the group of LBO, LTBO, BBO, KBO, KTP, RTA, RTP, KTA, ADP, LiIO3 KD*P, $LiNbO_3$ and periodically-poled $LiNbO_3$.

In an arrangement of any one of the first to sixth aspects or alternative aspects, the continuous wave converted beam may have a wavelength in the visible region of the optical spectrum. The continuous wave converted beam may have a wavelength in the range of 500 to 800 nm. The continuous wave converted beam may have a wavelength in the range of 550 to 600 nm. The continuous wave converted beam may have a wavelength selected from the group of about 532 nm, 555 nm, 559 nm, 579 nm, 588 nm, 589 nm, 593 nm, 606 nm, 621 nm, 636 nm and, 658 nm and 671 nm. The wavelength of the continuous wave converted beam may be selected from the group of about 532 nm, 555 nm, 559 nm, 579 nm, 588 nm, 589 nm, 593 nm, 606 nm, 621 nm, 636 nm and, 658 nm and 671 nm, wherein the wavelength may be plus or minus about 1 nm from the selected value.

In an arrangement of any one of the first to sixth aspects or alternative aspects, the laser may further comprise a third reflector located in the resonator cavity. The gain material and the Raman material may be located intermediate the first and the third reflectors. The nonlinear material may be located intermediate the third and the second reflectors. The third reflector may be configured for high reflectivity at the optical wavelengths of both the fundamental beam and the Raman beam, and the third reflector may also be configured for high transmission of the wavelength of the frequency converted beam. The third reflector may the output coupler.

In an arrangement of any one of the first to sixth aspects or alternative aspects, the resonator cavity may have a resonator mode and the laser may further comprise a third and a fourth reflector each located in the resonator cavity. The laser gain medium may be located intermediate the third and fourth reflectors The Raman-active medium may be located intermediate the first and third reflectors. The nonlinear medium may be located intermediate the fourth and second reflectors. The resonator mode size may be independently configurable in each of the laser gain medium, the Raman-active medium and the nonlinear medium.

In an arrangement of any one of the first to sixth aspects or alternative aspects, the resonator cavity may have a resonator mode and the laser further comprises a third and a fourth reflector each located in the resonator cavity. The laser gain medium may be located intermediate the third and fourth reflectors. Both the Raman-active medium and the nonlinear medium may be located intermediate the fourth and second reflectors.

In an arrangement of any one of the first to sixth aspects or alternative aspects, the resonator mode may have at least two waist locations and the Raman-active and the nonlinear medium may each be located at a respective waist location.

In an arrangement of any one of the first to sixth aspects or alternative aspects, the first and second reflectors, the laser gain medium, the Raman-active medium, and the nonlinear medium elements may each be positioned such that the separation between selected adjacent elements is in the range from 0.1 and 2 mm.

In an arrangement of any one of the first to sixth aspects or alternative aspects, the laser may comprise a pump beam generator for generating the pump beam.

In an arrangement of any one of the first to sixth aspects or alternative aspects, the CW laser may be a Raman laser. The Raman beam comprises a continuous wave Raman beam, The first reflector may be an input mirror. It may be planar, and may be plano-plano. It may be a curved mirror. It may be a curved reflector. It may be at least partially transmissive towards the pump beam. It may be highly reflective towards the fundamental beam and the Raman beam. The second reflector may comprise an output coupler. It may be planar, and may be plano-plano. It may be a curved mirror. It may be a curved reflector. There may be a separate output coupler for outputting an output laser beam from the resonator cavity. The output coupler (whether separate from or integral with the second reflector) may be capable of outputting a desired wavelength of output laser beam from the resonator cavity. The second reflector may be highly reflective towards the fundamental beam. It may be highly reflective towards wavelengths of laser beam that resonate within the cavity. The first reflector may be planar, and may be plano-plano and the second reflector may be curved or vice versa. The curved reflector may be a hemispherical reflector. The first reflector may be planar, and may be plano-plano and the second reflector may be planar, and may be plano-plano. The resonator may be a semihemispherical cavity. The laser material may be capable of generating a fundamental beam within the cavity when pumped by the pump beam. It may comprise a laser crystal. A suitable laser material is Nd:GdVO$_4$. A suitable Raman-active medium is KGW (KGd(WO$_4$)$_2$). The Raman active medium may be a Raman active crystal. The Raman beam may have a first Stokes wavelength, and optionally a second, third and/or higher Stokes is wavelength. The pump beam generator may comprise a laser diode for generating the pump beam. The laser may also comprise a pump beam transmitter for transmitting the pump beam from the pump beam generator to the resonator cavity. The laser may also comprise one or more lenses, e.g. collimating lenses, for focussing the pump beam on or in the laser medium. The pump beam generator may comprise a fibre coupled diode laser. It may have a power of about 30 W, or between about 10 and 50 W, or between about 10 and 40, 10 and 30, 10 and 20, 20 and 50, 30 and 50 or 20 and 40 W, for example about 10, 15, 20, 25, 30, 35, 40, 45 or 50 W, or more than 50 W or less than 10 W. In an arrangement of the first to sixth aspects or alternative aspects, the laser is operated at within a range of 1.1 to 10 times the threshold for continuous wave Raman operation. In other arrangements, the laser is operated in the range 1.1 to 7, 1.1 to 5, 1.1 to 4.5, 1.1 to 4, 1.1 to 3.5, 1.1 to 3. 1.1 to 3.5, 1.1 to 2, 1.1 to 1.5, 1.1 to 1.4, 1.1 to 1.3, 1.1 to 1.2 times threshold.

In an arrangement of any one of the first to sixth aspects or alternative aspects, the laser may also comprise a non-linear medium for converting at least one Stokes wavelength of the Raman beam to a converted wavelength. The non-linear medium may be intracavity or extracavity. The laser may comprise one non-linear medium or more than one (e.g. 2, 3, 4, 5) non-linear media, which may be the same or different. One or more may be intracavity. One or more may be extracavity. Each may be individually tunable, or they may be tunable together, or some may be tunable together and some separately. A suitable non-linear medium is LBO. The non-linear medium may be a non-linear crystal. Other suitable non-linear media include BBO, KTP and other known crystals with second order nonlinearity. The converted wavelength may be a frequency doubled wavelength, a sum frequency wavelength, a difference frequency wavelength, a frequency trebled wavelength or some other converted wavelength. The non-linear medium may comprise a frequency doubler, a sum frequency generator, a difference frequency generator or some other type of non-linear medium.

In an arrangement of any one of the first to sixth aspects or alternative aspects, the laser may comprise a selector for selecting a Stokes wavelength to resonate within the resonator cavity. The selector may be a polarisation selector, a seed beam generator for seeding the Raman active medium, or some other type of selector. The laser may also comprise a tuner for tuning the non-linear medium (if present), or may comprise more than one tuner if more than one non-linear medium is present. The or each tuner may (independently) be a temperature tuner, an angle tuner or some other type of tuner. The tuning may comprise phase matching. It may comprise type I phase matching. It may comprise non-critical phase matching. The tuning may be such that the Raman wavelengths are converted by the non-linear medium without polarisation rotation and/or without introducing birefringence. The tuning may enable switching between frequency doubling the Raman beam, frequency doubling the fundamental beam and sum frequency mixing of the fundamental and Raman wavelengths.

In an arrangement of any one of the first to sixth aspects or alternative aspects, the CW pump beam may be modulated in a variety of ways, eg. by electro-mechanical chopping of the pump beam or electronically by modulating the current supplied to the laser diode (or other pump source or pump beam generator). Reasons for doing this include tailoring the laser output to suit particular applications. This may for example involve 1) modulating on and off at a desired repetition rate and duty cycle, or it could involve 2) ramping the amplitude up and down to provide a desired amplitude variation, and 3) reasons of efficiency, ie. only providing light when it is required, which may result in smaller device sizes. The laser may comprise an etalon for longitudinal mode control. The laser may comprise an aperture for transverse mode control or to provide a single transverse mode output. The laser medium and/or the Raman active medium or crystal may have Yb and/or Tm impurities of less than 1 ppm.

In an arrangement of any one of the first to sixth aspects or alternative aspects, the method may further comprise the step of providing a second nonlinear medium in the resonator cavity for frequency converting the converted beam to a further converted beam. The further converted beam may be in the ultraviolet region of the optical spectrum. The further converted beam may be in the range of 250 to 400 nm. The further converted beam may be in the range of 250 to 300 nm. The resonator cavity may have a high finesse at the wavelength of the converted beam and a low finesse at the wavelength of the further converted beam. The resonator cavity may have a high Q at the wavelength of the converted beam and a low Q at the wavelength of the further converted beam. The resonator cavity may have a finesse and a high Q at the wavelength of the converted beam and a low finesse and low Q at the wavelength of the further converted beam. In a further arrangement, a portion of the resonator cavity may have either or both a high finesse or a high Q at the wavelength of the converted beam and either or both a low finesse or low Q at the wavelength of the further converted beam.

In a seventh aspect, there is provided a method for producing continuous wave laser output, said method comprising:
providing a resonator cavity
providing at least a first reflector and a second reflectors;
providing a laser gain medium located in the resonator cavity for generating a continuous wave fundamental beam at a first optical wavelength;
providing a Raman-active medium positioned in the resonator cavity capable of Raman shifting the first optical wavelength to the second optical wavelength to generate a continuous wave Raman beam at a second optical wavelength
providing a non-linear medium positioned in the resonator cavity capable of frequency converting the second optical wavelength to a third optical wavelength to generate a continuous wave converted beam at the third optical wavelength;
optically pumping the laser gain medium with a pump source located external to the resonator cavity to generate the fundamental beam at the first optical wavelength which resonates within the resonator cavity, the first optical wavelength subsequently being Raman shifted to the second optical wavelength by the Raman-active medium and the second optical wavelength being frequency converted by the nonlinear medium to the third optical wavelength; and
outputting the third optical wavelength from the resonator cavity to provide a continuous wave laser output.

In an arrangement of the seventh aspect, the resonator cavity simultaneously has a high finesse at the first and second optical wavelengths and a low finesse at the third optical wavelength. The third optical wavelength the third optical wavelength may have a wavelength in the visible region of the optical spectrum. The third optical wavelength may have a wavelength in the range of 500 to 800 nm. The third optical wavelength may have a wavelength in the range of 550 to 600 nm. The third optical wavelength may have a wavelength selected from the group of about 532 nm, 555 nm, 559 nm, 579 nm, 588 nm, 589 nm, 593 nm, 606 nm, 621 nm, 636 nm and, 658 nm and 671 nm. The wavelength of the third optical wavelength may be selected from the group of about 532 nm, 555 nm, 559 nm, 579 nm, 588 nm, 589 nm, 593 nm, 606 nm, 621 nm, 636 nm and, 658 nm and 671 nm, wherein the wavelength may be plus or minus about 1 nm from the selected value. The visible optical wavelength may be a yellow, orange or a red optical wavelength.

In an arrangement of the seventh aspect, the laser gain medium may be capable of generating a linearly polarised continuous wave fundamental beam at the first optical frequency. The Raman-active medium Raman may shift the linearly polarised fundamental beam to a linearly polarised continuous wave Raman beam at the second optical wavelength. The nonlinear medium may frequency convert the linearly polarised Raman beam to a linearly polarised continuous wave frequency converted beam at the third optical wavelength.

In an eighth aspect, there is provided a method for producing continuous wave laser output, the method comprising
   providing a resonator cavity;
   providing at least a first reflector and a second reflector, said first and second reflectors being located at opposite ends of the resonator cavity;
   providing a laser gain medium located in the resonator cavity for generating a continuous wave fundamental beam which resonates within the resonator cavity when pumped by a pump beam from a pump source external to the resonator cavity;
   providing a solid Raman-active medium positioned in the resonator cavity for Raman shifting the fundamental beam to produce a continuous wave Raman beam which resonates within the resonator cavity;
   providing a non-linear medium positioned in the resonator cavity for frequency converting the continuous wave Raman beam to a converted wavelength to produce a continuous wave converted beam;
   outputting the continuous wave converted beam from the resonator cavity In a ninth aspect, there is provided a method for producing continuous wave visible laser output, the method comprising
   providing a resonator cavity;
   providing at least a first reflector and a second reflector, said first and second reflectors being located at opposite ends of the resonator cavity;
   providing a laser gain medium located in the resonator cavity for generating a continuous wave fundamental beam which resonates within the resonator cavity when pumped by a pump beam from a pump source external to the resonator cavity;
   providing a solid Raman-active medium positioned in the resonator cavity for Raman shifting the fundamental beam to produce a continuous wave Raman beam which resonates within the resonator cavity;
   providing a non-linear medium positioned in the resonator cavity for frequency converting the continuous wave Raman beam to a converted wavelength to produce a continuous wave converted beam in the wavelength range of 500 to 800 nm;
   outputting the continuous wave converted beam from the resonator cavity In a tenth aspect, there is provided a method for providing a continuous wave Raman laser having visible laser output, the method comprising
   providing a resonator cavity;
   providing at least a first reflector and a second reflector, said first and second reflectors being located at opposite ends of the resonator cavity;
   providing a laser gain medium located in the resonator cavity for generating a continuous wave fundamental beam which resonates within the resonator cavity when pumped by a pump beam from a pump source external to the resonator cavity;
   providing a solid Raman-active medium positioned in the resonator cavity for Raman shifting the fundamental beam to produce a continuous wave Raman beam which resonates within the resonator cavity;
   providing a non-linear medium positioned in the resonator cavity for frequency converting the continuous wave Raman beam to a converted wavelength to produce a continuous wave converted beam in the wavelength range of 500 to 800 nm;
   outputting the continuous wave converted beam from the resonator cavity In an eleventh aspect, there is provided a method for providing a continuous wave Raman laser having yellow laser output, the method comprising
   providing a resonator cavity;
   providing at least a first reflector and a second reflector, said first and second reflectors being located at opposite ends of the resonator cavity;
   providing a laser gain medium located in the resonator cavity for generating a continuous wave fundamental beam which resonates within the resonator cavity when pumped by a pump beam from a pump source external to the resonator cavity;
   providing a solid Raman-active medium positioned in the resonator cavity for Raman shifting the fundamental beam to produce a continuous wave Raman beam which resonates within the resonator cavity;
   providing a non-linear medium positioned in the resonator cavity for frequency converting the continuous wave Raman beam to a converted wavelength to produce a continuous wave converted beam in the wavelength range of 500 to 800 nm;
   outputting the continuous wave converted beam from the resonator cavity.

In a twelfth aspect, there is provided method for providing a continuous wave laser comprising:
   providing a resonator cavity;
   providing at least a first reflector and a second reflector said first and second reflectors being located at opposite ends of the resonator cavity;
   providing a laser gain medium located in the resonator cavity for generating a continuous wave fundamental beam which resonates within the resonator cavity when pumped by a pump beam from a pump source external to the resonator cavity;
   providing a solid Raman-active medium positioned in the resonator cavity for Raman shifting the fundamental beam to produce a continuous wave Raman beam which resonates within the resonator cavity;
   providing a non-linear medium positioned in the resonator cavity for frequency converting the continuous wave Raman beam to a converted wavelength to produce a continuous wave converted beam;

wherein the resonator cavity is a high finesse resonator cavity at the wavelength of the continuous wave fundamental beam and the Raman beam and a low finesse resonator cavity at the wavelength of the continuous wave converted beam.

In a thirteenth aspect, there is provided a method for providing a continuous wave laser comprising:
providing a resonator cavity;
providing at least a first reflector and a second reflector said first and second reflectors being located at opposite ends of the resonator cavity;
providing a laser gain medium located in the resonator cavity for generating a continuous wave fundamental beam which resonates within the resonator cavity when pumped by a pump beam from a pump source external to the resonator cavity;
providing a solid Raman-active medium positioned in the resonator cavity for Raman shifting the fundamental beam to produce a continuous wave Raman beam which resonates within the resonator cavity;
providing a non-linear medium positioned in the resonator cavity for frequency converting the continuous wave Raman beam to a converted wavelength to produce a continuous wave converted beam;
wherein the resonator cavity is a high Q cavity at the wavelengths of the continuous wave fundamental beam and the Raman beam and a low Q cavity resonator cavity at the wavelength of the continuous wave converted beam.

In a fourteenth aspect, there is provided a method for providing a continuous wave laser comprising:
providing a resonator cavity;
providing at least a first reflector and a second reflector said first and second reflectors being located at opposite ends of the resonator cavity;
providing a laser gain medium located in the resonator cavity for generating a continuous wave fundamental beam which resonates within the resonator cavity when pumped by a pump beam from a pump source external to the resonator cavity;
providing a solid Raman-active medium positioned in the resonator cavity for Raman shifting the fundamental beam to produce a continuous wave Raman beam which resonates within the resonator cavity;
providing a non-linear medium positioned in the resonator cavity for frequency converting the continuous wave Raman beam to a converted wavelength to produce a continuous wave converted beam;
wherein the first and second reflectors are highly reflective at the wavelengths of both the fundamental beam and the Raman beam, and highly transmissive at the wavelength of the converted beam such that the continuous wave converted beam is output from the resonator cavity.

In a fifteenth aspect, there is provided a method for providing a stable continuous wave Raman laser comprising:
providing a resonator cavity;
providing at least a first reflector and a second reflectors said first and second reflector being located at opposite ends of the resonator cavity;
providing a laser gain medium located in the resonator cavity for generating a continuous wave fundamental beam which resonates within the resonator cavity when pumped by a pump beam from a pump source external to the resonator cavity;
providing a Raman-active medium positioned in the resonator cavity for Raman shifting the fundamental beam to produce a continuous wave Raman beam which resonates within the resonator cavity;
providing a non-linear medium positioned in the resonator cavity for frequency converting the continuous wave Raman beam to a converted wavelength to produce a continuous wave converted beam.

In an arrangement of the fifteenth aspect, the method further comprises positioning the at least first and second reflectors, the laser gain medium, the Raman medium, and the nonlinear medium to provide a stable resonator cavity. The resonator may be stable when the laser medium is pumped by the pump beam to provide a stable continuous wave Raman laser when in operation.

In a sixteenth aspect, there is provided a method for providing a stable continuous wave visible Raman laser comprising:
providing a resonator cavity;
providing at least a first reflector and a second reflectors said first and second reflector being located at opposite ends of the resonator cavity;
providing an output coupler;
providing a laser gain medium located in the resonator cavity for generating a continuous wave fundamental beam which resonates within the resonator cavity when pumped by a pump beam from a pump source external to the resonator cavity;
providing a Raman-active medium positioned in the resonator cavity for Raman shifting the fundamental beam to produce a continuous wave Raman beam which resonates within the resonator cavity; and
providing a non-linear medium positioned in the resonator cavity for frequency converting the continuous wave Raman beam to a converted wavelength to produce a continuous wave converted beam in the visible region of the optical spectrum; and
outputting the visible continuous wave converted beam from the resonator cavity with the output coupler.

In a seventeenth aspect, there is provided a method for providing a continuous wave laser comprising:
providing a resonator cavity;
providing at least a first reflector and a second reflectors said first and second reflector being located at opposite ends of the resonator cavity;
providing a laser gain medium located in the resonator cavity for generating a continuous wave fundamental beam which resonates within the resonator cavity when pumped by a pump beam from a pump source external to the resonator cavity;
providing a first cooling element for cooling the laser gain medium;
providing a Raman-active medium positioned in the resonator cavity for Raman shifting the fundamental beam to produce a continuous wave Raman beam which resonates within the resonator cavity;
providing a second cooling element for cooling the Raman-active medium; and
providing a non-linear medium positioned in the resonator cavity for frequency converting the continuous wave Raman beam to a converted wavelength to produce a continuous wave converted beam.

In an arrangement of any one of the seventh to seventeenth aspects, the resonator cavity may be a high finesse resonator cavity at the wavelength of the continuous wave fundamental beam and the Raman beam and a low finesse resonator cavity at the wavelength of the continuous wave converted beam.

In an arrangement of any one of the seventh to seventeenth aspects, the reflectivity of both the first and second reflectors at both the first and second optical wavelengths may be in the range from 99.5% to 99.99%.

In an arrangement of any one of the seventh to seventeenth aspects, wherein in operation, the intracavity intensity of the continuous wave fundamental beam in the Raman crystal may be greater than 80 kW/cm$^2$ and the intracavity intensity of the continuous wave Raman beam in the nonlinear material may be greater than 80 kW/cm$^2$.

In an arrangement of any one of the seventh to seventeenth aspects, wherein in operation, the intracavity intensity of the continuous wave fundamental beam in the Raman crystal may be greater than 100 kW/cm$^2$ and the intracavity intensity of the continuous wave Raman beam in the nonlinear material may be greater than 100 kW/cm$^2$.

In an arrangement of any one of the seventh to seventeenth aspects, the method may comprise the further step of providing a cooling means for cooling the Raman-active material. The cooling means may be either a passive or an active cooling means. The cooling means may be either an air cooling means or a liquid cooling means. The liquid cooling means may a circulating liquid cooling means for example a liquid such as glycol which circulates alternately between a refrigeration unit to cool the liquid and a location where the liquid is capable of extracting heat from the either or both the laser gain medium or the Raman-active medium.

In an arrangement of any one of the seventh to seventeenth aspects, the laser gain medium, the Raman-active medium and the nonlinear medium each may be solid state media. The laser gain medium and the Raman-active medium are the same crystalline solid state medium.

In an arrangement of any one of the eighth to seventeenth aspects, the continuous wave converted beam may have a wavelength in the visible region of the optical spectrum. The continuous wave converted beam may have a wavelength in the range of 500 to 800 nm. The continuous wave converted beam may have a wavelength in the range of 550 to 600 nm. The continuous wave converted beam may have a wavelength selected from the group of about 532 nm, 555 nm, 559 nm, 579 nm, 588 nm, 589 nm, 593 nm, 606 nm, 621 nm, 636 nm and, 658 nm and 671 nm. The wavelength of the continuous wave converted beam may be selected from the group of about 532 nm, 555 nm, 559 nm, 579 nm, 588 nm, 589 nm, 593 nm, 606 nm, 621 nm, 636 nm and, 658 nm and 671 nm, wherein the wavelength may be plus or minus about 1 nm from the selected value. The visible optical wavelength may be a yellow, orange or a red optical wavelength.

In an arrangement of any one of the seventh to seventeenth aspects, the resonator cavity may have a high finesse at the optical wavelengths of both the fundamental beam and the Raman beam and a low finesse at the optical wavelength of the converted beam. The finesse of the resonator cavity at both the fundamental beam and the Raman beams simultaneously may be greater than 100. In other arrangements, the finesse of the resonator cavity at both the fundamental beam and the Raman beams simultaneously may be greater than 500, or greater than 1000, greater than 2000, greater than 3000, greater than 4000, greater than 5000, greater than 6000, greater than 7000, greater than 8000, greater than 9000, greater than 10000, greater than 15000, greater than 20000, greater than 25000, greater than 30000, greater than 35000, greater than 40000, greater than 45000. The finesse of the resonator cavity at both the fundamental beam and the Raman beams simultaneously may be in the range 100 to 50000, 100 to 45000, 100 to 40000, 100 to 35000, 100 to 30000, 100 to 25000, 100 to 20000, 100 to 15000, 100 to 10000, 100 to 9000, 100 to 8000, 100 to 7000, 100 to 6000, 100 to 5000, 100 to 4000, 100 to 3000, 100 to 2000, 100 to 1000, or 100 to 500, and may be approximately 100, 150, 200, 250, 300, 350, 400, 450, 500, 550, 600, 650, 700, 750, 800, 850, 900, 950, 1000, 1100, 1200, 1300, 1400, 1500, 1600, 1700, 1800, 1900, 2000, 2250, 2500, 2750, 3000, 3250, 3500, 3750, 4000, 4250, 4500, 4750, 5000, 6000, 7000, 80000, 9000, 10000, 11000, 12000, 13000, 14000, 15000, 16000, 17000, 18000, 19000, 20000, 25000, 30000, 35000, 40000, 45000, 50000. In an arrangement of any one of the seventh to seventeenth aspects, the resonator cavity has a high Q at the wavelengths of the optical wavelengths of both the fundamental beam and the Raman beam. The resonator cavity may have a low finesse at the optical wavelength of the converted beam. The resonator cavity may have both a high finesse and a high Q at the optical wavelengths of the optical wavelengths of both the fundamental beam and the Raman beam. The resonator cavity may have both a high finesse and a high Q at the optical wavelength of the converted beam.

In an arrangement of any one of the seventh to seventeenth aspects, the resonator cavity may have a finesse at the wavelength of the converted beam in the range of approximately 0 to 5. In a further arrangement, the resonator cavity finesse at the wavelength of the converted beam may be in the range of approximately 0 to 4.5, 0 to 4, 0 to 3.5, 0 to 3, 0 to 2.5, 0 to 2.4, 0 to 2.3, 0 to 2.2, 0 to 2.1, 0 to 2.0, 0 to 1.9, 0 to 1.8, 0 to 1.7, 0 to 1.6, 0 to 1.5, 0 to 1.4, 0 to 1.3, 0 to 1.2, 0 to 1.1, 0 to 1.0, 0 to 0.9, 0 to 0.8, 0 to 0.7, 0 to 0.6, 0 to 0.5, 0 to 0.4, 0 to 0.3, 0 to 0.2, 0 to 0.1, 0.5 to 5, 0 to 4.5, 0 to 4, 0.5 to 3, 0.5 to 3.5, 0.5 to 2, 0.5 to 1.5, 0.5 to 1.0, 1 to 4, 0 to 3, 1 to 2.5, 1 to 2, and the resonator finesse at the wavelength of the converted beam may be approximately 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.5, 4.0, 4.5 or 5.

In an arrangement of any one of the seventh to seventeenth aspects, the resonator cavity may have a roundtrip resonator loss at the wavelength of both the fundamental beam and the Raman beams simultaneously in the range of 0% to 5%. In further arrangements, the roundtrip resonator loss at both the fundamental beam and the Raman beams simultaneously may be in the range of 0% to 4.5%, 0% to 4%, 0% to 3.5%, 0% to 3%, 0% to 2.5%, 0% to 2%, 0% to 1.9%, 0% to 1.8%, 0% to 1.7%, 0% to 1.6%, 0% to 1.5%, 0% to 1.4%, 0% to 1.3%, 0% to 1.2%, 0% to 1.1%, 0% to 1.0%, 0% to 0.9%, 0% to 0.8%, 0% to 0.7%, 0% to 0.6%, 0% to 0.5%, 0% to 0.3%, 0% to 0.2%, or 0% to 0.1%. In an arrangement of any one of the seventh to seventeenth aspects, the roundtrip resonator loss at the wavelength of the fundamental beam may be 0%, 0.1%, 0.2%, 0.3%, 0.4%, 0.5%, 0.65%, 0.7%, 0.8%, 0.9%, 1.0%, 1.1%, 1.2%, 1.3%, 1.4%, 1.5%, 1.6%, 1.7%, 1.8%, 1.9%, 2.0%, 2.5%, 3.0%, 3.5%, 4.0%, 4.5%, or 5%. In an arrangement of any one of the seventh to seventeenth aspects, the roundtrip resonator loss at the wavelength of the Raman beam may be 0%, 0.1%, 0.2%, 0.3%, 0.4%, 0.5%, 0.65%, 0.7%, 0.8%, 0.9%, 1.0%, 1.1%, 1.2%, 1.3%, 1.4%, 1.5%, 1.6%, 1.7%, 1.8%, 1.9%, 2.0%, 2.5%, 3.0%, 3.5%, 4.0%, 4.5%, or 5%. In an arrangement of any one of the seventh to seventeenth aspects, the roundtrip resonator loss at the wavelength of the fundamental beam may be 0%, 0.1%, 0.2%, 0.3%, 0.4%, 0.5%, 0.65%, 0.7%, 0.8%, 0.9%, 1.0%, 1.1%, 1.2%, 1.3%, 1.4%, 1.5%, 1.6%, 1.7%, 1.8%, 1.9%, 2.0%, 2.5%, 3.0%, 3.5%, 4.0%, 4.5%, or 5% and the roundtrip resonator loss at the wavelength of the Raman beam may be 0%, 0.1%, 0.2%, 0.3%, 0.4%, 0.5%, 0.65%, 0.7%, 0.8%, 0.9%, 1.0%, 1.1%, 1.2%, 1.3%, 1.4%, 1.5%, 1.6%, 1.7%, 1.8%, 1.9%, 2.0%, 2.5%, 3.0%, 3.5%, 4.0%, 4.5%, or 5%.

In an arrangement of any one of the seventh to seventeenth aspects, the first and second reflectors may be configured for high reflectivity at the optical wavelengths of both the fundamental beam and the Raman beam simultaneously and at least one of the first and second reflectors may be configured for high transmission at the optical wavelength of the converted beam.

In an arrangement of any one of the seventh to seventeenth aspects, the reflectivity of both the first and second reflectors at the wavelengths of both the fundamental beam and the Raman beam simultaneously may be greater than 97%. In a further arrangement, the reflectivity of both the first and second reflectors at the wavelengths of both the fundamental beam and the Raman beam simultaneously is greater than 98%. In a further arrangement, the reflectivity of both the first and second reflectors at the wavelengths of both the fundamental beam and the Raman beam simultaneously may be greater than 99%. In a further arrangement, the reflectivity of both the first and second reflectors at the wavelengths of both the fundamental beam and the Raman beam simultaneously may be greater than 99.5%. In a further arrangement still, the reflectivity of both the first and second reflectors at the wavelengths of both the fundamental beam and the Raman beam simultaneously may be greater than 99.9%. In an arrangement of any one of the seventh to seventeenth aspects, the reflectivity of both the first and second reflectors at the wavelengths of both the fundamental beam and the Raman beam simultaneously may be in the range of 97% to 100% or the reflectivity may be in the range of 98% to 100%, 98.5% to 100%, 99% to 100%, 99.5% to 100%, 99.6% to 100%, 99.7% to 100%, 99.8% to 100%, 99.9% to 100%, 99.95% to 100%, or 99.99% to 100%. The reflectivity of the first and the second reflectors at the wavelength of the fundamental beam may be approximately 97%, 98%, 98.5%, 99%, 99.1%, 99.2%, 99.3%, 99.4%, 99.5%, 99.6%, 99.7%, 99.8%, 99.9%, 99.91%, 99.92%, 99.93%, 99.94%, 99.95%, 99.96%, 99.97%, 99.98%, 99.99%, 99.995 or 100%. The reflectivity of the first and the second reflectors at the wavelength of the Raman beam may be approximately 97%, 98%, 98.5%, 99%, 99.1%, 99.2%, 99.3%, 99.4%, 99.5%, 99.6%, 99.7%, 99.8%, 99.9%, 99.91%, 99.92%, 99.93%, 99.94%, 99.95%, 99.96%, 99.97%, 99.98%, 99.99%, 99.995 or 100%. The reflectivity of the first and the second reflectors at the wavelength of the fundamental beam may be approximately 97%, 98%, 98.5%, 99%, 99.1%, 99.2%, 99.3%, 99.4%, 99.5%, 99.6%, 99.7%, 99.8%, 99.9%, 99.91%, 99.92%, 99.93%, 99.94%, 99.95%, 99.96%, 99.97%, 99.98%, 99.99%, 99.995 or 100% and the reflectivity of the first and the second reflectors at the wavelength of the Raman beam may simultaneously be approximately 97%, 98%, 98.5%, 99%, 99.1%, 99.2%, 99.3%, 99.4%, 99.5%, 99.6%, 99.7%, 99.8%, 99.9%, 99.91%, 99.92%, 99.93%, 99.94%, 99.95%, 99.96%, 99.97%, 99.98%, 99.99%, 99.995 or 100%.

In an arrangement of any one of the seventh to seventeenth aspects, the transmission of at least one of the first or the second reflectors is in the range of approximately 40% to 100%, or, 50% to 100%, 60% to 100%, 65% to 100%, 70% to 100%, 75% to 100%, 80% to 100%, 85% to 100%, 90% to 100%, 95% to 100%, 50% to 95%, 60% to 90%, 65% to 85%, 70% to 95%, 80% to 95%, or 85% to 90%, and the transmission of at least one of the first or the second reflectors may be approximately 40%, 45%, 50%, 55%, 60%, 65%, 70%, 75%, 80%, 85%, 90%, 95%, 97%, 98%, 99% or 100%.

In an arrangement of any one of the seventh to seventeenth aspects, in operation, in operation, the intracavity intensity of the continuous wave fundamental beam in the Raman crystal may be greater than the threshold intensity for continuous wave Raman operation and less than the damage threshold of the Raman-active medium.

In an arrangement of any one of the seventh to seventeenth aspects, in operation, the intracavity intensity of the continuous wave fundamental beam in the Raman crystal may be greater than the threshold intensity for continuous wave Raman operation and the intracavity intensity of the continuous wave Raman beam in the nonlinear medium may be greater than 80 kW/cm$^2$. In other arrangements, the intracavity intensity of the continuous wave fundamental beam in the Raman crystal is greater than the threshold intensity for continuous wave Raman operation and the intracavity intensity of the continuous wave Raman beam in the nonlinear medium may be greater than 90 kW/cm$^2$, or greater than 100, 110, 120, 130, 140, 150, 160, 170, 180, 190, 200, 210, 220, 230, 240, 250, 260, 270, 280, 290, 300, 350, 400, 450, or 500 kW/cm$^2$. The intracavity intensity of the Raman beam in the nonlinear medium may be less than the damage threshold of the nonlinear medium.

In an arrangement of any one of the seventh to seventeenth aspects, in operation, the intracavity intensity of the continuous wave fundamental beam in the Raman crystal may be greater than 80 kW/cm$^2$ and the intracavity intensity of the continuous wave Raman beam in the nonlinear medium may be greater than 80 kW/cm$^2$. In other arrangements, the intracavity intensity of the continuous wave fundamental beam in the Raman crystal may be greater than 90 kW/cm$^2$, or greater than 100, 110, 120, 130, 140, 150, 160, 170, 180, 190, 200, 210, 220, 230, 240, 250, 260, 270, 280, 290, 300, 350, 400, 450, or 500 kW/cm$^2$. The intracavity intensity of the continuous wave Raman beam in the nonlinear medium may be greater than 90 kW/cm$^2$, or greater than 100, 110, 120, 130, 140, 150, 160, 170, 180, 190, 200, 210, 220, 230, 240, 250, 260, 270, 280, 290, 300, 350, 400, 450, or 500 kW/cm$^2$. The intracavity intensity of the fundamental beam in the Raman medium may be less than the damage threshold of the nonlinear medium and the intracavity intensity of the Raman beam in the nonlinear medium may be less than the damage threshold of the nonlinear medium.

In an arrangement of any one of the seventh to seventeenth aspects, the laser may also comprise a cooling element for cooling the nonlinear medium. In a further arrangement, the laser may comprise a first cooling element to cool at least one of the laser gain medium, the Raman-active medium or the nonlinear medium, and a second cooling element to cool at least a second one of the laser gain medium, the Raman-active medium or the nonlinear medium. In a further arrangement, the laser may comprise a first cooling element to cool the laser gain medium, a second cooling element to cool the Raman-active medium, and a third cooling element to cool the nonlinear medium.

In an arrangement of any one of the seventh to seventeenth aspects, the continuous wave laser is a solid state continuous wave laser. In an arrangement of any one of the seventh to seventeenth aspects, the laser gain medium is a is a solid state laser gain medium. In an arrangement of any one of the seventh to seventeenth aspects, the Raman-active medium is a solid state Raman-active medium. In an arrangement of any one of the seventh to seventeenth aspects, the nonlinear medium is a solid state nonlinear medium. In an arrangement of any one of the seventh to seventeenth aspects, the laser gain medium, the Raman-active medium and the nonlinear medium are all solid state media. In an arrangement of any one of the seventh to seventeenth aspects, the laser may comprise a pump beam generator for generating the pump beam.

In an arrangement of any one of the seventh to seventeenth aspects, the laser may be a Raman laser. The Raman beam comprises a continuous wave Raman beam, The first reflector may be an input mirror. It may be planar, and may be plano-plano. It may be a curved mirror. It may be at least partially transmissive towards the pump beam. It may be highly reflective towards the fundamental beam and the Raman beam. The second reflector may comprise an output coupler. It may be planar, and may be plano-plano. It may be a curved mirror. There may be a separate output coupler for outputting an output laser beam from the resonator cavity. The output coupler (whether separate from or integral with the second reflector) may be capable of outputting a desired wavelength of output laser beam from the resonator cavity. The second reflector may be highly reflective towards the fundamental beam. It may be highly reflective towards wavelengths of laser beam that resonate within the cavity. The laser material may be capable of generating a fundamental beam within the cavity when pumped by the pump beam. It may comprise a laser crystal. A suitable laser material is $GdVO_4$ which is doped with an active ion. The active ion may be neodymium. The active ion may be ytterbium. The active ion may be erbium. The active ion may be thulium. The active ion may be praseodymium. The active ion may be cerium. The active ion may be holmium. A suitable Raman-active medium is KGW ($KGd(WO_4)_2$). The Raman active medium may be a Raman active crystal. The Raman beam may have a first Stokes wavelength, and optionally a second, third and/or higher Stokes wavelength. The pump beam generator may comprise a laser diode for generating the pump beam. The laser may also comprise a pump beam transmitter for transmitting the pump beam from the pump beam generator to the resonator cavity. The laser may also comprise one or more lenses, e.g. collimating lenses, for focussing the pump beam on or in the laser medium. The pump beam generator may comprise a fibre coupled diode laser. It may have a power of about 30 W, or between about 10 and 50 W, or between about 10 and 40, 10 and 30, 10 and 20, 20 and 50, and 50 or 20 and 40 W, for example about 10, 15, 20, 25, 30, 35, 40, 45 or 50 W, or more than 50 W or less than 10 W.

In an arrangement of any one of the seventh to seventeenth aspects, the laser may also comprise a non-linear medium for converting at least one Stokes wavelength of the Raman beam to a converted wavelength. The non-linear medium may be intracavity or extracavity. The laser may comprise one non-linear medium or more than one (e.g. 2, 3, 4, 5) non-linear media, which may be the same or different. One or more may be intracavity. One or more may be extracavity. Each may be individually tunable, or they may be tunable together, or some may be tunable together and some separately. A suitable non-linear medium is LBO. The non-linear medium may be a non-linear crystal. Other suitable non-linear media include BBO, KTP and other known crystals with second order non-linearity. The converted wavelength may be a frequency doubled wavelength, a sum frequency wavelength, a difference frequency wavelength, a frequency trebled wavelength or some other converted wavelength. The non-linear medium may comprise a frequency doubler, a sum frequency generator, a difference frequency generator or some other type of non-linear medium.

In an arrangement of any one of the seventh to seventeenth aspects, the laser may comprise a selector for selecting a Stokes wavelength to resonate within the resonator cavity. The selector may be a is polarisation selector, a seed beam generator for seeding the Raman active medium, or some other type of selector. The laser may also comprise a tuner for tuning the non-linear medium (if present), or may comprise more than one tuner if more than one non-linear medium is present. The or each tuner may (independently) be a temperature tuner, an angle tuner or some other type of tuner. The tuning may comprise phase matching. It may comprise type I phase matching. It may comprise non-critical phase matching. The tuning may be such that the Raman wavelengths are converted by the non-linear medium without polarisation rotation and/or without introducing birefringence. The tuning may enable switching between frequency doubling the Raman beam, frequency doubling the fundamental beam and sum frequency mixing of the fundamental and Raman wavelengths.

In an arrangement of any one of the seventh to seventeenth aspects, the CW pump beam may be modulated in a variety of ways, eg. by electro-mechanical chopping of the pump beam or electronically by modulating the current supplied to the laser diode (or other pump source or pump beam generator). Reasons for doing this include tailoring the laser output to suit particular applications. This may for example involve 1) modulating on and off at a desired repetition rate and duty cycle, or it could involve 2) ramping the amplitude up and down to provide a desired amplitude variation, and 3) reasons of efficiency, ie. only providing light when it is required, which may result in smaller device sizes. The laser may comprise an etalon, and/or an aperture. The laser medium and/or the Raman active medium or crystal may have Yb and/or Tm impurities of less than 1 ppm.

In an arrangement of any one of the seventh to seventeenth aspects, the resonator cavity simultaneously has a high finesse at the first and second optical wavelengths and a low finesse at the third optical wavelength.

In an arrangement of any one of the seventh to sevententth aspects, the reflectivity of both the first and second reflectors at both the first and second optical wavelengths is between 99.5% and 99.999%. The reflectivity of both the first and second reflectors at the wavelength of both the fundamental and Raman beams may be in the range of 99.95% to 99.999%. The reflectivity of both the first and second reflectors at the wavelength of both the fundamental and Raman beams may be in the range of 99.99% to 99.999%.

In an arrangement of any one of the seventh to seventeenth aspects, in operation, the intracavity intensity of the continuous wave fundamental beam in the Raman crystal is greater than 80 $kW/cm^2$ and the intracavity intensity of the continuous wave Raman beam in the nonlinear material is greater than 80 $kW/cm^2$.

In an arrangement of any one of the seventh to sevententth aspects, in operation, the intracavity intensity of the continuous wave fundamental beam in the Raman crystal is greater than 100 $kW/cm^2$ and the intracavity intensity of the continuous wave Raman beam in the nonlinear material is greater than 100 $kW/cm^2$.

In an alternative aspects, there is provided a method for providing a continuous wave laser comprising:
  providing a resonator cavity;
  providing at least a first reflector and a second reflector said first and second reflectors being located at opposite ends of the resonator cavity;
  providing a laser gain medium located in the resonator cavity for generating a continuous wave fundamental beam which resonates within the resonator cavity when pumped by a pump beam from a pump source external to the resonator cavity;
  providing a solid Raman-active medium positioned in the resonator cavity for Raman shifting the fundamental beam to produce a continuous wave Raman beam which resonates within the resonator cavity;

providing a non-linear medium positioned in the resonator cavity for frequency converting the continuous wave Raman beam to a converted wavelength to produce a continuous wave converted beam;

wherein the resonator cavity is a small mode volume resonator cavity at the wavelength of the continuous wave fundamental beam and the Raman beam; or the resonator cavity is a small mode volume and high Q resonator cavity at the wavelength of the continuous wave fundamental beam and the Raman beam; or the resonator cavity is a small mode volume resonator cavity and high finesse cavity at the wavelength of the continuous wave fundamental beam and the Raman beam; or the resonator cavity is a small mode volume, high Q and high finesse resonator cavity at the wavelength of the continuous wave fundamental beam and the Raman beam.

The mode volume, $V_{mode}$, may be related to the mode area (ie. with reference to the beam size, spot size, beam radius and or diameter, $1/e^2$ value) by the relation $V_{mode} = A_{mode} / L_{mode}$ where $A_{mode}$ is the cross-sectional mode area and $L_{mode}$ is the length of the mode. The beam size may be in the range of 25 µm mm to 500 µm, or 50 µm to 300 µm, 50 µm to 250 µm, 50 µm to 200 µm, 50 µm to 150 µm, 50 µm to 100 µm.

In a further alternative aspects, there is provided a method for producing continuous wave laser output, said method comprising:

providing a resonator cavity providing at least a first reflector and a second reflectors;

providing a laser gain medium located in the resonator cavity for generating a continuous wave fundamental beam at a first optical wavelength;

providing a Raman-active medium positioned in the resonator cavity capable of Raman shifting the first optical wavelength to the second optical wavelength to generate a continuous wave Raman beam at a second optical wavelength providing a first non-linear medium positioned in the resonator cavity capable of frequency converting the second optical wavelength to a third optical wavelength to generate a continuous wave converted beam at the third optical wavelength;

providing a second non-linear medium positioned in the resonator cavity capable of frequency converting the second optical wavelength to a fourth optical wavelength to generate a continuous wave converted beam at the fourth optical wavelength;

optically pumping the laser gain medium with a pump source located external to the resonator cavity to generate the fundamental beam at the first optical wavelength which resonates within the resonator cavity, the first optical wavelength subsequently being Raman shifted to the second optical wavelength by the Raman-active medium, the second optical wavelength being frequency being converted by the first non-linear medium to the third optical wavelength and the third optical wavelength being frequency converted by the second nonlinear medium to the fourth optical wavelength; and outputting the fourth optical wavelength from the resonator cavity to provide a continuous wave laser output.

In further alternative aspects still, there is provided a method for producing continuous wave laser output, the method comprising providing a resonator cavity;

providing at least a first reflector and a second reflector, said first and second reflectors being located at opposite ends of the resonator cavity;

providing a laser gain medium located in the resonator cavity for generating a continuous wave fundamental beam which resonates within the resonator cavity when pumped by a pump beam from a pump source external to the resonator cavity;

providing a solid Raman-active medium positioned in the resonator cavity for Raman shifting the fundamental beam to produce a continuous wave Raman beam which resonates within the resonator cavity;

providing a first non-linear medium positioned in the resonator cavity for frequency converting the continuous wave Raman beam to a converted wavelength to produce a first continuous wave converted beam;

providing a second non-linear medium positioned in the resonator cavity for frequency converting the continuous wave Raman beam to a converted wavelength to produce a second continuous wave converted beam;

outputting the second continuous wave converted beam from the resonator cavity.

In an arrangement of any one of the seventh to seventeenth aspects or alternative aspects, the method may further comprise the step of providing a second nonlinear medium in the resonator cavity for frequency converting either the third optical wavelength, the converted beam or the first converted beam to either a fourth optical wavelength, further converted beam or second converted beam respectively. The resonator cavity may have a high finesse at the wavelength of the third optical wavelength, converted beam or first converted beam and a low finesse at the wavelength of the fourth optical wavelength, further converted beam or the second converted beam respectively. The resonator cavity may have a high Q at the wavelength of the third optical wavelength, the converted beam or the first converted beam and a low Q at the wavelength of the fourth optical wavelength, further converted beam or second converted beam respectively. The resonator cavity may have a finesse and a high Q at the wavelength of the third optical wavelength, converted beam or first converted beam and a low finesse and low Q at the wavelength of the fourth optical wavelength, further converted beam or second converted beam respectively. In a further arrangement, a portion of the resonator cavity may have either or both a high finesse or a high Q at the wavelength of the third optical wavelength, converted beam or first converted beam and either or both a low finesse or low Q at the wavelength of the fourth optical wavelength, further converted beam or second converted beam respectively. The fourth optical wavelength, further converted beam or second converted beam may be in the ultraviolet region of the optical spectrum. The fourth optical wavelength, further converted beam or second converted beam may be in the range of 250 to 400 nm. The fourth optical wavelength, further converted or second converted beam may be in the range of 250 to 300 nm.

BRIEF DESCRIPTION OF THE DRAWINGS

A preferred embodiment of the present invention will now be described, by way of an example only, with reference to the accompanying drawings wherein:

FIG. 4 shows graphs of the amplitude of different wavelengths as a function of time for laser systems operating at different power levels.

DETAILED DESCRIPTION OF THE PREFERRED EMBODIMENTS

Figure 1:
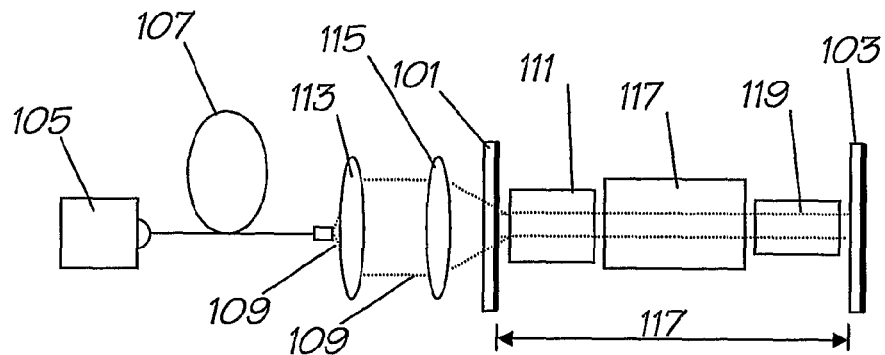
FIG. 1 is a schematic representation of a continuous (cw) Raman laser according to the arrangement of Example 1.

The present invention relates to a frequency-doubled, continuous-wave (CW) Raman laser. The laser may be an all-solid state laser, and may be capable of outputting yellow or orange laser light. The laser described herein is more efficient, simpler and more cost-effective than comparable lasers of the prior art. It may be capable of generating higher output power than lasers that use alternative approaches.

An important feature of the invention is the operation of a frequency doubled crystalline solid state Raman laser in CW mode. This feature is significant as there is a range of laser applications in which pulsed output is not acceptable. The present invention discloses an efficient simple, diode pumped, intracavity doubled (e.g. LBO), Raman-shifted (e.g. KGW) laser using for example Nd:GdVO$_4$ as a laser medium. This is the first CW crystalline Raman laser-based yellow source. The inventors have demonstrated an all-solid-state 320 mW continuous-wave yellow crystalline Raman laser at 588 nm.

In the laser of the present invention, a laser beam is generated within a cavity by a laser material. The laser material may be capable of emitting, in use, a cavity laser beam, when pumped by a pump laser beam. The pump beam may be generated by a pump source, which may be a diode laser. The laser material may be end pumped or side pumped or face-pumped (i.e. in a disk-laser configuration). The pump laser beam may be generated by supplying current to a diode pump laser, such that a portion of the power of the pump laser beam is absorbed by the laser material. There may be one or more collimating lenses and one or more focusing lenses, for collimating and/or focusing the pump beam, and, if present, each lens may be either intracavity or extracavity. The focusing lens may be located between the collimating lens and the laser material. The focusing lens may focus the pump beam on the laser material. The size of the focused beam on the laser material may be given by: $D_{min}=2.44*f*\lambda/D$ where $D_{min}$ is the focal spot size (i.e. the size of the focused beam), f is the focal length of the focusing lens, $\lambda$ is the wavelength of the pump beam and D is the beam diameter of the unfocussed beam. The cavity laser beam is passed to an intracavity Raman-active medium which is capable of generating at least one frequency of Raman laser beam. The Raman-active medium may be capable of generating at least two laser beams of different frequency which may also differ from each other in either polarisation or location or some other property. The system may be fitted with a selector which either promotes resonance of a selected wavelength of laser beam or discourages resonance within the cavity of all but one of the at least two laser beams. This may be by means of a polariser, or by means of motors which orient either a mirror or the Raman-active crystal or both so that only one beam is capable of efficiently resonating, or may be by some other method such as seeding. The selected beam will have greater intensity, and will thus be more effectively frequency shifted by the Raman-active medium. The deselected beam will correspondingly be less effectively frequency shifted. In this manner, power will be concentrated in the selected Raman frequency, said frequency being selectable by the selector. The selected frequency may be directly outputted from the laser cavity, or it may be passed to a non-linear medium, which may be a frequency doubler or a sum frequency generator or a difference frequency generator, for converting the frequency, for example to a visible laser beam, for outputting. The outputting may by means of an output reflector or of a polarizing beam splitter. The output reflector may be an output coupler, for decoupling and outputting an output beam from the cavity.

The laser system of the present invention may be a diode-pumped laser system. It may be an all-solid-state laser system.

In a resonator cavity according to the invention, there may potentially be a plurality of different wavelengths of laser light resonating in the cavity. This may be achieved by selecting the reflectivity of the reflectors which define the cavity such that the resonator cavity is a high Q cavity (i.e. high optical quality factor) for all wavelengths that are required to resonate therein and not a high Q cavity for wavelengths that are outputted from the resonator cavity. Equivalently, the cavity is a high finesse cavity for all wavelengths that are required to resonate therein and not a low finesse cavity for wavelengths that are outputted from the resonator cavity. There may be one or more of a fundamental wavelength, a first Stokes wavelength and a second Stokes wavelength. Further, in cases in which the Raman active medium has two or more Raman shifts, there may be a first and a second Stokes wavelengths from each of the two or more Raman shifted beams generated by the Raman active medium. The laser cavity of the invention may also have a non-linear medium capable of frequency doubling or sum frequency generation or difference frequency generation. Thus each of the above wavelengths may be frequency doubled, or any two may be frequency summed or frequency differenced, depending on the tuning of the non-linear medium. Therefore the present invention may provide means to selectively output a wide variety of different wavelengths from the cavity.

The pump beam may be a beam from a diode laser or from some other pump source. The pumping may be end pumping or side pumping. The power of the output laser beam from the laser system may be dependent on the frequency of the pump laser beam, and the system may have means (such as a frequency controller) for altering the frequency of the pump laser beam in order to alter the power of the output laser beam.

It will be understood by one skilled in the art that the frequency and wavelength of a laser beam are connected by the equation:

Speed of light=wavelength*frequency.

As a consequence, when reference is made to frequency shifting, frequency converting, different frequencies, and similar terms, these are interchangeable with the corresponding terms wavelength shifting, wavelength converting, different wavelengths, and the like.

In constructing a laser according to the present invention, it is crucial that components of the laser are correctly positioned in order to achieve acceptable conversion efficiency to output laser power. The laser according to the present invention may be a solid state laser.

Materials

The materials used for the laser material, the Raman-active medium and the non-linear medium are well known in the art. Commonly neodymium is used as the dopant in the laser material, and suitable laser media include NdYLF, NdYAG, NdYALO and $NdYVO_4$, $NdGdVO_4$ although other dopant ions may be used. Other dopant ions that may be used include ytterbium, erbium and thulium, and other host materials that may be used include YAB, YCOB, KGW and KYW. Examples of suitable Raman-active media include KGW (potassium gadolinium tungstate), KYW (potassium yttrium tungstate) barium nitrate, lithium iodate, barium tungstate, lead tungstate calcium tungstate, other tungstates and molybdates, diamond, gadolinium vanadate and yttrium vanadate and other crystalline materials which are Raman-active. Each of the laser media produces a characteristic output frequency, and each of the Raman-active media produces at least one characteristic Raman shift (to generate at least one characteristic Stokes wavelength). By combining the two types of media, therefore, it is possible to achieve a range of output laser wavelengths. Also, a sum frequency generator may be used to generate additional wavelengths by combining any two of the wavelengths. Thus a wide range of output wavelengths is potentially available. Suitable second harmonic generators may for example be lithium borate or barium borate. Tuning the second harmonic generator may allow an operator to select one of these wavelengths as required. Table 1 shows the Raman shifts for a range of Raman-active media, and Table 2 shows the Raman shifts and corresponding Stokes wavelengths for several Raman-active media.

TABLE 1

Raman shifts for selected Raman-active media

| Raman-active Crystal | Raman shift (cm$^{-1}$) |
|---|---|
| $CaCO_3$ | 1085 |
| $NaNO_3$ | 1066 |
| $Ba(NO_3)_2$ | 1046 |
| $YVO_4$ | 890 |
| $GdVO_4$ | 882 |
| KDP | 915 |
| $NaBrO_3$ | 795 |
| $LiIO_3$ | 822 and 770 |
| $BaWO_4$ | 926 |
| $PbWO_4$ | 901 |
| $CaWO_4$ | 908 |
| $ZnWO_4$ | 907 |
| $CdWO_4$ | 890 |
| $KY(WO_4)_2$ | 765 |
| $KY(WO_4)_2$ | 905 |
| $KGd(WO_4)_2$ | 768 |
| $KGd(WO_4)_2$ | 901 |
| $NaY(WO_4)_2$ | 914 |
| $NaBi(WO_4)_2$ | 910 |
| $NaBi(MoO_4)_2$ | 877 |

TABLE 2

Raman shifts and corresponding Stokes wavelengths for selected Raman-active media

| Crystal | Raman shift (cm$^{-1}$) | 1$^{st}$ Stokes (nm) | 2$^{nd}$ Stokes (nm) | 3$^{rd}$ Stokes (nm) |
|---|---|---|---|---|
| KGW | 768 | 1158 | 1272 | 1410 |
| KGW | 901 | 1176 | 1320 | 1500 |
| $PbWO_4$ | 911 | 1177 | 1316 | 1494 |
| $Ba(NO_3)_2$ | 1048 | 1198 | 1369 | 1599 |
| $LiIO_3$ | 745 | 1156 | 1264 | 1396 |

Each non-linear medium may be configured to select which wavelength will be converted by frequency doubling, sum frequency generation or difference frequency generation.

Examples of materials used for frequency doubling or sum frequency generation include crystalline LBO, LTBO, BBO, KTP, RTA, RTP, KTA, ADP, KD*P, CLBO, $LiNbO_3$ or periodically poled materials such as lithium niobate, KTP, KTA, RTA or other suitable materials. Periodically poled materials may generate frequency doubled or summed frequency outputs through quasi-phase matching. Frequency doubling is most efficient when "phase-matching" is achieved between a wavelength and its second harmonic. A way to configure a non-linear crystal relates to the way the crystal is "cut" relative to its "crystal axes". These crystal axes are a fundamental property of the type of crystal. The crystal may be manufactured with a "cut" to best provide phase-matching between a selected wavelength and its second harmonic. Fine tuning of this phase-matching may be achieved by "angle-tuning" the medium. The angle tolerance may be less than 0.1 degree, and temperature may be maintained within 0.1 degree. These tolerances vary depending on the nature of the crystal. Alternatively the fine tuning may be is achieved by temperature tuning the medium.

A laser according to the present invention may be constructed using separate Raman-active and non-linear media. In this manner, the properties of the individual media may be optimized independently. The inventors have found that in this manner a laser system may be constructed that provides commercially acceptable power output despite the additional insertion loss due to the use of an additional optical component. In selectively providing an output laser beam from this laser system a cavity laser beam is generated within the resonator cavity by pumping a laser material located in the cavity with a pump beam from a pump source located outside the cavity. The wavelength of at least a portion of the laser beam is then shifted by passing the laser beam through a Raman-active medium located in the resonator cavity. A single wavelength (in the case of SHG) or pair of wavelengths (in the case of SFG or DFG) of laser light to be frequency converted is (are) then selected from the various wavelengths resonating in the cavity. The selected single wavelength or pair of wavelengths of laser light is (are) then frequency converted in a separate step, using a tunable non-linear medium to generate a single converted wavelength of laser beam, which may then be outputted from the laser system. The use of separate Raman-active and non-linear media enables the use of materials with higher damage thresholds than a single medium performing both functions, and enables independent optimization of parameters such as position in the cavity for each medium. It also provides access to a wide range of output frequencies, as described below.

A laser according to the present invention may alternatively be constructed using a self-Raman crystal (which performs the dual functions of laser material and Raman shifter) and non-linear media. By eliminating the need for a separate Raman crystal, self-Raman lasers can have important benefits of lower resonator losses and shorter resonators, and these were critical factors in the first demonstration of a diode-pumped cw self-Raman laser by Demidovich [see Demidovich, et al. "Continuous-wave Raman generation in a diode-pumped Nd3+:KGd(WO4)2 laser" Optics Letters, 30, 1701-1703 (2005)] who obtained cw operation of a self-Raman Nd:KGW laser giving first-Stokes output powers of 54 mW for a 1.5 W diode-pump. This laser system, however, did not incorporate frequency doubling. There are two significant potential drawbacks associated with self-Raman lasers however: first, thermal loading of the laser/Raman crystal is exacerbated by the additional thermal loading from the Raman conversion process; and second, there is no flexibility to separately optimize the mode sizes in the laser and Raman crystals as may be required for best efficiency. Choice of self-Raman material is therefore very important—the crystal needs to have good thermal properties as well as a high Raman gain. Of the self-Raman materials reported to date, Nd:KGW, Nd:GdVO$_4$ and Nd:YVO$_4$ are widely available, have good thermal properties, and a moderately high Raman gain coefficient of around 4.5 cm/GW.

The present invention may further/alternatively be constructed using a laser crystal and a is nonlinear media which is also Raman-active and performs the dual functions of Raman shifting and frequency doubling/summing. Suitable crystals include KTP, KDP, RTP, LiIO$_3$, LiNbO$_3$. These crystals may or may not be also be periodically-poled to allow phase-matching over the required wavelength range.

The present invention may further/alternatively be constructed using a single laser crystal which is both Raman-active and a nonlinear medium, and which performs all three functions of generating fundamental laser radiation, Raman shifting and frequency doubling/summing. Suitable crystals include Nd:KTP, Nd:RTP, Nd:LiIO$_3$ and Nd:LiNbO$_3$. These crystals may or may not be also be periodically-poled to allow phase-matching over the required wavelength range.

Location of Elements

It is important for the efficient operation of the laser system described herein that the component parts of the system be located correctly. In particular, the Raman and non-linear media should be located at a position in the cavity where the diameter of the beam to be wavelength converted is sufficiently small to achieve acceptable conversion efficiency.

Thermal lensing arises from the inelastic nature of the stimulated Raman scattering processes. Thus for every scattering event, a small amount of the fundamental photon is deposited as heat in the Raman-active medium. This leads to a non-uniform temperature profile across the Raman-active medium. Commonly, the refractive index of a laser material increases with an increase in temperature, and consequently said laser material acts as a convex lens. Commonly the refractive index of a Raman-active medium decreases with an increase in temperature, and consequently said Raman-active medium acts as a concave (diverging) lens. The combination of these two effects may lead to a complex beam width profile along the resonator cavity. The laser system of the present invention may be operated under conditions in which thermal lensing arises. The thermal lens may impact on the stability characteristics of the laser system. The laser material may have a positive thermal lensing effect and the Raman-active medium may have a negative thermal lensing effect, and the positive lensing effect may be comparable in size to the negative lensing effect. The thermal lensing effect of the components of the laser system may change with a change in pump power. The power of the thermal lens in the laser material is primarily dependant upon the output power of the pump source, the fraction of this power that is absorbed in the laser material, and the size of the pump laser beam inside the laser material. The power of the thermal lens in the Raman-active medium is primarily dependant upon the power of the Raman-shifted beam, the size of the Raman-shifted beam inside the Raman-active medium, the wavelength of the Raman-shifted beam and the Raman shift.

Due to thermal lensing within the different components of the laser system, in addition to curvature of the cavity mirrors and natural diffraction, the beam width of a laser beam within the resonator cavity of the laser system will vary along the length of the cavity as a result of heating effects within the various components. Since the efficiency of the processes occurring in the non-linear medium increases with an increase of the power of the incident laser beam, the location of the non-linear medium is critical to the efficient operation of the system. Furthermore, since the heating of components of the system is due to passage of a laser beam through those elements, the optimum location of the elements will vary both with time during warm-up of the system and with the power of the laser system. A laser system may be designed for a particular output power, and will be designed to operate at peak efficiency after reaching normal operating temperature.

The present inventors have discovered that the resonator stability problems associated with operation of Raman solid-state lasers can be solved by designing a solid-state Raman laser taking into account the thermal lensing power of the laser material and the Raman-active medium.

Thermal lenses are formed in the laser material in the following way. In the process of generating laser output at the fundamental wavelength in the laser material, heat is deposited in the laser material and a temperature distribution is established. Through the thermo-optic coefficient, a variation in refractive index develops across the laser material, which acts to focus (or defocus) light passing through the material, the laser material acting as a converging (or diverging) lens—this is a thermal lensing effect having a focal length $f_L$. The magnitude of $f_L$ decreases with increasing absorbed pump power and for maximum absorbed pump power $f_L=f_L(min)$ i.e. from initial start-up current to maximum operating current, there is a decrease in focal lengths of the laser material. For most laser materials, the laser material acts as a converging lens. In a few materials eg. Nd:KGW or Nd:KYW, the laser materials may act as a diverging lens. In some materials, eg Nd:KGW, the laser material may act as either a diverging or converging lens, depending on the crystal orientation relative to the polarisation of the propagating light.

Thermal lenses are also generated in the Raman-active medium. With frequency conversion by SRS (stimulated Raman scattering) heat is generated inside the Raman-active medium leading to significant lensing effects and a focal length $f_R$. These effects arise from the inelastic nature of the nonlinear process and for every scattering event, a small fraction of the photon energy (7.9% in the case of $LiIO_3$) is deposited as heat in the Raman-active medium. The degree of heating increases with the power generated at the Stokes wavelengths, more specifically for every first or second Stokes photon generated inside the laser cavity, a small but fixed amount of heat is deposited inside the medium. The resulting temperature distribution which is affected by the thermal conductivity of the crystal and the size of the laser beam inside the resonator cavity causes a variation of refractive index across the medium. While the positive thermal lens in for example a Nd:YAG laser material scales approximately linearly with absorbed power from a diode laser, the thermal lens in for example $LiIO_3$ depends on the intracavity power density at the first-Stokes wavelength and any higher order Stokes wavelength. For $LiIO_3$, the thermo-optic coefficient (dn/dT) is $-84.9 \times 10^{-6} K^{-1}$ at a wavelength of 1 micron (according to Optical Society of America Handbook of Optics, ed. Bass, 1995) (over ten times larger than in Nd:YAG and of opposite sign). This means that light passing through the Raman-active medium is caused to diverge as though passing through a conventional lens with focal length "$-f_R$". Based on measurement of the thermal lens by the inventors in an arclamp-pumped $LiIO_3$ Raman laser, the size of the negative thermal lens in $LiIO_3$ may be as short as $-10$ cm (comparable to that in the Nd:YAG medium).

In the case of a self-Raman crystal, there are two sources of thermal lensing, namely SRS process and the laser generation process. As a consequence, thermal loading is greater in self-Raman crystals, and the effects of thermal lensing are typically more extreme than when separate crystals are used.

Both the thermal lenses in the laser material and in the Raman-active medium impact substantially on the stability characteristics of the resonator in a dynamic way. Suitably the position of the laser material and the Raman-active medium in the cavity and/or reflector (mirror) curvatures is such that the laser is capable of stable operation over a sufficiently-wide range of combinations for $f_L$ and $f_R$ including the special case where:
  a) $f_L = f_R = F_{Lmax}$ so that laser action can be initiated) where $F_{Lmax}$ is the focal length corresponding to pump power required for laser action to be initiated (which may be infinite in some configurations, and in other may be a finite value to make the resonator stable), and
  b) $f_R$=infinite, $f_L > f_{L(min)}$ (so that laser action desirably does not cease if SRS ceases).

It will be appreciated by those skilled in the art that there is are a vast number of different solutions with respect to the cavity arrangements of any laser device depending on the requirements of the laser system itself. For example, such solution can be found in:
  1. the case of a folded cavities vs linear cavities;
  2. the cases of different Raman crystals (because they have different thermal properties which affect the focal length $f_R$);
  3. the cases of different laser crystals (which form different $f_L$), and
  4. the cases where the laser is designed to operate at low power or at high power and that solutions relating to these cases are either adequately specified in the description or known to the person skilled in the art and which would not require undue experimentation It will also be appreciated that the conditions (a) and (b) may be directly and positively verified by tests or procedures known by those skilled in the art whereby, condition (a) is inherently satisfied if the laser is operating, and condition (b) can be tested for in a straightforward manner operating the device laser in the absence of Raman scattering. There are well-known straightforward methods the device in which the laser can be operated in the absence of Raman scattering to verify whether or not condition (b) is met, two of which are:

Replacing the Raman laser output coupler with an output coupler configured for operation at the wavelength of the fundamental cavity laser beam ie. with a suitable amount of transmission at 1064 nm, say 1% in the case of an Nd laser to output the 1064 nm light, which in turn decreases the intracavity oscillating power at that wavelength such that any Raman conversion is suppressed since the required threshold power density is not reached.

Interrupting the intracavity laser beam for several seconds (so that $f_R$ drops to zero) and then unblocking the beam. If lasing recommences, then b) is satisfied. If lasing does not recommence then a) is not satisfied.

Suitably a curvature of at least one of the reflectors and/or the positions of the laser material and the Raman-active medium relative to the cavity configuration are such that the focal lengths of the laser material at pump input powers and the focal lengths of the Raman-active medium at the desired Raman laser output power range are maintained within a stable and preferably efficient operating region. In preferred embodiments this can be achieved by optimising the cavity configuration as a function of the focal lengths by in addition to positioning the laser material and Raman-active medium within the cavity and/or selecting a curvature of at least one of the reflectors, optimising one of more of a separation between one or more of the reflectors, the laser material and the Raman-active medium and transmission characteristics of the output coupler.

Additional effects such as gain focussing and self-focussing of the Raman and/or laser beams may affect the resonator stability but these are considered to be of lesser importance than the effects already discussed.

In preferred embodiments the laser is also optimised for given pump powers for optimum mode sizes in the laser gain material and in the Raman gain medium and a non-linear medium and optimum laser output power so as to obtain efficient energy extraction from the laser material as well as efficient conversion through stimulated Raman scattering (SRS) in the Raman-active medium and if present the non-linear medium whilst maintaining cavity stability and avoiding optical damage of the laser components i.e., the various components are matched on the basis of their associated mode sizes. The optimum spot size and power density in the Raman-active medium may be a compromise between maximising the conversion efficiency and avoiding optical damage. The cavity is suitably optimised so that the relative mode size in each of the materials present in the cavity is such so as to provide efficient stable output.

In order for the Raman laser to operate with suitable optimal efficiency the key design parameters (i.e. mirror curvatures, cavity length, positioning of the various components) are suitably chosen so that the resonator mode sizes in the laser material (A), the Raman-active medium (B) and the non-linear medium (frequency-doubling crystal) (C) are near-optimum at a desired operating point and this is discussed more rigorously in the modelling section below.

For the purpose of the present discussion, the beam sizes (radii) in these media may be denoted as $\omega_A$, $\omega_B$ and $\omega_C$ respectively. In cases where the laser beam is not circular, it is commonly elliptical, and the beam size may be considered along the long and short axes of the ellipse. The beam size is taken to be the distance from the beam axis to the point where the intensity of the beam falls to $1/(e^2)$ of the intensity of the beam axis. The beam size may vary along the length of a particular component. The beam size in a particular component may be taken as the average beam size within the component (commonly used for the Raman-active medium) or as the minimum beam size within that component (commonly used for the laser material and for the non-linear medium). $\omega_A$ is suitably mode-matched to the dimension of the pumped region of the laser material i.e., the pump spot size ($\omega_P$). $\omega_P$ can vary according to the power of the pump laser source (e.g., a diode laser) and the pumping configuration. For example a laser crystal end-pumped with a low power (~1 W) diode laser may have a $\omega_P$ of approximately 50-100 μm. A laser crystal end-pumped with a 10-60 W diode laser may have a $\omega_P$ in the range 90 to 700 μm, for example approximately 100 to 700, 150 to 650, 200 to 600, 300 to 400, 250 to 350, 200 to 375, 90 to 400, 400 to 700, 200 to 400 or 400 to 600 μm, and may have a $\omega_P$ about 90, 100, 150, 200, 250, 300, 350, 400, 450, 500, 550, 600, 650 or 700 μm. A laser crystal side-pumped by one or more diode lasers may have a $\omega_P$ in the range of about 500 to 1500 μm. Optimal mode-matching of $\omega_P$ and $\omega_A$ is a suitable pre-requisite for enabling efficient extraction of the gain in the laser material. When $\omega_P$ and $\omega_A$ are mode matched, the pump laser beam spot overlaps with the cavity laser beam within the laser material. If $\omega_A$ is too small, then (i) laser gain may not be extracted efficiently into the TEM$_{00}$ resonator mode and (ii) the laser may oscillate on higher-order modes which are generally not desirable. If $\omega_A$ is too large, then diffraction losses can occur in the resonator due to aberrations in the thermal lens associated with the laser crystal. This effect is undesirable and deleterious for pumping powers approximately $\geq$3 W. The ratio $\omega_A/\omega_P$ may be in the range 0.45 to 1.55, 0.5 to 1.5, 0.6 to 1.4, 0.7 to 1.3, or 0.75 to 1.25 or 0.7 to 1.25 or 0.75 to 1.3 or 0.8 to 1.2 or 0.9 to 1.1 or 0.95 to 1.05. The ratio $\omega_A/\omega_P$ may be about 1.01, 1.02, 1.03, 1.04, 1.05, 1.06, 1.07, 1.08, 1.09, 1.1, 1.12, 1.14, 1.16, 1.18, 1.2, 1.25, 1.3, 1.35, 1.4, 1.45, 1.5, 1.55, 0.99, 0.98, 0.97, 0.96, 0.95, 0.94, 0.93, 0.92, 0.91, 0.9, 0.88, 0.86, 0.84, 0.82, 0.8, 0.75, 0.7, 0.65, 0.6, 0.55, 0.5 or 0.45, or may be equal to or about 1. $\omega_A$ may be greater than or equal to $\omega_P$. The pump spot size may overlap completely with the cavity laser beam within the laser material. When the pump spot size is mode matched to the mode of the cavity laser beam in the laser material in the resonator, the excitation of the fundamental Gaussian (TEM$_{00}$) mode may be the main mode in the resonator cavity, or there may be higher-order transverse modes present. $\omega_A$ may be in the range of about 70 to 850 μm, for example about 100 to 850, 250 to 850, 400 to 850, 550 to 850, 70 to 500, 70 to 300, 70 to 150, 100 to 600, 200 to 500, 100 to 300, 300 to 500, 500 to 700 or 700 to 850 μm, and may be for example about 70, 100, 150, 200, 250, 300, 350, 400, 450, 500, 550, 600, 650, 700, 750, 800 or 850 μm. $\omega_B$ may be optimised for low SRS threshold, while at the same time optical damage to the Raman media is suitably avoided. The optimum value for $\omega_B$ varies from crystal to crystal because (i) different Raman-active crystals have different Raman gains and different thresholds for optical damage. If $\omega_B$ is too large, then the conversion efficiency of the SRS process will be lower than optimum. If $\omega_B$ is too small, then (i) the optical power density in the Raman-active medium can approach the threshold for optical damage in that crystal and (ii) the thermal lens associated with the Raman-active medium may become more aberrated, resulting in increased resonator losses (due to diffraction). Typical values for $\omega_B$ are in the range of about 50-600 μm, and may be in the range of about 100 to 600, 200 to 600, 300 to 400, 250 to 350, 200 to 375, 90 to 400, 100 to 300, 400 to 600, 200 to 400 or 400 to 600 μm, and may be about 90, 100, 150, 200, 250, 300, 350, 400, 450, 500, 550 or 600 μm. $\omega_C$ is suitably optimised for efficient frequency conversion through the frequency doubling or sum frequency generation processes. The optimum value for $\omega_C$ varies according to the type of crystal used. Different crystals have different non-linear coefficients, walk-off angles and damage thresholds. If $\omega_C$ is too large, then (i) conversion efficiency will be lower than optimum; (ii) the optical field at the Stokes frequency can be "under-coupled"—in this case, unwanted non-linear processes such as higher-order Stokes generation and self-focussing can occur. If $\omega_C$ is too small then (i) optical damage can occur to the crystal, (ii) the effective length of the non-linear interaction can become too short due to "walk-off" effects and (iii) the optical field at the Stokes wavelength can be "over-coupled" which can result in reduced conversion efficiency of the SRS process. Typical values for $\omega_C$ are in the range of about 90-600 μm, and may be in the range of about 100 to 600, 200 to 600, 300 to 400, 250 to 350, 200 to 375, 90 to 400, 100 to 300, 400 to 600, 200 to 400 or 400 to 600 μm, and may be about 90, 100, 150, 200, 250, 300, 350, 400, 450, 500, 550 or 600 μm. This discussion assumes that the mode size in A, B and C is the same for optical fields at different wavelengths. In practice $\omega_A$, $\omega_B$ and $\omega_C$ may be slightly different (by <10%) owing to effects such as gain-guiding and self-focussing.

Suitably the mode size (beam size) in the laser material is approximately equal to the pump spot size. Suitably in a Raman-active medium such as a KGW, BaNO$_3$ or LiIO$_3$ crystal the spot size $\omega_B$ is optimised for stable operation and efficient conversion such that $\omega_B$ is similar to or smaller than the beam size $\omega_A$ in the laser material. Suitably the beam size $\omega_C$ in the non-linear medium if present is similar to or smaller than the beam size $\omega_B$ in the Raman-active medium. A preferred situation therefore is when $\omega_A > \omega_B > \omega_C$. Stable arrangements may be achieved in which $\omega_A > \omega_B$ and/or $\omega_B > \omega_C$ and/or $\omega_A > \omega_C$, and/or $\omega_C > \omega_B$.

In spatially-coupled cavity resonators in which there are separate cavities for the cavity laser beam and the Raman-shifted laser beam, there is an additional mode matching requirement, that the cavity laser beam and the Raman-shifted laser beam have similar mode sizes in the Raman-active medium. The ratio of the mode size of the Raman-shifted laser beam in the Raman-active medium to the mode size of the cavity laser beam in the Raman-active medium may be between about 0.5 and 2, or between about 0.75 and 1.5, 0.8 and 1.25 or 0.9 and 1.1, and may be about 0.5, 0.6, 0.7, 0.8, 0.9, 1, 1.1, 1.2, 1.3, 1.4, 1.5, 1.6, 1.7, 1.8, 1.9 or 2. Spatially-coupled resonators can be particularly beneficial for inserting components such as apertures, etalons and birefringent filters into the fundamental resonator without affecting the Raman beam. These components may be used for a number of purposes including controlling the transverse mode structure of the fundamental, controlling the number of longitudinal fundamental modes which oscillate in the cavity, and tuning the wavelength of the fundamental beam.

In preferred embodiments the thermal lens focal lengths for the laser material at the laser input powers and the thermal lens focal lengths of the Raman-active medium at the laser output powers are determined and the position of the laser material and the Raman-active medium in the cavity are selected to ensure that during operation of the laser the resonator is stable. Suitably the thermal lenses for the laser material can be calculated and then confirmed by cavity stability measurement. Alternatively the thermal lenses can be determined by standard measurement techniques such as lateral shearing interferometry measurements which can also provide information on any aberrations [see for example the technique described in M. Revermann et al., "Thermal lensing measurements in an intracavity LiIO₃ Laser", *ASSL Conference Proceedings* February 2000; J. L. Blows et al., "Thermal lensing measurement in line-focus end-pumped neodymium yttrium aluminium garnet using holographic lateral shearing interferometry", *J. Applied Physics*, Vol. 83, No. 6, March 1998; and in H. M Pask et al., "Thermal lensing in a barium nitrate Raman laser", *ASSL Conference Proceedings* February 2001].

Suitably at least the position of the laser material and the Raman-active medium in the cavity are selected such that the combination of the thermal lens powers for the laser and Raman media fall within a stable operating region of a stability plot.

A stability plot of a simple two mirror cavity is a plot of the parameters $g_1$ on the y-axis and $g_2$ on the x-axis of a graph. These parameters can be represented by the equations:

$$g1 = 1 - L/R1 \qquad (1)$$

$$g2 = 1 - L/R2 \qquad (2)$$

wherein L is the distance between the two mirrors, $R_1$ is the radius of curvature of one of the two mirrors and $R_2$ is the radius of curvature of the other.

It has been determined that, for a resonator cavity to be stable, $$0 \leq g_1 \cdot g_2 \leq 1 \qquad (3)$$

If either one of $g_1$ and $g_2$ is negative and the other one is positive, their product is negative and the resonator cavity will be unstable. If both are positive or if both are negative and if their product is less than 1, then the resonator cavity will be stable.

If the thermal lensing effect of the laser material is positive and the thermal lensing effect of the Raman-active medium is negative and if they are of similar magnitude under operating conditions, they can counteract one another to ensure that the resonator cavity remains stable under operating conditions.

In order to ensure that the cavity remains stable at elevated temperatures of the laser material and Raman-active medium, the laser material and the Raman-active medium advantageously have thermal lensing effects of opposite sign, and the length of the resonator cavity and the relative positions of the laser material and the Raman-active medium relative to the mirrors defining the resonator cavity are selected such that the laser modes do not expand to the extent that the radiation suffers large losses. Thus the position of the Raman active medium relative to the positions of the laser material and the at least two reflectors, the length of the cavity, the curvature of at least one of the reflectors that define the cavity, as well as the combination of the focal lengths of the thermal lenses formed in the laser material and the Raman active medium during operation of the laser may be such that the laser resonator (cavity) remains optically stable when the current to the pump laser is increased from zero to a desired operating laser power. The desired operating power may be such that the output power is greater than 1 W.

A suitable stability plot for a two-mirror resonator can be determined as follows. The ray transfer matrix (M) is calculated for a transit of the optical resonator. The elements of this matrix $$M = \begin{bmatrix} A & B \\ C & D \end{bmatrix}$$

enable an equivalent (two-mirror) resonator to be defined with equivalent g-parameters $g_1^* = A$, $g_2^* = D$ and $L^* = B$. The optical system in the resonator cavity may be described by an ABCD matrix which is the product of one or more ABCD matrices, each of which corresponds to an optical element through which light passes. The ABCD law enables one to calculate the change in a Gaussian laser beam as the beam passes through a particular element. The determinant of the matrix M should be unity for a stable arrangement of the resonator cavity, i.e. AD−BC=1. The stability regime for the resonator cavity is where the cavity laser beam obeys the inequality $|S| \leq 1$, where $S = 0.5*(A-D)$. The predominant mode of the cavity laser beam may be a Gaussian beam. A Gaussian beam is one in which the cross-sectional power profile of the beam has a Gaussian distribution. The q parameter of a Gaussian laser beam at a particular position in a resonator needs to satisfy the ABCD law: $q = (Aq+B)/(Cq+D)$. The solutions to this are given by:

$$\frac{1}{q\pm} = \frac{D-A}{2B} \mp \frac{1}{B}\sqrt{\left(\left(\frac{A+D}{2}\right)^2 - 1\right)}$$

The allowed solution should have a negative imaginary component. The q parameter incorporates the mode size and the beam curvature, and is described in detail in the B. E. A. Saleh and M. C. Teich, *Fundamentals of Photonics*, John Wiley and Sons, New York, 1991, the contents of which are incorporated herein by cross-reference. The mode size of the cavity laser beam may be determined along the resonator cavity from the q parameter.

In particular, for a system having a lens of focal length f (i.e. refractive power 1/f) located a distance $d_1$ from a first mirror having radius of curvature $R_1$, and a distance $d_2$ from a second mirror having radius of curvature $R_2$, the elements of the matrix M are:

$$A = g1^*$$

$$B = L^*$$

$$C = (g1^{**}g2^* - 1)/L^*$$

$$D = g2^*$$

where $L^* = d1 + d2 - D^*d1^*d2$ and $g^* = g_i^* - D^*d_j(1 - d_i/R_i)$; i, j=1, 2; i≠j.

Texts describing this method are N. Hodgson and A. Weber, "Optical Resonators", Springer-Verlag London Limited, 1997 and W. Koechner, "Solid-state Laser Engineering", Springer-Verlag, 1992.

The dynamic nature of the Raman laser resonator as the diode current is increased can be simulated by calculating g1* and g2* for suitable combinations of the thermal lenses in the laser and Raman-active crystals. When plotted on a stability plot, a curve can be defined. In a well-designed resonator, this curve will lie in a stable region of the stability plot (ie $0 \leq g1^{**}g2^* \leq 1$) from the point where laser action is initiated to the point corresponding to the desired operating power.

In preferred embodiments a computer model is used to determine suitable cavity configurations for a particular power regime using different combinations of media. In such an embodiment the thermal lensing power for a variety of Raman media crystals can be measured over a wide parameter space of Raman laser output powers and mode sizes and thermally modelled. A standard resonator design program using 2-mirror configurations to more complex folded resonators can then be used to determine the fundamental and Raman laser mode sizes as a function of pump power enabling stable resonators to be designed to produce output powers in specified regions from mWs to multiwatt outputs. The output power may be varied by varying the frequency of the pump laser beam.

In the present context, mode matching is the process of matching the pump laser beam waist in the laser material with the beam waist of the cavity laser beam in the laser material. In order to perform mode matching of the pump laser beam with the cavity laser beam, the ABCD law may be used to determine the mode size of the cavity laser beam in the laser material and the pump laser beam may be focussed onto or into the laser material such that the mode size of the pump laser beam matches or about matches the mode size of the cavity laser beam. An example of mode matching the pump laser beam with the cavity laser beam is provided in PCT/AU01/00906, the contents of which are incorporated herein by cross-reference. Mode matching may be required in order to achieve optimal power from the laser system.

The laser material can be pumped/stimulated by a continuous diode (semiconductor) laser using a side-pumped, single end-pumped or double end-pumped geometry. End pumping of the laser crystal is a very efficient approach to generating Raman laser output or its second harmonic. For example the inventors have demonstrated in earlier work that optical to optical conversion efficiencies as high as about 10% for end pumping with an 18 W output from a fibre-coupled diode laser to produce 1.7 W frequency-doubled KGW Raman laser output at 579 nm. Compared to side-pumped laser crystals, end-pumped laser crystals generally have high gain and the pump spot size in the laser crystal can be adjusted to match the resonator mode size. However end-pumped laser crystals can also give rise to strong (and abberated) thermal lensing, and this ultimately limits the scalability of end-pumped Raman lasers.

Side-pumping of the laser crystal may not result in such high optical-optical conversion efficiency, but it is a cheaper approach, is more easily scalable and enables greater flexibility in where the resonator components can be placed.

The power of the laser beam at each element of the laser system should however be below the damage threshold of that element. Thus the energy of the laser beam in the laser material should be below the damage threshold for that particular laser material, the energy of the laser beam in the Raman active medium should be below the damage threshold for that particular Raman active medium and the energy of the laser beam in the non-linear medium (if present) should be below the damage threshold for that particular non-linear medium. The damage threshold of a particular element will depend, inter alia, on the nature of that element.

The resonator cavity may have a folded or linear configuration or other suitable configuration, for example coupled cavity, Z-cavity, L-cavity. It may have a ring configuration or it may be near concentric. For the case of spatially-coupled resonators, the fundamental resonator may have a ring configuration and the Raman resonator may be a linear or folded resonator. The position of the laser material and Raman-active medium in a chosen configuration are suitably chosen to provide cavity stability for a wide range of combinations of $f_L$ and $f_R$.

The laser material suitably generates laser beams at a fundamental wavelength (1064 nm for Nd:YAG) when stimulated by pump light of an appropriate wavelength, and the fundamental laser beam then propagates inside the laser resonator. Suitably the laser material is formed by one of the following crystals: Nd:YAG, Nd:YLF, Nd:glass, Ti-sapphire, Erbium:glass, Ruby, Erbium:YAG, Erbium:YAB, Nd:YAlO$_3$, Yb:YAlO$_3$, Nd:SFAP, Yb:YAG, Yb:YAB, Cobalt:MgF$_2$, Yb:GdVO$_4$, Nd:GdVO$_4$ Yb:YVO$_4$, Nd:YAB, Nd:YVO$_4$, Nd:YALO, Yb:YLF, Nd:YCOB, Nd:GdCOB, Yb:YCOB, Yb:GdCOB or other suitable laser material. The laser material may be broadband AR-coated for the 1-1.2 micron region to minimise resonator losses. Optionally the laser material is wavelength tunable and capable of generating high power output which can be mode-locked.

The Raman-active medium suitably enables the fundamental radiation to be converted to first (or higher) Stokes wavelength through the nonlinear process Stimulated Raman Scattering (SRS). Depending on application, the Raman-active medium suitably converts the fundamental wavelength to the first Stokes wavelength, to the second Stokes wavelength or to a higher Stokes wavelength. The Raman-active medium may be broadband AR-coated for the 1-1.2 micron region to minimise resonator losses. The Raman-active medium is suitably chosen on the basis of high transmission at the fundamental and Stokes wavelengths, useful Raman shift, fairly high Raman cross-section, high damage threshold and availability in lengths exceeding 1 cm and chosen such that the Raman gain is adequate. The Raman-active medium may be a crystal, and may be a single crystal. The length of the crystal may be between 0.1 and 9 cm long, and may be 1-7 cm long. A typical dimension of the crystal is 0.5×0.5×y cm where y is crystal length and is in the range 1-7 cm. Longer crystal lengths may be used where higher output powers are desired since the Raman gain coefficient is proportional to the length of the Raman gain medium. Alternatively a longer path through the Raman-active medium can be achieved using a multipass of zigzag geometry (for example described U.S. Pat. No. 5,673,281 to Byer). Suitably the Raman-active medium is a single crystal of KGW, LiIO$_3$, Ba(NO$_3$)$_2$ or other suitable Raman active material such as KDP (potassium dihydrogen phosphate), KD*P (deuterated), KTP, RTP, YVO$_4$, GdVO$_4$, BaWO$_4$, PbWO$_4$, lithium niobate, and various tungstates (KYW, CaWO$_4$) and molybdate or vanadate crystals. Other suitable Raman active crystals are described in the CRC Handbook of Laser or the text "Quantum Electronics" by Pantell and Puthoff. KGW, LiIO$_3$ and Ba(NO$_3$)$_2$, YVO$_4$, GdVO$_4$, are preferred. KGW is a biaxial crystal with a high damage threshold, and is capable of providing Raman shifts of 768 and 901 cm$^{-1}$. Ba(NO$_3$)$_2$ is an isotropic crystal with a high gain coefficient (11 cm/GW with 1064 nm pump) leading to low threshold operation and can provide a Raman shift of 1048.6 cm$^{-1}$. LiIO$_3$ is a polar uniaxial crystal with a complex Raman spectrum which depends on the crystal cut and orientation with respect to the pump propagation direction and polarisation vectors and can provide Raman shifts of between 745 cm$^{-1}$ and 848 cm$^{-1}$ (which are useful when targeting wavelengths for specific applications for example 578 nm which is useful for medical applications including ophthalmology and dermatology) but has a lower damage threshold (about 100 MW/cm$^2$) compared with Ba(NO$_3$)$_2$ (about 400 MW/cm$^2$). KGW has a far higher damage threshold of about 10 GWcm$^{-2}$. YVO$_4$, GdVO$_4$, are uniaxial crystals which feature good thermal properties, high Raman gain coefficients and high damage threshold. KGW, Ba(NO$_3$)$_2$ and LiIO$_3$ YVO$_4$, and GdVO$_4$, all have good slope efficiencies (determined by the ratio of Stokes to fundamental photon energies) with optical to optical conversion efficiencies of 70-80% being reported for all three. The laser system is preferably operated such that optical damage of the Raman active medium is avoided.

The following laser material/Raman-active medium combinations may be particularly desirable: Nd:YAG/LiIO$_3$, Nd:YAG/Ba(NO$_3$)$_2$, Nd:YAG/KGW, NdGdVO$_4$/LiIO$_3$, NdGdVO$_4$/Ba(NO$_3$)$_2$, NdGdVO$_4$/KGW, NdYVO$_4$/LiIO$_3$, NdYVO$_4$/Ba(NO$_3$)$_2$, NdYVO$_4$/KGW and Nd:YLF/CaWO$_4$. It will be appreciated by the skilled addressee that other combinations of materials may also be desirable depending on the design of a particular laser system. A solid non-linear medium is used for frequency doubling the Raman laser beam to produce an output at its second harmonic or other sum frequency or different frequency wavelength. The solid non-linear medium may be located in the cavity (intra cavity doubled—doubling crystal located inside the resonator) Suitably a folded resonator is used, or a linear resonator is used which incorporates an intracavity mirror which transmits the resonating beams (fundamental and Raman) and reflects the visible beam. Suitable solid non-linear mediums include a second harmonic generator (SHG), a sum frequency generator (SFG) or a difference frequency generator (DFG). As examples of non-linear medium mention can be made of LBO, KTP, RTP, BBO, LiIO$_3$, KDP, KD*P, KBO, KTA, ADP, LiNbO$_3$ (lithium niobate) or periodically-poled LiNbO$_3$ or combinations thereof (e.g. to generate green and yellow lasers simultaneously). Suitably a LBO, BBO or KTP crystal is used. The light can be frequency doubled or frequency summed by angle-tuning and/or controlling the temperature of the solid non-linear medium. In preferred embodiments the light is frequency doubled so as to generate yellow light. Typical variations in the visible wavelength with a LBO crystal cut for type 1 non-critical phase-matching with temperature tuning to approximately 149° C., 40° C. or 0° C. include 532 nm (green), 578-580 nm (yellow) and 632-636 nm (red). By such frequency doubling it may possible to generate wavelengths in the yellow or orange spectral region suitable for dermatological, ophthalmic, biomedical, remote sensing and visual display applications, and by means of other processes such as sum frequency generation, still further wavelengths may be generated. The resonator design may be such that the size of the laser beam in the doubling medium is sufficiently small to allow efficient conversion and high output powers but large enough to avoid optical damage. Suitably the solid non-linear medium is AR-coated to minimise losses in the 1-1.2 micron region and in the visible where possible. A suitable AR coated LBO crystal for intracavity use is 4×4×10 mm and for extracavity use is 4×4×10 mm although other sizes can be used.

Preferably the resonator cavity is defined by at least two reflectors which can be two mirrors at least one of which is curved to provide a stable output laser beam (the other mirror may be flat). Other suitable reflectors that can be used in the present invention include prisms or gratings. More preferably at least two curved mirrors are used, although it is possible to use more than two mirrors. In the case of spatially-coupled resonators, different sets of mirrors may be used to resonate the fundamental laser beam and the Raman-shifted beam. One or more mirrors may be common to both resonators. An additional mirror can included in a linear cavity configuration, for example a dichroic mirror which is highly transmissive at the fundamental and Raman-shifted wavelengths, and highly reflective at the wavelength of the frequency converted beam. The advantage of this intracavity mirror is that the frequency converted output, which occurs in two counter-propagating beams, can be mostly output through the output coupler. Additional mirrors may be used as cavity folding mirrors, which may be dichroic, and which serve as output couplers for the frequency converted beam, while serving to resonate the fundamental and Raman-shifted beams. Suitable reflectors defining the resonator cavity can be coated to enable operation at lower Raman thresholds for the first Stokes order thereby helping to suppress higher-order Stokes generation and self-focussing. The mirrors may also be coated to have high transmission at the output wavelengths of interest. Reflectors can be provided with special dielectric coating for any desired frequency. The mirrors can provide for the laser output to be coupled out of the cavity such as by use of a broadband dichroic mirror transmissive at the frequency of the output beam but suitably highly reflective at other frequencies so as to cause build-up of the power intensities of the beams in the cavity.

Alternatively a polarisation beam splitter can be used to outcouple the laser output. The radius of curvature and separation between the reflectors (cavity length) and transmission characteristics of the outcoupling mirror are suitably chosen to provide cavity stability for a sufficiently wide range of combinations of $f_L$ and $f_R$. The radius of curvature of the reflectors are appropriately selected on the basis of the Raman-active and laser crystal used (for some Raman-active crystals positive effective lens powers of the reflector are desirable and for others negative effective lens powers of the reflectors are desirable). Suitably the mirrors are chosen so as to be greater than 99% reflective at the laser wavelengths. The output mirror may be chosen (to optimise the first Stokes output) to be 10 to 90% reflective at the Raman wavelength with the other mirror being greater than 99% reflective at the Raman wavelengths. The laser resonator cavity is suitably a stable resonator which supports the TEM$_{00}$ mode. For the intracavity-doubled laser, all mirrors/reflectors are suitably chosen to be >99% reflective at the fundamental wavelength and the Raman wavelengths. The frequency-doubled laser beam is suitably coupled out of the resonator through a dichroic mirror—i.e., a mirror which has high transmission at the frequency-doubled wavelength but high reflectivity at the fundamental and Raman wavelengths. Preferably the resonator has three or more mirrors/reflectors and is configured so that the frequency-doubled or frequency summed beams which are generated in both directions in the non-linear medium can be extracted efficiently in a single beam. In such a configuration, the end mirror closest to the non-linear medium will have high reflectivity at the frequency-doubled wavelength.

Suitably the transmission characteristics, radius of curvatures and separation of the reflectors are tailored to achieve efficient and stable operation of the Raman laser and when a solid non-linear medium is used, to generate output at the visible wavelengths by frequency doubling or sum frequency generation in the non-linear medium. Suitably the curvature of the reflectors and cavity length are optimised to obtain the desired mode diameter such that near-optimum beam sizes are achieved simultaneously in the laser material, the Raman-active medium and the solid non-linear medium such that changes in the focal lengths of the laser material and the Raman-active medium as a result of thermal effects in the laser material and the Raman-active medium during operation of the laser do not cause the laser modes to expand to the extent that the radiation suffers large losses. The laser material, Raman-active medium and the non-linear medium can be positioned in the cavity as discrete elements. Alternatively one or more of the components can be non-discrete, one component performing the dual function of both the laser material and the non-linear medium (such as self-frequency doubling or self doubling materials such as Yb:YAB and Nd:YCOB) or performing the dual function of the laser material and the Raman-active medium (Nd:KGW) or the dual function of the Raman-active medium and the non-linear medium (such as by use of a non-centrosymmetric crystal such as LiIO$_3$).

At least one polariser may be included in the cavity and may be one or two plates of glass at Brewsters angle and/or a cube or other polariser. Such polarisers cause the fundamental to lase on only one linear polarisation. Some polarisation discrimination can also be introduced through the use of mirrors at non-normal incidence.

Reflectors

The transmission properties of the dielectric coatings on the cavity reflectors may be optimized to suit the output wavelength(s) of the laser system. Thus for example when the system comprises a non-linear medium for converting the frequency of the laser beam outputting from the Raman-active medium, the reflector may be transmissive for the converted frequency and reflective for all other frequencies generated in the cavity. This may be achieved by selecting the reflectivity of the reflectors which define the cavity such that the cavity is a high optical Q (high finesse) cavity for all wavelengths that are required to resonate therein and not a high q (i.e. a low Q or low finesse) cavity for wavelengths that are outputted from the resonator cavity. Equivalently, the cavity is a high finesse cavity for all wavelengths that are required to resonate therein and not a low finesse cavity for wavelengths that are outputted from the resonator cavity.

The resonator cavity finesse F at a particular wavelength is related to the round trip loss of the resonator at that wavelength and can be determined from the equation:

$$F = \frac{\pi\sqrt{(1-L_\lambda)}}{L_\lambda}$$

where $L_\lambda$ is the loss of the resonator cavity at a particular wavelength which comprises factors from the mirror transmitivity/loss (or alternatively the mirror reflectivity) at that wavelength as well as other resonator losses (i.e. scattering/reflection losses from the elements of the resonator cavity or other round-trip losses). FIGS. 37A to 37D show examples of the finesse as a function of the resonator loss. A high finesse cavity will generally have F greater than about 100 at the particular wavelength of interest. In other arrangements the high finesse may be greater then F=500 or greater than F=1000. A low finesse (low Q) cavity will typically have F less than about 5. The finesse F may be directly related to the cavity optical quality factor (cavity optical Q factor) by the relations $$Q = 2\pi \frac{StoredEnergy}{EnergyLostPerCycle}$$
$$= \frac{\omega_o}{\Delta\omega}$$

and $$F = \frac{\Delta\omega}{\partial\omega}$$
$$= \frac{\omega_o}{\partial\omega} \cdot \frac{\Delta\omega}{\omega_0}$$
$$= Q \cdot \frac{\Delta\omega}{\omega_o}$$
$$= Q \cdot \frac{T}{t_{RT}}$$
$$= 2\pi \frac{StoredEnergy}{EnergyLostPerRoundTrip}$$

where $\omega_o$ is the resonance frequency of the cavity, $\partial\omega$ is the linewidth (FWHM) of the resonance at the cavity resonance frequency, $\Delta\omega$ is the free spectral range of the cavity, $T=2\pi/\omega$ is the optical cycle time, $t_{RT}=k_o\cdot 2d/\omega_o=(2\pi n/\lambda_o)\cdot(2d/\omega_o)$ is the cavity round trip time, and $k_o$ is the wavevector of the travelling wave in the cavity. Note that for the present discussion, the skilled address would be able to discern the wavelength or resonance frequency for use in the above equations when referring to either the fundamental, Raman, or the frequency doubled beams as appropriate. Further information on the Q and the finesse of a resonator may be found in a number of texts (such as for example Koechner "Solid State Laser Engineering, 5$^{th}$ Ed. Chapters 3 and 5).

In general, the cavity Q relates to the number of optical cycles (times 2π) before the energy stored in the cavity decays to 1/e of its original value. Similarly, the finesse relates to the number of round trip (times 2π) before the energy stored in the cavity decays to 1/e of its original value. Therefore, the Q and finesse are similar but different figures of a resonator cavity. For example, for a resonator cavity where the losses are dominated by mirror losses, then the cavity Q can be increased by increasing the cavity length, whereas the finesse is independent of the cavity length. Both finesse and Q, however are figures of merit for the light circulation capabilities of the resonator cavity, and the circulating powers (P$_{circ}$ in Watts) and intensities (I$_{circ}$ in Watts/cm$^2$) in the cavity can be related to both the finesse and the cavity Q:

$$P_{circ} = \frac{F}{2\pi} P_{in}$$

and $$I_{circ} = \frac{P_{circ}}{A_{mode}}$$

where $A_{mode}$ is the mode area of the beam in the resonator. Therefore, it can readily be seen that a high intensity can be achieved by either increasing the circulating power (by increasing the finesse) or by decreasing the mode area.

Therefore, by adjusting the cavity Q, the finesse F or the mode area of the relevant beams in the resonator cavity (ie the fundamental or Raman), at certain locations in the cavity (i.e in the Raman crystal or the nonlinear crystal in particular), high intensities may be realised in the relevant crystals for efficient laser operation at a desired wavelength. In particular, high a high circulating intensity of the Raman shifted beam may be realised in the non linear crystal disposed in the cavity to realise efficient e.g. >2% or between 2 and 50%, 2 and 40%, 2 and 30%, 2 and 20%, 2 and 10% or 2 and 5%, non linear conversion of the Raman beam (the non linear medium frequency converts non linearly the conversion efficiency increases with increasing intensity of the Raman beam in the non linear medium).

Resonator Configuration

The methods described for wavelength selection may be applied to Raman lasers constructed using a variety of resonator designs, including coupled cavity resonators, shared intracavity resonators and self-Raman resonators.

Wavelength Selection

The present invention envisages a variety of methods in which to select the predominant Raman-shifted frequency that will resonate within the cavity. These methods include:

Seeding:

Seeding may be used when the Raman-active crystal has a spontaneous Raman spectrum which includes 2 or more sufficiently strong peaks, corresponding to two or more Raman shifts. A Raman-active medium that is capable of producing more than one Stokes wavelength may be seeded by irradiating it with a seed beam of the desired wavelength, said wavelength being one of the Stokes wavelengths of the Raman-active medium. This causes the Raman-active medium to convert most or all of the photons reaching it from the laser material to the wavelength of the seed beam. Therefore the wavelength of the output laser light beam may be selected by selecting an appropriate wavelength of seed beam. For example, to produce a yellow output laser light beam at 579 nm from a system comprising a NdYAG laser material with a KGW Raman-active medium, a seed beam at 1158 nm applied to the KGW crystal would cause it to direct a laser beam of 1158 nm to the non-linear medium. If, for example, the non-linear medium is a frequency-doubling crystal, this would generate the selected yellow output laser light beam at 579 nm. Alternatively, if a seed beam at 1176 nm were applied to the KGW crystal, it would cause it to direct a laser beam of 1176 nm to the non-linear medium. Frequency doubling by the non-linear medium would then generate an output laser light beam at 588 nm. The seed laser may be a low power diode laser or it may be an LED or it may be some other type of seed laser. Low powered diode lasers are readily available at the desired wavelengths. The power of the seed beam should be sufficient to cause one Raman transition to reach threshold and significantly deplete the fundamental field in order to prevent the other Raman transition from reaching threshold. The seed power may be between 1 µW and 10 mW, or between 10 µW and 1 mW or between 100 µW and 500 µW, and may be about 1, 2, 5, 10, 20, 50, 100, 200, 300, 400, 500, 600, 700, 800 or 900 µW or about 1, 2, 3, 4, 5, 6, 7, 8, 9 or 10 mW, or it may be below 1 µW or it may be above 10 mW. The angle of incidence of the seed beam is not critical, although higher seed powers may be required if the seed power is injected off-axis. The seeding may involve seeding with a polarized beam. This causes the Raman-active medium to convert most or all of the photons reaching it from the laser material to the polarization of the seed beam. Therefore the polarization of the output laser light beam may be selected by selecting an appropriate polarization of seed beam. Since a particular polarization is associated with a particular frequency, this will in turn select the particular frequency of output laser light.

Birefringence

A birefringent Raman-active crystal may produce different Stokes wavelengths which are shifted spatially relative to each other. If the reflector that defines the output end of the laser system is curved, that reflector may be oriented so that only one Stokes wavelength is capable of resonating within the resonator cavity. By altering the orientation of that reflector and/or of the Raman-active crystal, a particular wavelength of output laser light may be selected. In the case where the fundamental beam is unpolarised, a preferred method may be to leave the Raman-active crystal fixed and move the mirrors to choose the particular Stokes frequency. In the case where the fundamental beam is polarised, it may be preferred to rotate the Raman-active crystal and adjust the mirror in order to optimise the resonance of the desired wavelength of laser light.

Polarisation Selection

A Raman-active crystal may be capable of producing a different Stokes wavelength in response to different polarisations of incident laser light. If the incident laser light is unpolarised, such a crystal would produce two separate wavelengths of output laser light, each polarised orthogonally to each other. However if the incident laser light is polarised, then only one Stokes wavelength is produced, and consequently only one frequency of output laser light beam is generated from the system. The polarizer, which polarises the light resonating within the resonator cavity, may be a mechanically rotatable polariser, or it may be a Faraday rotator or an electro-optic rotator whereby selecting the polarisation is accomplished electronically. By rotating the polarisation of the polariser, a wavelength of output laser light from the laser system may be selected.

Direct Wavelength Selection

A wavelength selector for directly selecting the wavelength to be outputted may be incorporated in the cavity of the invention. The wavelength selector may be for example an optical filter, a prism, a grating, an etalon, an interference filter or some other element for selecting the wavelength of laser light to be outputted from the resonator cavity. In this case, the selected wavelength will be outputted from the cavity, and those wavelengths not selected will be suppressed or continue to resonate within the cavity until, through the various wavelength conversion process occurring in the cavity, they are converted to the selected wavelength and outputted from the cavity. The output coupler may comprise one of the reflectors that define the cavity, and may be selectively transmissive for particular wavelength ranges. For example the output coupler may only transmit the two second Stokes wavelengths, and may reflect the fundamental and first Stokes wavelengths. The wavelength tunable element, or some other element, may then be used to select between the two second Stokes wavelengths. In this manner, the output coupler may be a component of the selector which is used to select the wavelength to be outputted from the cavity.

Tuning

The laser of the present invention includes a non-linear medium for frequency converting the output laser beam from the Raman-active medium. It may be desirable to tune the non-linear medium in order to enable it to convert a particular frequency of laser light. Suitable methods to tune the non-linear medium to a particular frequency include:

Angle Tuning

A birefringent crystal may be responsive to different wavelengths of incident light at different angles. Thus if an incident beam comprises more than one wavelength of light, the wavelength that is shifted by the crystal may be selected by rotating the crystal. For example, an NdYAG laser material may produce a beam at 1064 nm wavelength. If this is directed to a KGW Raman-active crystal, the KGW crystal may produce both 1158 nm and 1272 nm Stokes wavelengths. If this output beam is directed to a second harmonic generator crystal, either the 1158 nm input wavelength or the 1272 nm wavelength may be selectively converted to its second harmonic. Consequently rotating the crystal can select between output wavelengths of either 579 nm or 636 nm (being the second harmonics of 1158 and 1272 nm respectively). A disadvantage of this method is that the beam waist for an 1158 nm beam will be in a different position to that for a 1272 nm beam due to thermal lensing effects. Thus the position of the crystal may be chosen to be a compromise between the two optimum positions, or to favour the beam whose output power is the most critical for the end application. Alternatively, a device may be provided to move the crystal to the optimum position when selecting a particular wavelength of output laser light. A further disadvantage of this method is that the reflectors may need to be retuned when switching between wavelengths of output laser light.

Temperature Tuning

It is possible to tune the wavelength to which a non-linear medium will respond by altering the temperature of the non-linear medium. Thus, in the example of a NdYAG laser material with a KGW Raman-active medium, a non-linear medium may receive an input beam comprising 1064, 1158 and 1272 nm wavelengths. At 150° C., the crystal may be responsive to 1064 nm laser light to produce a green output beam at 532 nm, at 40° C. it may be responsive to 1158 nm laser light to produce a yellow output beam at 579 nm, and at 0° C. it may be responsive to 1272 nm laser light to produce a red output beam at 636 nm. A disadvantage of this method is that the thermal mass of non-linear medium causes the changing between different output laser light wavelengths to be slower than for other methods. In addition, there may be practical problems with resistance of materials of construction to high temperatures, and with condensation caused by sub-ambient temperatures. As with angle-tuning, the location of the non-linear medium must be a compromise between the optimum positions for the different wavelengths.

In a variation of temperature tuning, the non-linear medium comprises a single non-linear medium, in which the non-linear medium is cut such that it may be temperature tuned to convert a first frequency of incident laser light passing through the medium at a first angle, or a second frequency of incident laser light passing through the medium at a second angle. The tuner may comprise a temperature tuner for temperature-tuning the non-linear medium in order to select which frequency of incident laser light is converted. Thus for example, the non-linear medium may comprise a crystal cut so that it is capable of doubling the fundamental frequency at the unreflected (incident) angle when held at a first temperature, and is capable of doubling the first Stokes frequency at the reflected angle when held at a second temperature. In this case, when the crystal is maintained at the first temperature, the fundamental will be doubled to form a visible frequency which may be outputted from the cavity. When the crystal is maintained at the second temperature, the fundamental frequency will resonate in the cavity and be converted by the Raman-active medium into the first Stokes wavelength, which may then be doubled by the crystal to generate a visible output frequency. This variation is similar to the multiple crystal method described below, whereby the multiple crystals are represented by two different angles within the same crystal. The bounce angle may be between about 1 and about 45°, or between about 1 and 30, 1 and 20, 1 and 20, 1 and 10, 1 and 5, 5 and 45, 20 and 45, 30 and 45, 2 and 10, 3 and 8, 4 and 7 or 4 and 6°, and may be about 1, 2, 3, 4, 5, 6, 7, 8, 9, 10, 15, 20, 25, 30, 35, 40 or 45°. In this case the bounce angle is defined as the angle between the incident beam and the surface from which it reflects. The angle between the incident beam and the angle of the crystal may be less than about 10°, or less than about 8, 6, 4 or 2°, and may be about 0, 1, 2, 3, 4, 5, 6, 7, 8 9 or 10°. The angle by which the beam is deflected by reflection within the crystal may be between about 1 and 90°, or between about 1 and 60, 1 and 40, 1 and 20, 1 and 10, 10 and 90, 40 and 90, 60 and 90, 4 and 20, 6 and 16, 8 and 14 or 8 and 12°, and may be about 2, 4, 6, 8, 10, 12, 14, 16, 18, 20, 30, 40, 50, 60, 70, 80 or 90°. The temperature difference between the two temperatures to which the crystal may be tuned may be less than about 50° C., or less than about 40, 30, 20, 10 or 5° C., and may be between about 5 and 50, 10 and 50, 20 and 50, 5 and 40, 5 and 20, 5 and 10, 10 and 40, 10 and 20, 20 and 40, 15 and 30 or 15 and 25°, and may be about 5, 10, 15, 20, 25, 30, 35, 40, 45 or 50°.

The cut of the crystal may affect the magnitude of the temperature difference between the two temperatures to which the crystal may be tuned. It will be understood that for a particular crystal axis, the wavelength of output will be a function of temperature. By choice of appropriate crystal cut, the curves of wavelength vs temperature for the different crystal axes may overlap. As a result, it may be possible to obtain two different frequencies of converted (e.g. visible) laser light at a single temperature, and consequently the laser system may be capable of producing multiple output frequencies simultaneously.

Multiple Crystals

A method to overcome at least some of the disadvantages of angle-tuning and of temperature-tuning comprises the use of a plurality of individual non-linear media. Each of the individual non-linear media may be composed of the same material as each of the others, or they may be composed of different materials or some may be composed of the same material and others may be composed of a different material. In this method, an individual non-linear medium may be located at or near the beam waist of each wavelength of output from the Raman-active medium. In the example of a NdYAG laser material with a KGW Raman-active medium, this output comprises two Stokes wavelengths (1158 nm and 1272 nm) as well as the laser material wavelength (1064 nm). Since non-linear media need to be maintained at the correct temperature to be active (as described above), it is possible to detune an individual non-linear medium by altering its temperature. The change in temperature required to do so is quite small, and consequently the problems described above, associated with large temperature changes, may be avoided. The temperature change to detune a crystal may be less than about 30 Celsius degrees. It may be between about 0.1 and 30 Celsius degrees, or between about 0.5 and 20 or between about 0.5 and 10 or between about 1 and 30 or between about 10 and 30 or between about 1 and 10 or between about 2 and 10 or between about 5 and 10 Celsius degrees, and may be about 0.1, 0.2, 0.5, 1, 2, 3, 4, 5, 6, 7, 8, 9, 10, 12, 14, 16, 18, 20, 25 or 30 Celsius degrees or it may be greater than about 30 Celsius degrees. Thus a wavelength of output laser light may be selected by tuning only the individual non-linear medium that corresponds to that wavelength. For example a green output at 532 nm may be selected by maintaining the individual non-linear medium responsive to 1064 nm (the laser material wavelength) at the correct temperature for tuning, and detuning the other individual non-linear media.

Self-Raman Lasers

A subgroup of intracavity Raman lasers are the self-Raman lasers, in which the laser crystal is also Raman-active. Self-Raman laser action in Q-switched devices has been investigated for a variety of media, of which the most promising are $Nd:GdVO_4$, $Nd:YVO_4$, $Nd:PbMoO_4$ and $Nd:KGd(WO_4)_2$. All of these have been acousto-optically or passively Q-switched. By eliminating the need for a separate Raman crystal, self-Raman lasers can have important benefits of lower resonator losses and shorter resonators, and these are critical factors in a diode-pumped cw self-Raman laser system. There are two significant drawbacks associated with self-Raman lasers however: first, thermal loading of the laser/Raman crystal is exacerbated by the additional thermal loading from the Raman conversion process; and second, there is no flexibility to separately optimize the mode sizes in the laser and Raman crystals as may be required for best efficiency. Choice of self-Raman material is therefore very important—the crystal needs to have good thermal properties as well as a high Raman gain. Of the self-Raman materials reported to date, Nd:GdVO$_4$ and Nd:YVO$_4$ are widely available, have good thermal properties, and a moderately high Raman gain coefficient of around 4.5 cm/GW.

Dynamics of Simultaneous Raman Shifting and Frequency Conversion Laser Sources

Design and realisation of laser sources based on simultaneous Raman and frequency conversion depends on a full understanding of the dynamics and interplay between the non-linear processes, the conversion of the diode pump power into power at the fundamental laser wavelength, and their dependence the crystalline materials chosen. The investigations disclosed herein provide new insight into this complex system, and enable the design of a new class of important laser sources with low amplitude noise and high spectral purity. The following investigations form the basis for this section of work:

Material Studies

In all laser devices the Raman material must be chosen after considering a number of inter-related factors: if the Raman gain is low, a long crystal length may be required, limiting resonator design; high Raman gain however is normally associated with potentially undesirable narrow gain-linewidth. An example of sample Raman materials that may be used include KGdWO$_4$, BaWO$_4$, Ba(NO$_3$)$_2$, GdVO$_4$, and YVO$_4$. The use of synthetic diamond in Raman lasers is also nearing maturity as high quality samples become available and may also be a suitable material for use in a further arrangement of the laser systems disclosed below.

Complete information about these Raman materials is an important first step and detailed study of the spontaneous Raman spectrum of each, using a microRaman spectrometer, looking at the Raman gain and linewidth as a function of temperature and orientation is highly beneficial when designing a Raman laser system. Also knowledge of low-level impurities in the laser and Raman crystals is also beneficial to identify and eliminate the source of extra thermal loads that may be due to absorption of trace impurities. Ensuring the lowest possible scattering losses in the laser, Raman, and doubling materials is also vital to increasing the efficiency of operation.

Temporal and Spectral Investigation

CW devices with simultaneous intracavity Raman conversion and frequency doubling such as those systems disclosed herein have revealed that the laser operates with fundamental and stokes bandwidths of more than half a nanometer wide. Spectra averaged over 50 milliseconds show strong time-varying modulations. Independent temporal measurements show 10-20% amplitude fluctuations, with unstable transverse and longitudinal mode beating. Fast high-resolution spectrographs with microsecond acquisition times are used to study the dynamics and correlations between the stokes and fundamental spectra, with comparisons made with and without SRS and intracavity doubling. Spectrometers with 0.1 nm resolution are used, with etalons and fast CCD cameras available for monitoring narrower spectra. Also, theoretical investigation to address the causes of the broad fundamental and stokes spectra despite homogeneous broadening of the laser and stokes gain is also highly beneficial. Alongside experiments, the theoretical analysis is used to confirm and drive understanding of the importance of the width of the Raman spectrum and the gain spectrum on output bandwidth and stability: various gain materials (Nd:YAG, Nd:YVO$_4$, Yb:YVO$_4$) combined with Raman crystals such as Ba(NO$_3$)$_2$ (linewidth 0.4 cm$^{-1}$) and KGW (linewidth 5.4 cm$^{-1}$) are particularly useful here. This will reveal methods to stabilise the spectra of the multi-mode devices discussed below—achieving stable operation may be achieved for example by judicious choices of materials, correct choice of the relative strengths of the gain and non-linear interactions to achieve a stable equilibrium, or by using broad or fine frequency control such as birefringent filters, etalons or coupled cavities.

Temporal stability is of course intricately linked to both broad spectral fluctuations as well as competition and fluctuations between longitudinal and transverse modes and operation on a single transverse mode will likely be a requirement for achieving amplitude stability. Active amplitude stabilisation on kHz timescales and slower may be achieved by suitable high-bandwidth feedback to the diode controller. Temporal stability on MHz and GHz timescales due to competition between cavity modes is a complex problem, particularly for intracavity doubled lasers that are well known to be prone to strong "green problem" modulations in the output power. Early indications suggest that a similar "yellow problem" instability operates for intracavity doubled Raman lasers—the yellow problem is complicated by the additional intracavity non-linear processes of Raman conversion, introducing another level of self- and cross-saturation and recovery lifetimes. Following similar approaches to previous authors addressing the green problem, it may be determined theoretically the effect of the additional stokes-shifting step—the additional set of coupled fields will lead to more complex behaviour, and may permit novel ways to stabilise multimode laser operation. Experiments to compare the stability of green and yellow output can be performed with a single laser set-up by just changing the angle to the doubling crystal to switch between green and yellow output to further clarify this issue. Diagnosing the laser stability requires fast detectors and oscilloscopes (up to 5 GHz bandwidth are available to the project) as well as Fabry-Perot etalons to diagnose the longitudinal mode content of the frequency output. Methods of alleviating the yellow problem through means unavailable to conventional green problem lasers may be further developed by making use of the simultaneous Raman and doubling processes, such as using a long resonator and forcing the laser onto a single longitudinal mode.

Achieving High Efficiency

Stable operation must be accomplished while also operating the lasers at a reasonable level of efficiency. It is vital to understand the balance between the intracavity gain and the non-linear Raman and frequency doubling conversion steps in order to design efficient devices: the fundamental and stokes intracavity fields must experience close to their optimum effective output coupling through the Raman and frequency doubling processes respectively. Modelling of the laser system is beneficial for understanding these complex relationships and such a model is presented below for a CW intracavity Raman laser with a user-specified top-hat beam size in each cavity element the steady-state behaviour of the laser. The power flow from each wavelength to the next depends of a large number of variables such as the cavity mode size in each crystal, the crystal materials and lengths, spectral shape of the mirror reflectivities, and cavity losses. This model will be used as the core of an extended model that predicts the output of a particular cavity as a function of pump power. The model will calculate the thermal lenses in the crystals, the form of the Gaussian intra-cavity modes, and the intra-cavity fundamental, stokes and doubled-stokes fields. Since these parameters are interdependent, the model finds the self-consistent solution. The model may be used further to aid understanding of experimental results, and to guide the design of optimised resonators that will lead to stable and efficient operation.

Suitable management of the thermal loads in the crystals and designing resonators that are tolerant to variable strong lenses in the gain and Raman materials is also an an important part of the design process, particularly for high power devices. Suitable cavity designs to accommodate strong thermal lenses may be investigated with commercial laser design software such as LASCAD, and used as input to the steady-state laser model described below. A further technique to minimise the thermal load on the laser crystal is to pump the laser with an alternative pump wavelength with a smaller quatum defect for example, in the case of Nd-based laser systems, pumping with a pump source emitting at around 885 nm as opposed to conventional pumping at around 808 nm.

Concepts Disclosed

One or more of the concepts outlined below may be incorporated into the laser of the present invention.

Concept for Improved Efficiency and Increased Yellow Output Power (up to 1-2 W)

There is considerable scope to improve the performance of the laser described in the examples one or more of the following:

- Manage thermal lenses in laser and Raman crystals through improved resonator design (including diode laser pump spot size, positioning and placement of components [including the laser crystal, resonator mirrors, Raman crystal and frequency doubling crystal] within the laser resonator, length of resonator) in order to optimise the conversion efficiency for each step of the conversion process (ie. generation of fundamental photons, conversion through SRS, frequency doubling), maintain overall resonator stability, avoid optical damage, and obtain output which is stable in the time domain.
- Improve the collection efficiency of yellow light generated within the frequency doubling crystal through resonator design (including 1) the use of an intracavity mirror to transmit the infrared but reflect visible light back through the doubler and out the output coupling mirror, or 2) the use of a folded resonator design with a dichroic folding mirror [HT for visible and HR for infrared beams] to direct all the visible light generated out of the resonator through the output coupler.
- Minimise resonator optical losses (including those due to scattering and unwanted reflections) by using best practice polishing of optical interfaces, appropriate design of dielectric coatings and best practice fabrication of dielectric coatings applied to mirrors and crystals.
- Control the Raman crystal temperature, eg. by liquid cooling (eg. water, glycol or other suitable liquid which may be from a recirculating cooling means) or TEC control, in order to avoid or minimise effects such as temperature-dependent Raman shift, temperature-dependent Raman gain coefficient, temperature-dependent Raman gain bandwidth, or temperature-dependent absorption.
- Using a Raman crystal and/or laser crystal with an athermal cut, ie cut and oriented with respect to the crystal axes so as to minimise the thermo-optic coefficient, thereby minimising thermal lensing.
- Use Raman crystals with very low levels of impurities, ie. highly pure or ultra pure Raman crystals, in order to minimise thermal loading which is due to direct absorption of the fundamental and Stokes radiation. Maximum impurity levels for ions which absorb at the above wavelengths should be <1 ppm or <0.1 ppm or <0.01 ppm (parts per million). Examples of these ions include trivalent Nd, Yb, Tm, but there may also be other important ions, particularly other rare earth or transition metal ions.
- Select Raman-active crystals with low intrinsic linear absorption or multi-photon absorption at one or more of the pump wavelength(s), the fundamental wavelength and Stokes wavelengths. Suitable materials from which selection could be made include diamond, KGW, KYW, $BaWO_4$, $PbWO_4$, $CaWO_4$, $Ba(NO_3)_2$, $LiIO_3$, $LiNbO_3$, other tungstate and molybdate materials, and other known Raman materials.
- Control the spectral content of the fundamental (eg. by using an intracavity etalon or by an injection seeding technique) to obtain stable spectral peak or peaks in the Stokes output and/or to improve the temporal stability of the output.
- Use injection seeded signal at the Stokes wavelength in order to control the build-up of Stokes optical field, so as to achieve Stokes output with improved temporal stability.
- Use spatial mode control (eg apertures) to limit the transverse modes oscillating at the fundamental, Stokes and second harmonic wavelengths and thereby improve the temporal stability of the output. These apertures are typically placed within the laser resonator in a position where they will not be damaged by the circulating optical power. Typically they are located where the mode size is relatively large.
- Optimise the interactions and couplings between the optical fields at the fundamental, Stokes and second harmonic wavelengths, so as to achieve temporally stable output. Means for this include resonator design (including diode laser pump spot size, positioning and placement of components [including the laser crystal, resonator mirrors, Raman crystal and frequency doubling crystal] within the laser resonator, and length of resonator), spectral control and spatial mode control, thermal control of components and choice of components (laser crystal, Raman crystal and frequency doubling crystal)

Concept for CW Operation with Improved Amplitude Stability (eg. Low Noise Multimode Yellow Lasers)

For many applications a high level of amplitude stability is required. The required level of amplitude stability could be <5%, <1%, <0.5%, <0.2% or <0.1%. The 2 main causes of amplitude instability are instabilities in the frequency spectrum and in the distribution of spatial modes.

One laser architecture that has proven to solve the green problem is the multimode long cavity design. Multimode devices are potentially simpler laser systems, and are capable of achieving amplitude stabilities of much less than 1% with output frequency bandwidths in the GHz range. Meter-scale cavities have extremely closely-spaced longitudinal modes such that mode competition occurs between so many oscillating modes that overall amplitude fluctuations are smoothed out. This approach is the basis of the Spectra-Physics Millennia lasers. The technique is well suited to yellow lasers, having the important benefit of requiring no additional intracavity components. It is also well-suited to power scaling, and z-cavity configurations allow several widely ranging spot sizes in different parts of the cavity, ideal for tailoring the spot size in the laser, Raman, and doubling crystals to their optimum values.

Z-fold cavities are ideally suited to this application and can be designed with length up to between approximately 0.5 and 1 m (although resonator lengths between 0.2 to 0.5, 0.2 to 1 m may also be designed). Based on an understanding of the spectral and temporal competition between the stokes and fundamental radiation it is possible to achieve stable operation in the spectral regime, with the long cavity mitigating the yellow problem. This approach has potential for the realisation of yellow output powers in excess of 10 W or greater.

As an alternative to the long-resonator cavity design, compact devices using short cavities of order 5 cm are also desirable due to their small footprint and self-Raman conversion is particularly suited for these systems, due to the reduction of the total number and hence total length of crystals and intracavity surfaces within cavity: decreased losses will lead to higher efficiency. Extremely compact and potentially monolithic devices are possible by coating mirrors directly onto the crystals. The short cavity will exacerbate any yellow problem amplitude fluctuations, and use of the dynamic model may be used to further improve these devices. Using intracavity elements such as etalons or birefringent filters to control and partially-narrow the spectrum of the fields may also be beneficial for low noise operation.

To achieve such levels of amplitude stability, one or more of the following approaches may be taken.

- Control the spectral content of the fundamental using an interferometric technique (eg. by using an intracavity etalon or by an injection seeding technique) to obtain stable spectral peak or peaks in the Stokes output and/or to improve the amplitude stability of the output.
- Control of the spectral content of the fundamental using a dispersive technique (eg. a grating or prism)
- Use injection seeded signal at the Stokes wavelength in order to control the buildup of Stokes optical field, so as to achieve Stokes output with improved temporal stability.
- Use spatial mode control (eg apertures) to limit the transverse modes oscillating at the fundamental, Stokes and second harmonic wavelengths.
- Optimise the interactions and couplings between the optical fields at the fundamental, Stokes and second harmonic wavelengths, so as to achieve temporally stable output. Means for this include resonator design (including diode laser pump spot size, positioning and placement of components [including the laser crystal, resonator mirrors, Raman crystal and frequency doubling crystal] within the laser resonator, and length of resonator), spectral control and spatial mode control, thermal control of components and choice of components (laser crystal, Raman crystal and frequency doubling crystal)
- use a short resonator in combination with an etalon so that only one longitudinal mode oscillates
- orient the laser Raman and doubling crystals so that interfaces are not normal to the resonator axis.
- cut laser, Raman and/or doubling crystals so that their faces are accurately parallel and they can perform the additional function of longitudinal mode selection (by serving as etalons)
- place laser, Raman and/or doubling crystal in close proximity (typically <500 μm) to a mirror (or second crystal face) so that the air gap and interfaces combine to form an etalon, thereby impacting on longitudinal mode selection.
- bond (eg. by diffusion bonding, gluing, clamping under pressure and/or high temperature) the three crystals together so that they form an essentially monolithic "block". The "block" of crystals may also incorporate dielectric coatings between the elements or at the ends.

Concept for CW Single Mode Low Noise Multimode Yellow Lasers

Compared with multi-mode devices, single mode devices are capable of much higher stability, and lower frequency bandwidth, hence single-mode operation is a clear route to low amplitude noise, as well as being desirable for many applications requiring sub-GHz linewidth. The neodymium ion transitions in crystalline hosts are predominantly homogeneously broadened and so natural single longitudinal mode operation of both the fundamental and stokes radiation may in theory proceed efficiently. Investigations of the spectral dynamics of the field provide the ability to choose gain and Raman crystals that will stably operate in this regime: with crystals having a broad Raman profile and a narrow gain profile providing the lowest broadening pressure on the fundamental field. Techniques for narrowing the linewidth of the yellow laser using both long and short-cavity linear cavities may also be employed such as by including line-narrowing intracavity elements, for example etalons and tunable birefringent filters. These elements are carefully designed to have transmission maxima corresponding to the peak of the laser gain as well as the corresponding stokes shifted wavelengths. A coupled-cavity arrangement may also be used to modify the overall mode structure of the cavity to obtain narrow-band operation.

Spatial hole burning in standing wave cavities is the major factor which tends to push both the stokes and fundamental fields into multiple longitudinal modes. To obtain the most stable single longitudinal mode operation, a travelling-wave unidirectional ring configuration that eliminates spatial hole burning may be employed to encourage efficient single mode operation. Ring lasers have additional advantages of design flexibility and alignment insensitivity, although care is required to maintain the high cavity finesse (high cavity Q) required to drive the stimulated Raman process. Conventional ring laser designs that use a polariser, half-wave plate and Faraday rotator to force unidirectional operation may also be used. Careful design of the wavelength dependence of the faraday rotator and a first order wave plate allows low-loss diode action to operate for both the stokes and fundamental fields. Other low-loss means for causing the laser to operate unidirectionally such as acousto-optic modulators and external feedback mirrors to couple one direction back into the other are also available. Single mode operation may also be achieved with etalons or birefringent tuners.

Tuning the yellow output from the linear and ring lasers is also feasible and tuning over a 1 nm range should be possible by tuning the wavelength of the fundamental using for example Nd:YVO$_4$ or forcing Raman conversion away from the peak of the spontaneous Raman scattering spectrum. Alternatively tuning the temperature of the Raman crystal allows for sub-nanometer wavelength tuning, utilising the temperature-dependence of the Raman shift in some crystals. For larger tuning ranges of order 10 nm, lasers employing gain materials with a large spontaneous emission spectrum bandwidth may also be employed, for example gain materials having Yb as the active ion such as Yb:YVO$_4$.

Concept for CW Switchable Visible Output

The laser described in the examples can be configured to produce output which is easily selectable between 2 or more output wavelengths (eg. 532 nm, 559 nm, 588 nm) by reconfiguring the frequency doubling crystal (eg. by temperature tuning or angle-tuning) to achieve phasematching for frequency doubling the fundamental, frequency doubling the Stokes or frequency summing the fundamental and Stokes optical fields. Methods for generating selectable visible output are described elsewhere herein.

Concept for Scaling Down

The laser described in the examples can be redesigned to provide a low cost, practical diode-pumped device suitable for applications including use as a laser pointer or various biomedical applications. The target output power could be as low as 5 mW. The design modifications may include one or more of the following.

- Use of a single (so-called "self-Raman") material to provide the dual functions of laser and Raman material. Examples include Nd:KGW, Nd:YVO4, Nd:KYW, Nd:GdVO4, Nd:BaWO4 and there are many other possibilities.
- Reduced resonator mode sizes to achieve high intensities at the fundamental and Stokes wavelengths appropriate to obtaining efficient frequency conversion through SRS and frequency doubling/summing.
- Diode laser pump source with high brightness (ie. can be focussed with high intensity into the fundamental laser gain medium). The source could be a fibre-coupled diode laser or a single-stripe diode.
- Use of high quality mirror and crystal coatings which provide low losses due to scattering, and unwanted reflection or unwanted transmission.

Concept for Scaling Up

The laser described in the example can be redesigned to provide a practical arclamp-pumped or diode-pumped device suitable for applications in fields such as ophthalmology, dermatology, remote-sensing, and visual display. The design modifications may include one or more of the following points or those listed above.

- Side pumping the laser gain material with diodes or arclamps to distribute the thermal loading over a large volume of the laser gain material, thereby alleviating effects such as thermal lensing.

Concept for CW UV Output Through Second Stage Frequency Doubling.

The laser described in the example can be frequency doubled (ie. second-stage of frequency doubling) to provide a CW UV source of output at wavelengths such as 289 nm at output powers ranging from 1 mW, up to 100 mW. Achieving this may include one or more of the following steps.

- Focussing the yellow output (eg. at 588 nm) from the frequency-doubled Raman laser into a suitable frequency-doubling crystal to generate UV output (eg. at 289 nm). A suitable crystal may be BBO.
- Coupling the yellow output (eg. at 588 nm) into a separate high Q (high finesse) resonator containing the doubling crystal (eg. BBO). Resonant enhancement effects (at 588 nm) within the separate cavity may cause the UV light to be generated with higher efficiency.
- Including a second frequency doubler in the Raman laser resonator, and designing the resonator so as to (1) achieve a small beam waist in the second doubling crystal, (2) enable the yellow light to circulate within the portion of the resonator which contains the second frequency doubling crystal (3) allow the UV light to be collected and output from the Raman laser.

EXAMPLES

Example 1

Intracavity-Doubled Continuous Wave Raman Laser

Summary

Continuous wave operation at 588 nm of a diode-pumped, Raman-shifted (KGW), intracavity-doubled (LBO), Nd:GdVO$_4$ laser is reported. The maximum cw output power at 588 nm was 320 mW when pumped with 18 W from a fibre-coupled diode at 808 nm. An efficient simple, diode end-pumped, intracavity doubled (LBO), Raman-shifted (KGW) Nd:GdVO$_4$ laser is described representing a CW crystalline Raman laser-based yellow source.

Experiment

A plano-plano resonator showing the arrangement of the laser system of the present example is seen in FIG. 1. The resonator 100 was bound by a flat input mirror 101 2 mm thick, coated 85% T at 808 mm, HR (0.09% T) at 1064 nm, 0.4% T at 1176 nm and with 93% T at 588 nm, and for operation at 588 nm a flat output coupler 103 with the same coating. The pump source 105 was a 30 W fiber-coupled diode laser ($\phi$=400 µm, NA~0.22) operating at 808 nm with optical fibre 107 for delivery of the pump beam 109. The fiber coupled pump light 109 was imaged onto a gain material 111 with a pair of plano-convex lenses 113 and 115 with an effective magnification of 0.9-1.1, resulting in a pump radius of 180-220 µm in the gain material 111. In the present arrangement, the gain material is an a-cut 0.3 at. % Nd:GdVO$_4$ crystal (3×3×10 mm) with broadband antireflection-coatings in the wavelength range of 1064 to 1176 nm, although other suitable gain materials may be substituted as would be appreciated by the skilled addressee.

Raman shifting was obtained using a Raman material 117, which in the present arrangement was a KGW crystal with dimensions of 5×5×25 mm, cut for propagation along the Np axis and AR-coated 1064 to 1200 nm, although other suitable Raman materials may be substituted as would be appreciated by the skilled addressee. Intracavity nonlinear conversion of the Raman radiation generated in the Raman medium 117 was obtained using a nonlinear material 119, which in the present arrangement was a temperature controlled, typically 45° C., 3×3×10 mm non-critically phase matched ($\theta$=90°, $\phi$=0°) LBO crystal coated AR at 1064-1200 nm, although other suitable nonlinear conversion materials may be substituted as would be appreciated by the skilled addressee.

Laser operation at the fundamental wavelength of the gain material 111 (1063 nm for the Nd:GdVO4 crystal) was investigated using a 5% T flat output coupler 103. Cavity stability was obtained by the induced thermal lens in the Nd:GdVO$_4$ crystal.

Without the Raman material 117 or the nonlinear material 119 (respectively the KGW and LBO crystals) in place and whilst using the 5% T flat output coupler 103, with and with the length of resonator 100 set at a cavity length of approximately 45 mm, a maximum of 14.4 W of output at 1063 nm was obtained with horizontal polarization. The fundamental output power of the 1063 nm fundamental laser beam increased linearly from threshold up to the maximum pump power of 26 W of incident pump radiation 109. At lower pump powers the laser emission was observed to oscillate between orthogonally polarized lines at 1063.2 and 1065.5 nm. Replacing the output coupler for a flat high reflector (used for the remainder of the experiments) 2.31 W of output was obtained, clearly indicating this optic was by no means optimally coated in order to obtain the maximum cavity-Q for the two nonlinear processes.

Introducing the Raman material 117, in this arrangement a 25 mm long KGW crystal, into the resonator cavity 100 provided a Raman threshold for 6.6 W of incident pump power compared with a threshold of 0.7 W for the fundamental 1063 nm radiation. Lower thresholds appear possible with reduced mode sizes and have been demonstrated to be of the order of 1 W in a Nd:KGW self Raman laser. The arrangement described here however, was optimized for maximum output power. In this case 1563 mW at 1176 nm was obtained for a maximum pump power of 20.4 W (32.5 A) before damaging the coatings on the KGW crystal 117. The Raman power increased linearly with pump power although would typically become quite unstable near the maximum. The poor amplitude stability was attributed to a combination of spectral noise of the fundamental at 1063 nm (emission was observed to jump over approximately 0.6 nm) as well as to jumping between the transitions at 1063 and 1065 nm and to the dynamics of the thermal lenses of the Raman 117 and gain 111 media resulting in higher spatial modes intermittently oscillating. It should be noted however that the powers reported only include those measured through the output coupler 103 and as the input mirror 101 and output coupler 103 had the same coatings it is reasonable to expect that the total Raman power is twice the measured value, in this case 3.12 W. For comparison 10.3 W of fundamental was obtained at this pump power using the 5% T output coupler indicating a conversion efficiency of the fundamental-to-Raman of about 30%. Improvements could certainly be expected by optimizing the mirror coatings and in particular increasing the output coupling at 1176 nm.

The aim of the present experiment was, however, to obtain CW operation near 588 nm. This was achieved using type I non-critically phase matched LBO crystal 119 to convert the Raman wavelengths without introducing any polarization rotation or birefringence to the cavity. Using this material it is also possible to switch between doubling of the Raman shift at 1176 nm (1176→588 nm with the LBO temperature set to ~45° C.), to doubling of the fundamental transition (1063→532 nm, at an LBO temperature of ~150° C.) to sum frequency mixing of the fundamental and Raman wavelengths (1063+1176→560 nm, at an LBO temperature of 80° C.).

The nonlinear LBO material 119 used in the present arrangement was 10 mm thick LBO crystal, therefore requiring the resonator 100 cavity length to be extended by approximately 17 mm (total cavity length 62 mm) to accommodate the temperature controlled copper mount (not shown). With the temperature of the LBO crystal 119 set to 45° C., a maximum output power of approximately 320 mW with a wavelength of 588 nm was obtained, under critical alignment, with 17.6 W of incident pump power. Monitoring of the Raman and fundamental wavelengths with a narrowband OSA, fast spectral noise was observed with the higher output powers obtained when the total Raman bandwidth was narrow. Typically, however, at this pump power only 200 mW was obtained with considerable noise as the fundamental and hence Raman/visible wavelengths would skip between the possible longitudinal modes of the Nd:GdVO4 gain bandwidth.

To align the optical fields of the fundamental, Raman and SH fields for the three-crystal arrangement of the present example Raman laser system, (i.e. for an a-cut Nd:YVO4/KGW/LBO or Nd:GdVO4/KGW/LBO system), the following procedure was performed:

With the Raman crystal and doubling crystals removed, the Nd:YVO4 is oriented orthogonal to the lasing axis such that the output polarisation is parallel to a "known" direction for example parallel to the plane of the optical table. These laser crystals are known to lase parallel to either the crystal c-axis or parallel to the crystal a-axis. For optimised operation the fundamental output should be polarised parallel to the crystal c-axis (pi-polarised). The correct fundamental polarisation axis is ensured by operating the laser with a sufficiently high output coupler transmission preventing oscillation on the lower gain fundamental polarisation parallel to the a-axis (sigma-polarised).

With the fundamental emission correctly oriented and the input mirror and output coupler replaced with mirrors highly reflecting at both the fundamental and expected Raman wavelengths, and, with the inclusion of the Raman active crystal and such that the Raman process is initiated, the Raman crystal (specifically KGW in this example) is rotated orthogonal to the lasing axis (for a crystal cut along the Np-axis) such that the Raman crystal's Nm-axis is parallel to the fundamental polarisation axis. For most efficient operation this is critical.

To obtain frequency doubling a frequency doubling crystal is added to the resonator cavity. Optimised visible output is obtained by aligning the polarisation of the Raman wavelength parallel to the ordinary axis of the LBO crystal.

In the preferred arrangements, the laser gain medium, the Raman-active medium and the nonlinear medium are each a plane-parallel crystals. Thus, the resonator cavity has a resonator axis along which the fundamental and Raman beams propagate within the cavity in a respective cavity mode along the resonator axis, the plane-parallel surfaces of the plane-parallel solid state Raman material lying on the resonator axis; and wherein the plane-parallel surfaces are aligned to be substantially perpendicular to the resonator axis such that any optical reflections of the fundamental and the Raman beams from the plane-parallel surfaces of the intracavity crystals are reflected into the respective cavity mode and continue to propagate within the resonator cavity. The angular offset of the normal to each of the plane-parallel surfaces of the intra-cavity crystals with the resonator axis is less than 1 degree, and may be in the range 0.05 to 1 degree (typically about 0.1 degree).

Figure 2A:
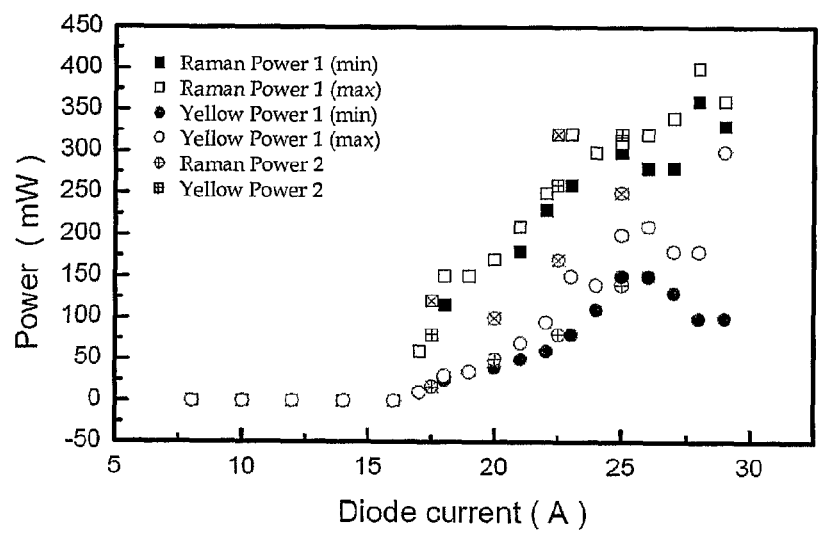
FIGS. 2A and 2B show plots of output powers vs diode current for CW 1063, 1176, 588 nm output wavelengths.
Figure 2B:
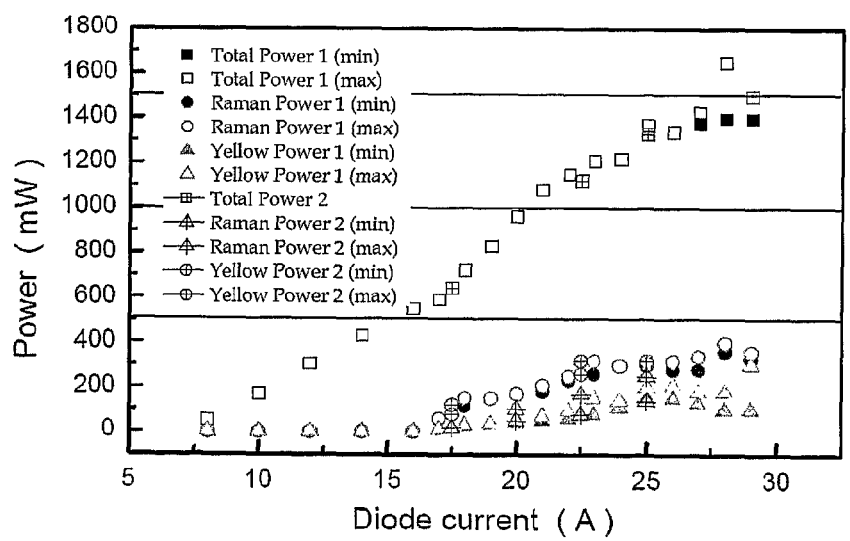

FIGS. 2A and 2B show pots of the second harmonic (588 nm), Raman (1176 nm), fundamental (1063 nm) and total output power as a function of incident pump power for two different operating incidences "1" and "2" (the "min" and "max" powers recorded in the figures are the extremes of the output power obtained at the particular wavelength and diode power whilst optimising adjustments to the laser resonator alignment was performed). From these results it can be seen that the total output power no longer increases linearly at a incident pump power greater than about 13 W, while the second harmonic of the Raman becomes unstable at approximately 15 W of pump power. This is primarily due to the thermal lens in the Nd:GdVO4 gain medium 111 as the induced thermal lens drives the laser into is the unstable regime. Initially however higher order transverse modes begin to lase causing spectral and spatial instabilities in the laser which ultimately result in damage to either the LBO or KGW coatings. It should also be noted that, as with the Raman power, the powers reported are only those measured through the output coupler although as the input mirror and output coupler had the same coatings it is expected that these powers were probably double those reported.

To overcome the strong thermal lens so as to test the potential for higher power operation, which could well be achieved through an optimized cavity design with either an intracavity lens or appropriately curved cavity mirrors, the pump was chopped using a mechanical chopper in close proximity to fiber coupled diode. Using a chopper blade with a 50% duty cycle the pump was chopped at a repetition rate of approximately 200 Hz.

Figure 3A:
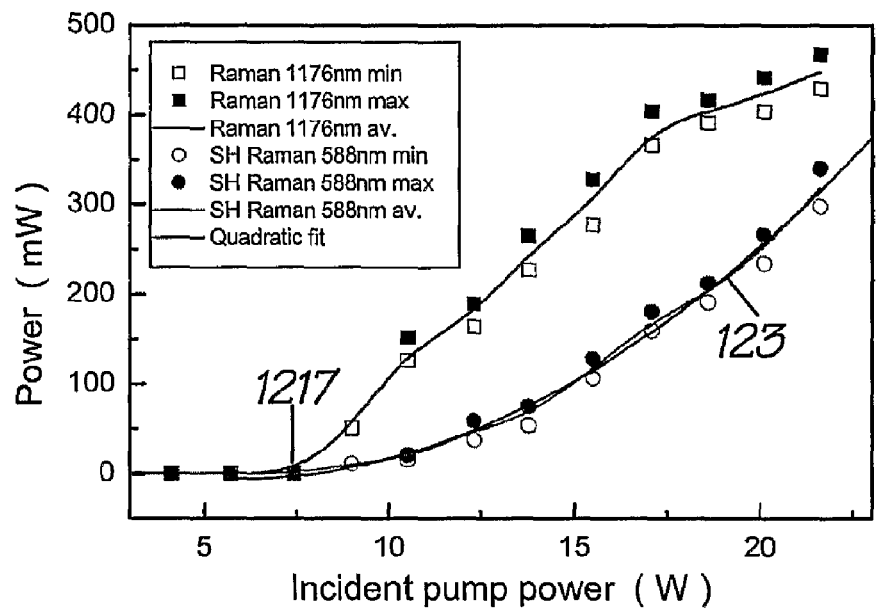
FIGS. 3A and 3B show plots of output powers vs diode current 1063, 1176, 588 nm output wavelengths for a chopped pump beam.
Figure 3B:
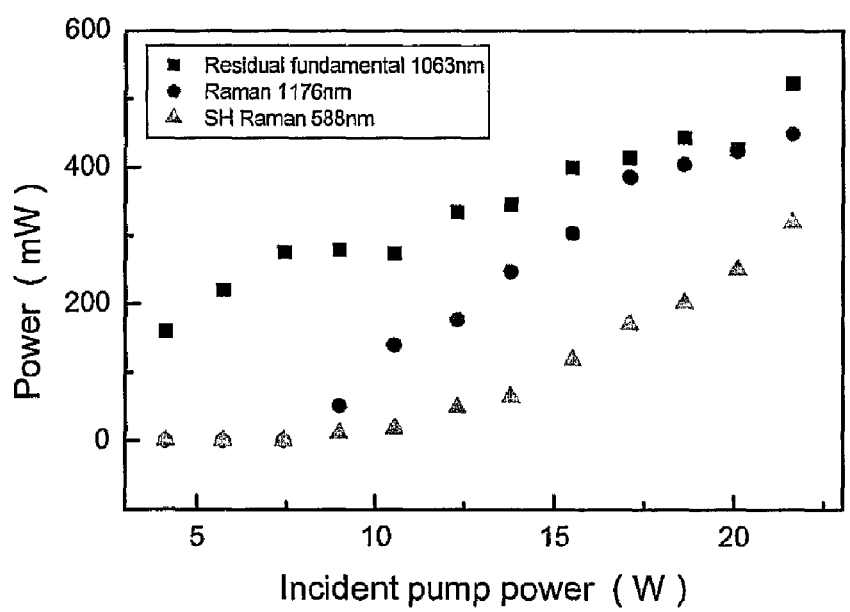
Figure 4A:
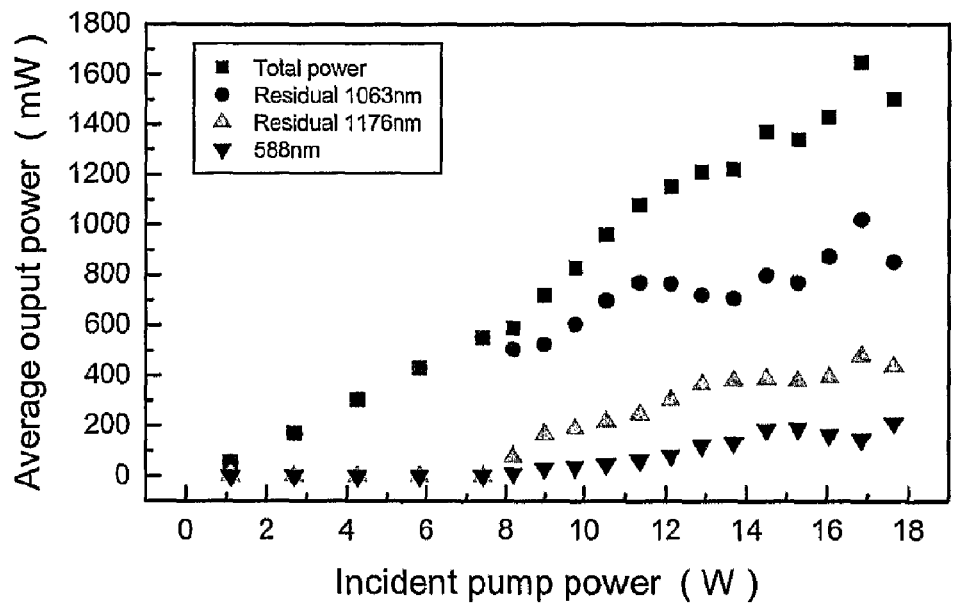
FIGS. 4A and 4B show further plots of output powers vs diode current 1063, 1176, 588 nm output wavelengths for a CW and a chopped pump beam.
Figure 4B:
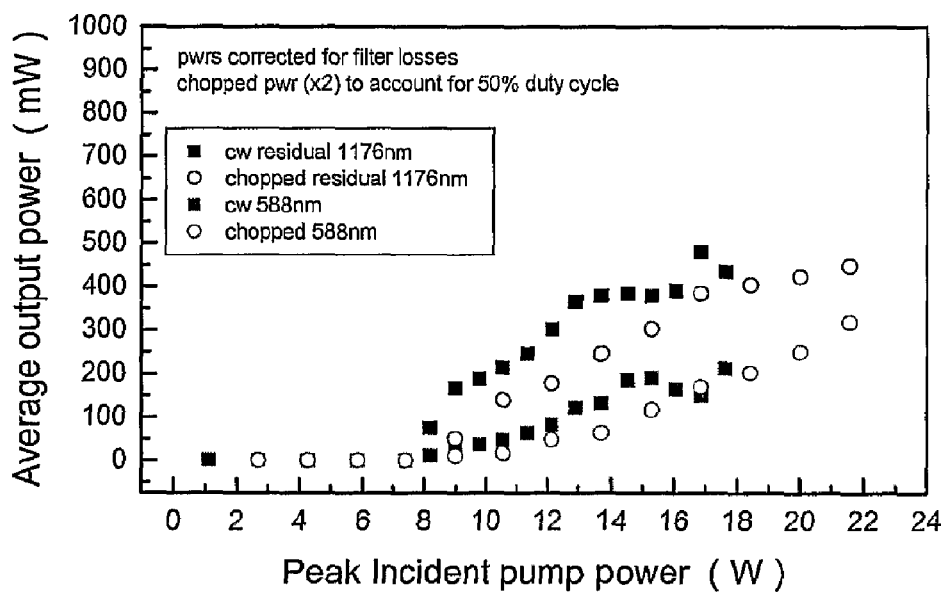

FIG. 3A show plots of the second harmonic (588 nm), Raman (1176 nm), fundamental (1063 nm) and total output power as a function of incident pump power. Using this approach a maximum of 346 mW at 588 nm with 21.6 W of peak incident pump power was obtained. It is interesting to note that the total output power increased linearly in this case with the thermal aberrations much reduced.

Figure 5A:
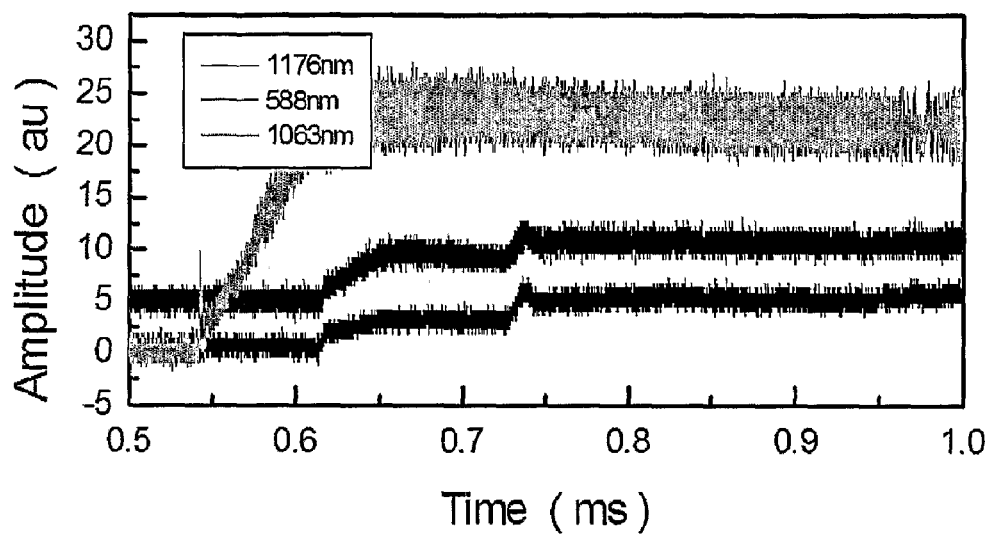
FIG. 5A shows a graph of the amplitude stability for the 1063 nm fundamental, 1176 nm Raman and 588 nm doubled Raman output, all three wavelengths being recorded simultaneously.
Figure 5B:
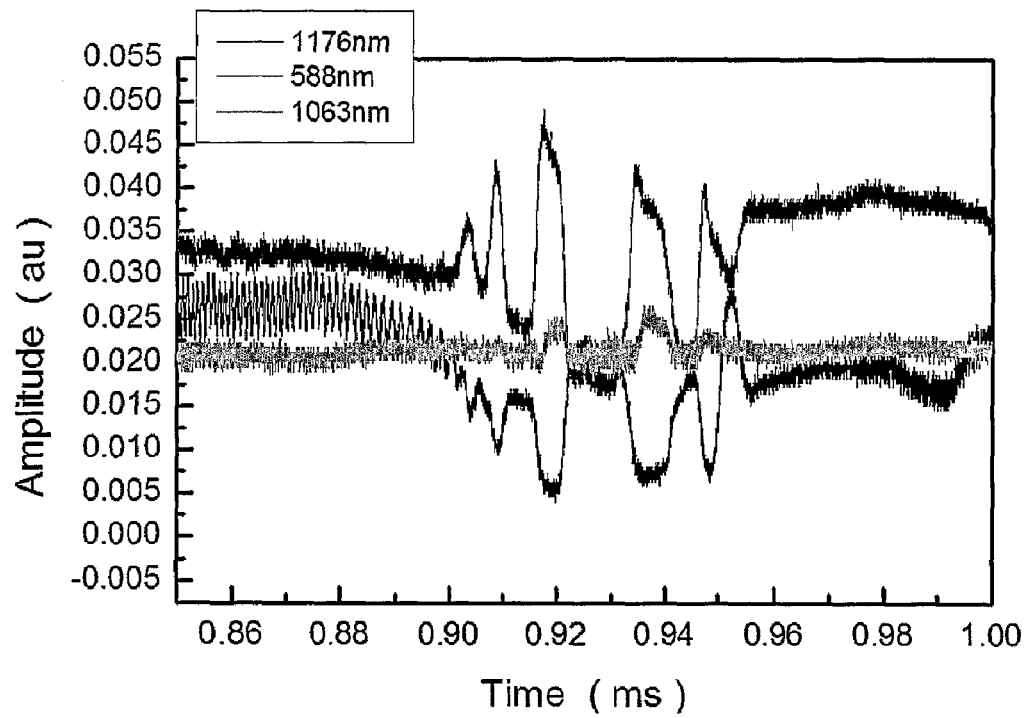
FIG. 5B shows a graph of the shows a graph of the amplitude phase for each of the 1063 nm fundamental, 1176 nm Raman and 588 nm doubled Raman output, all three wavelengths being recorded simultaneously at low power.

As seen in FIG. 3A, a clear Raman threshold is observed with an initial linear increase in output power with pump power, as expected, followed by 'clamping' of the Raman power as the nonlinear conversion becomes significant, effectively depleting the intracavity Raman field. The 588 m power on the other hand increases quadratically from the onset of Raman lasing with a linear increase at the highest pump powers. It should be noted that, as the average pump power was only half of the true CW case (due to 50% duty cycle), this laser was extremely efficient considering the requirement to overcome threshold for the gain medium, threshold for Raman gain and the scattering losses of the 8 intracavity surfaces. The conversion efficiency from optimized fundamental-to-the second harmonic of the Raman was 6.2% or 12.4% taking into account the input mirror and output coupler had the same coatings. In terms of the turn delay for the Raman compared with the fundamental this was found to be approximately 25 µs at maximum pump power indicating approximately 50000 cavity roundtrips compared with hundreds of round trips for the fundamental. Clearly improved efficiencies for true CW operation over and beyond the chopped case are possible. It is also interesting to note that the dynamics of the interaction between the fundamental, Raman and doubled Raman outputs varied with pump power. Simultaneously recording the amplitude of the different wavelengths as shown in FIGS. 5A and 5B shows that at low pump powers that the Raman and 588 nm powers were in phase and did not perturb the fundamental power while near the maximum pump power, before damaging the LBO crystal, the Raman and 588 nm output powers were out of phase as the LBO depletes the Raman power, which in turn allows the fundamental to increase.

Discussion

The results presented above demonstrate that efficient CW yellow laser operation is possible using a combination of two nonlinear processes with a high gain laser medium. Continuous wave output powers of over 1 W at 588 nm are expected to be obtained from a single output by optimizing the resonator geometry in order to avoid thermal lensing limitations. To date the inventors have obtained 346 mW chopped at 200 Hz with an average pump power of only 11.1 W taking into account only the power from the output coupler, although as the input mirror and output coupler were identical this power could be twice as high. Furthermore taking into account the fact that a maximum pump power of approximately 26 W was used, and given the 588 nm power increased linearly (8.5% slope efficiency) at the maximum pump powers, the inventors predict that it is possible to obtain approximately 1.5 W at 588 nm, not even taking into account optimizing the output coupler—input mirror transmissions. Clearly the approach taken in the present disclosure has considerable scope for improvement and, given the ever improvements in diode laser pump source brightness, it is possible that continuous wave and indeed switchable wavelength visible sources spanning 500 to 600 nm might result from the approach used.

SUMMARY

A continuous-wave yellow all-solid-state Raman laser generating up to 320 mW at 588 nm has been demonstrated with a optimized to 1063 nm to 588 nm conversion of approximately 3%. In order to overcome thermal limitations in the Nd:GdVO$_4$ gain medium the pump power was modulated at 200 Hz with a 50% duty cycle resulting in increased yellow powers with more than double the efficiency (6.2%, 1063 to 588 nm). With optimization of the cavity design and mirror coating significant improvements on this result are expected.

Example 2

Intracavity Frequency-Doubled CW Self-Raman Laser

Intracavity frequency-doubled cw self-Raman laser based on a diode-pumped Nd:GdVO$_4$/KGW combination has been obtained, with the laser generating 704 mW in the yellow at 588 nm.

Figure 6:
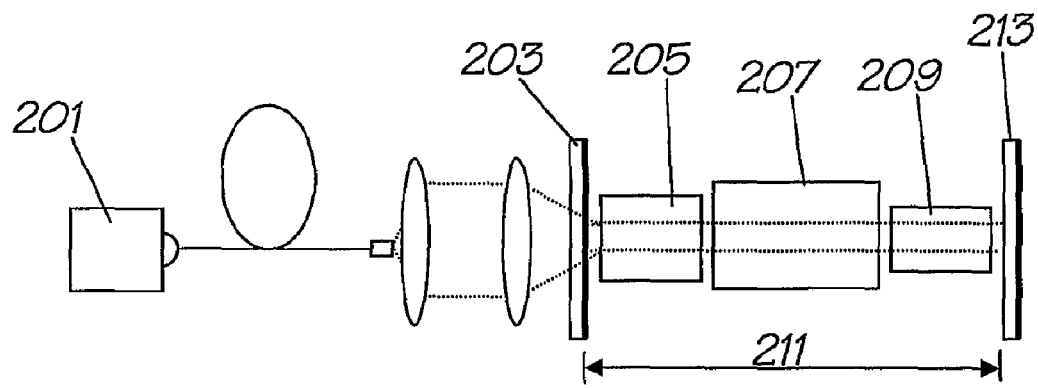
FIG. 6 is a schematic depiction of the cw Raman laser system of the arrangement of Example 2.

The configuration of the present arrangement of the Raman laser is illustrated in FIG. 6. The pump source 201 was a 30 W fiber-coupled 808 nm diode laser ($\phi$=400 µm, NA~0.22), imaged with unity magnification through the pump mirror 203 onto an AR-coated (1064-1200 nm) a-cut 0.3 at. % Nd:GdVO$_4$ crystal 205 (3×3×10 mm). Quoted diode pump powers relate to powers incident on the laser crystal 205. Raman shifting was obtained using a KGW crystal 207 with dimensions of 5×5×25 mm, AR-coated for the near-infrared and cut and oriented for propagation along the $N_p$ axis with the plane of polarization parallel to $N_m$. KGW was selected for its superior thermal properties, good Raman gain coefficient and high damage threshold. Second harmonic generation (SHG) of the 1176 nm Stokes line was obtained using a temperature controlled (~45° C.), 3×3×10 mm non-critically phase matched ($\theta$=90°, $\phi$=0°) LBO crystal 209 coated AR at 1064-1200 nm.

The resonator 211 was formed by a pair of flat mirrors 203 and 213, each having high transmission at the diode (808 nm) and yellow (588 nm), and, high reflectivity at the fundamental (1063 nm) and the first Stokes (1176 nm) wavelengths. Two sets of mirrors 203 and 213 were used in the experiments. Mirror set A, for operation at the first Stokes wavelength, and also for the yellow, each had coatings with 85% T at 808 nm, 0.09% T at 1063 nm, 0.4% T at 1176 m and 93% T at 588 nm. Mirror set B, used to obtain the highest yellow powers, each had coatings with 96% T at 808 nm, <0.006% T at 1063 nm, <0.004% T at 1176 nm and 95% T at 588 nm). Resonator stability was achieved by way of the strong positive thermal lens in the laser crystal 205 (the focal length of the thermal lens formed in the Nd:GdVO$_4$ crystal with 21 W incident pump power was estimated to be +66 mm from resonator stability measurements when operating at the fundamental wavelength only with 5% output coupling). The length of resonator cavity 211 was kept to a minimum and in the present example had a length of 45 mm for operation at 1176 nm (Nd:GdVO$_4$ and KGW only) and 62 mm for operation at 588 nm (with the LBO crystal 209 included in the resonator cavity 211).

To align the optical fields of the fundamental, Raman and SH fields for the two-crystal arrangement of the present example self-Raman laser system, (i.e. for a-cut Nd:YVO$_4$/LBO or Nd:GdVO4/LBO system), the following procedure was performed: the Nd:YVO$_4$ is oriented orthogonal to the lasing axis such that the output polarisation is parallel to a "known" direction for example parallel to the plane of the table. These laser crystals are known to lase parallel to either the crystal c-axis or parallel to the crystal a-axis. For optimised operation the fundamental output should be polarised parallel to the crystal c-axis (pi-polarised). The correct fundamental polarisation axis is ensured by operating the laser with a sufficiently high output coupler transmission preventing Raman oscillation as well as the lower gain fundamental polarisation parallel to the a-axis (sigma-polarised). With the fundamental emission correctly oriented the LBO crystal is oriented such that the ordinary axis of the LBO crystal is parallel to the fundamental polarisation direction.

CW Laser Operation at 1176 nm (Mirror Set A)

Figure 7:
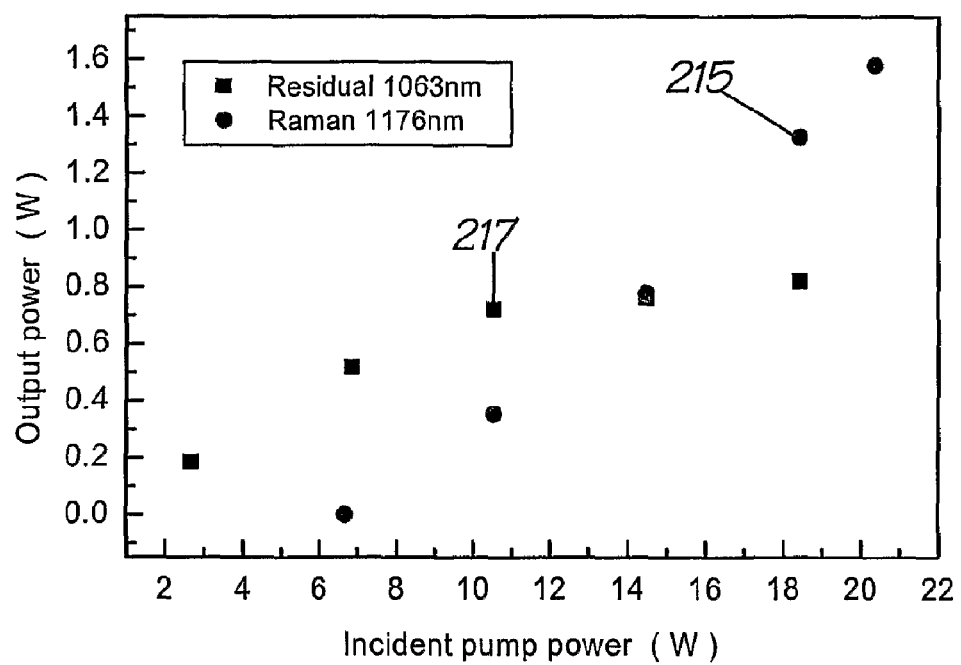
FIG. 7 is a graph of the cw Raman and residual fundamental output power as a function of diode pump.

FIG. 7 shows the Stokes output 215 as a function of pump power, together with the residual fundamental 217 which becomes strongly depleted above threshold for SHG. As can be seen in FIG. 7 the threshold for lasing at the fundamental occurred for 0.7 W power from the laser diode, and the Raman threshold was observed to be for 6.6 W of incident pump power. Above threshold, the 1176 nm first-Stokes Raman power increased linearly with pump power, reaching 1563 mW from the output mirror 213 for a maximum pump power of 20.4 W, limited by the onset of coating damage. Note also that the transmission of the input mirror 203 was equal to that of the output mirror 213 (0.4% T at 1176 nm), thus approximately 1.5 W Raman power was lost from the input mirror 203. The low output coupler transmission at 1176 nm (0.4%) in comparison with the other resonator losses (estimated to be between 1% and 2%) substantially limited the Raman laser output that could be obtained; clearly optimization of output coupling in relation to other losses would improve the output powers with potential for output at least in the vicinity of 3 W.

CW Laser Operation at 588 nm (Mirror Set B)

Nonlinear output coupling through frequency-doubling of the Stokes optical field is particularly well suited to extracting the Stokes optical field efficiently. Low thresholds are possible due to the high Q (high finesse) cavity at both the fundamental and Stokes wavelengths), while at higher circulating fundamental and Stokes powers, losses are dominated by the nonlinear conversion to the visible, which is coupled from the resonator through a dichroic end-mirror.

Figure 8:
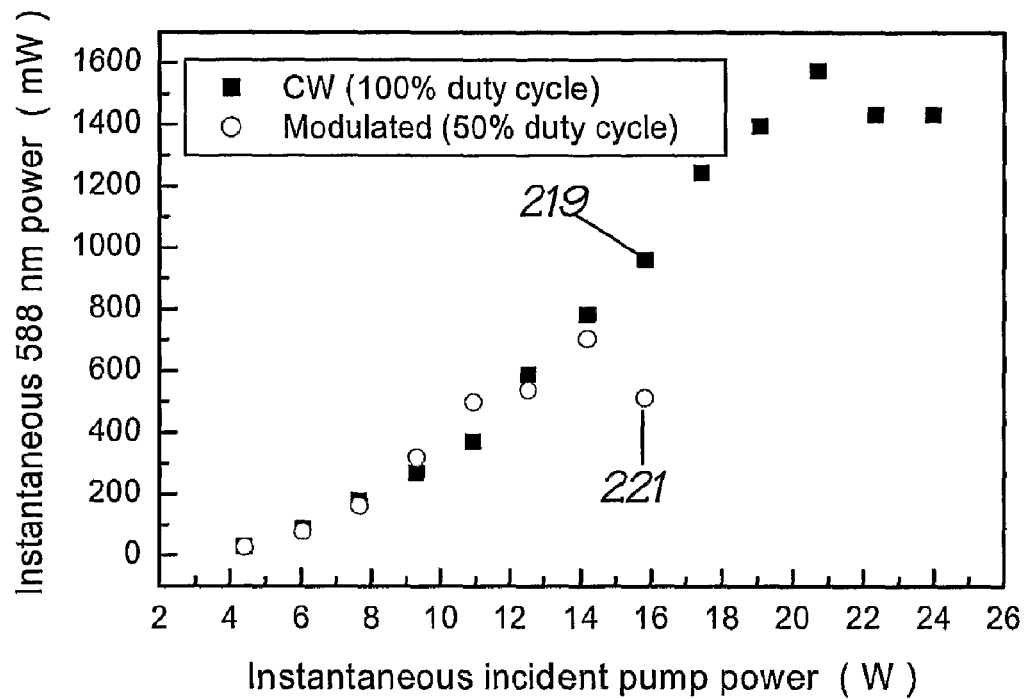
FIG. 8 is a graph of the cw and quasi-cw 588 nm output powers vs instantaneous diode power for CW and modulated (50% duty cycle) excitation.

FIG. 8 shows the cw yellow output power (solid squares 219) at 588 nm as a function of diode-pump power incident on the laser crystal. It was observed that, at 15.5 W pump power, the cw visible output 219 was stable at 704 mW, with peak-to-peak amplitude noise of approximately 12%. At higher pump powers, the visible output decreased and became unstable, resonator approached this stability limit. Note that a similar yellow power would have been lost either through the input mirror or would have been absorbed in the Nd:GdVO$_4$ laser crystal ($\Delta_{588\,nm} > 2$ cm$^{-1}$).

Above 20 W pump power, Raman laser operation became increasingly unstable and sensitive to alignment, with changes to spatial beam characteristics typical of an approach towards the boundary of resonator stability. At lower diode powers however (less than about 15 W) the Stokes output occurred in the lowest order transverse mode, with a mode diameter some 2 to 3 times smaller than the highly multimode fundamental output beam. Given that the effective resonator length was only about 33 mm (the 25 mm-long KGW Raman crystal has refractive index n=2) the thermal lens formed in the laser crystal is obviously much stronger for Raman laser operation than for operation on the fundamental alone (under which the thermal lens was measured). This is attributed largely to the increased thermal loading of the laser crystal 205 as a result of high circulating infrared powers (estimated at 400 W in the present case) in combination with weak ground state absorption eg. from residual impurity ions.

Quasi-cw Operation at 588 nm (50% Duty Cycle, Mirror Set B)

Given that the minimum resonator length (62 mm) is set by the physical size of the crystals, maximum pump power is limited by the thermal lensing in the laser crystal. Experiments were therefore undertaken to test the potential for generating higher cw yellow powers by operating the diode pump at reduced (50%) duty cycle (specifically using a mechanical chopper inserted in the pump beam path giving a 200 Hz square-wave pump train). The reduced thermal load in the laser crystal resulted in a thermal lens of approximately twice the focal length for the same instantaneous power in fully-CW mode. FIG. 8 also shows 588 nm output (open circles 221) in the 50% duty cycle regime. Instantaneous power of 1574 mW (equivalent to 787 mW of average power) was obtained for a instantaneous diode pump power of 22.4 W (12.2 W of average power). Diode-to-yellow optical conversion efficiency was 5.1% for cw operation, and increased markedly, to 7.9%, for quasi-cw operation.

These results strongly suggest that much higher cw output powers should be possible if the resonator is re-designed to accommodate the strong thermal lens in the laser crystal and/or an alternative Nd$^{3+}$ crystal host with superior thermal properties to Nd:GdVO$_4$ is used. Improvements to the resonator design to collect the yellow propagating in the backwards as well as the forwards direction (in a similar manner to -switched frequency-doubled Raman lasers) can also be expected to bring significant increases in yellow output power. In the present resonator the yellow beam propagating back along the resonator is lost by absorption in the Nd:GdVO$_4$ laser crystal (the absorption coefficient at 588 nm was measured to be 2 cm$^{-1}$) or through the input mirror. It is noted that absorption of the backwards-propagating yellow beam in the laser crystal further exacerbates thermal loading there.

Operation at 588 nm Using Mirror Sets A and B

Laser performance at 588 nm has been fully investigated using both mirror sets A and B. Mirror set B provided a cavity with much higher cavity Q for both the fundamental and Stokes optical fields, and resulted in substantially lower thresholds and higher output powers, as summarised in Table 3 for the cases of cw and quasi-cw operation. The output powers obtained using mirror set B are approximately twice those obtained with mirror set B. From transmission spectra of the three crystals, the round-trip fundamental and Stokes resonator roundtrip losses are estimated to be around 1.4 and 2.0% using mirror set A (i.e. a resonator finesse approximately in the range 150 to 230), and around 1.2% and 1.2% using mirror set B (i.e. a resonator finesse approximately 260) for the fundamental and Stokes fields. However, it should be noted that the true resonator loss is hard to determine in such a short cavity where the elements are aligned at near-normal incidence in order to maximize the output power.

TABLE 3

Diode powers for SRS threshold and maximum yellow output power using mirror sets A and B

|  | Mirror Set A | Mirror Set B |
| --- | --- | --- |
| Raman threshold (cw) | 6.9 W | 2.5 W |
| Maximum cw 588 nm output (incident cw pump power) | 320 mW (17.6 W) | 704 mW (13.7 W) |
| Raman threshold (quasi-cw) | 7.0 W | 2.5 W |
| Max quasi-cw 588 nm output (incident cw pump power) | 692 mW (21.6 W) | 1.57 W (19.9 W) |

The spectral characteristics of the cw output (not shown) were investigated using an optical spectrum analyzer with 0.06 nm resolution, and the (time-averaged) yellow spectrum found to consist of a single peak at 588 nm with <0.1 nm bandwidth. There was some structure apparent in the fundamental (1063 nm) spectrum with ~'1 nm bandwidth; this spectrum was most stable when the circulating fundamental power was strongly depleted by Raman conversion. It should be noted that corresponding wavelength variations of the Stokes output are well within the wavelength acceptance bandwidth of the LBO (~20 nm-cm).

The cw yellow output was typically concentrated in the lowest order transverse mode, with measured M2 values in the range 2.1-2.5 at maximum power. The fundamental (at 1063 nm) was observed to be highly multimode, having a much higher measured $M^2$, around 7.0. The substantially lower $M^2$ value for the yellow than the fundamental beam is strong evidence of Raman beam clean-up [10]. At maximum output power, the amplitude stability of the yellow was measured (with a fast, ns photodiode) to be 9.5% (2σ/av), whilst the long-term power stability (measured over 10 mins) was 6.5%. A significant portion of the observed amplitude instability is attributed to competition for Raman gain between a number of transverse modes.

Calculation of Intracavity Circulating Power and Intensities

The intensities of the fundamental, Raman and frequency converted (doubled) beams when the laser is in operation can be calculated by the following procedure.

Firstly, the M2 value of the fundamental, Raman and converted beams must be determined, and for the present example these are $M^2$(Fundamental)=3, $M^2$(Raman)=1.1, and $M^2$(Doubled)=1.1.

Next, the mode sizes ω (radii) and areas A (m$^2$) in the Raman and doubling crystals are calculated by ABCD resonator analysis eg. using commercial software package LAS-CAD or from first principles (eg as described in the text "Optical Resonators" by Hodgson). The measured values of $M^2$ above are inputs to this ABCD analysis. In the present example, the mode sizes are estimated to be $\omega_R$=106 μm; $A_{RC}=\pi\omega_R^2=3.53\times10^{-8} m^2$; $\omega_D$=67 μm; and $A_D=1.14\times10^{-8} m^2$.

The next step is to determine the transmission of the output coupler at the fundamental and Raman wavelengths by measuring directly with a spectrophotometer either in-house or by mirror supplier. For the present example (mirror set B), the transmission of the output coupler at the two wavelengths is $T_F$=0.006% and $T_R$−0.004%.

Next, the output powers $P_{out}$ (in Watts) at the fundamental and Raman wavelengths ($P_{outF}$ and $P_{outR}$) are measured using a power meter in combination with optical filters to distinguish between the two wavelengths. For the present example at maximum output power these are: $P_{outF}$=0.03 W and $P_{outR}$=0.005 W.

Now, calculation of the intracavity power in Watts for the fundamental and Raman beams is achieved by dividing the output power by the output coupler transmission:

$$P_{intracavF}=P_{outF}/T_F=500$$

and $$P_{intracavR}=P_{outR}/T_R=125.$$

Finally the intracavity intensity (kW/cm$^2$) of the fundamental beam ($I_F$) in the Raman crystal and that of the Raman beam in the doubling crystal ($I_R$):

$$I_F=P_{intracavF}/A_R=1.146\times10^3 \text{ kW/cm}^2$$

and $$I_R=P_{intracavR}/A_D=886.246\times10^3 \text{ kW/cm}^2.$$

Example 3

Self-Raman CW Laser

In this example, intracavity-doubled cw self-Raman laser operation is observed from a laser system based on a diode-pumped Nd:GdVO4 which generates 678 mW in the yellow at 586 m (with a diode-to yellow conversion efficiency of 4.2%) and 2 W cw at the first-Stokes at 1173 nm. Maximum cw powers at both wavelengths were limited by the effects of strong thermal lensing in the laser/Raman crystal. To explore the potential for generating higher cw powers, the laser was operated in quasi-cw mode (50% pump duty-cycle) to reduce the thermal loading of the crystal, whereupon 1.88 W maximum output power at 586 nm was obtained. To the best of the inventors' knowledge this is the first report of cw self-Raman laser operation in Nd:GdVO4 and efficient intracavity doubling of the first-Stokes field to the visible, and the highest output power of any self-Raman laser.

Experimental Set-Up

Figure 9:
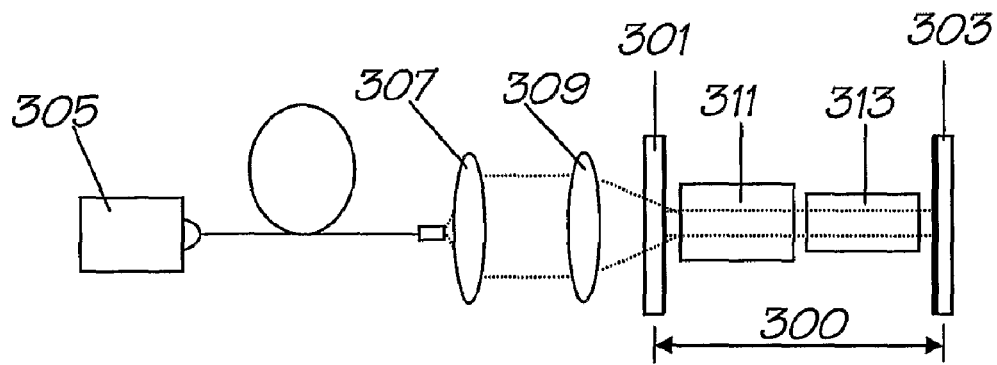
FIG. 9 is a schematic depiction of the self-Raman laser system of the arrangement of Example 3.

The Raman laser configuration is illustrated in FIG. 9. The resonator 300 was bounded by a flat input mirror 301 (coated 96% T at 808 nm, HR (0.006% T) at 1063 nm, 0.004% T at 1176 nm and 93% T at 588 nm) and for infrared (first-Stokes) operation, a 250 mm RoC concave output mirror 303 (coated 0.09% T at 1063 nm, and 0.4% T at 1173 nm). For intracavity frequency-doubled operation the output mirror 303 was a 200 mm RoC concave mirror coated identically to the input mirror 301.

The pump source 305 was a 30 W fiber-coupled 808 nm diode laser (φ=400 μm, NA~0.22), imaged (via lenses 307 and 309) with unity magnification through the input mirror 301 onto the self-Raman laser material 311, which in this example is an a-cut 0.3 at. % Nd:GdVO$_4$ crystal (3×3×10 mm) which was AR-coated for wavelength in the range 1064 to 1200 nm. Second harmonic generation (SHG) of the 1173 nm first-Stokes line was obtained using a nonlinear material 313, which in the present arrangement is a 3×3×10 mm non-critically phase-matched (NCPM, θ=90°, φ=0°) LBO crystal coated AR at 1064-1200 nm and temperature tuned to ~45° C. (temperature tuner not shown). Cavity lengths ranged from 13 to 24 mm (24 mm with the inclusion of LBO).

The thermal lens induced in the Nd:GdVO$_4$ crystal 311 by pump and Raman heating has a strong influence on the cavity stability and the mode-size in the crystal, thus the cavity 300 length was kept to a minimum determined by the length of the intracavity components. In experiments exploring high peak pump powers the thermal effects were mitigated by modulating the diode pump beam with a mechanical chopper giving a square-wave at 200 Hz corresponding to a 50% duty-cycle.

Operation at the fundamental wavelength (1063 nm) of the Nd:GdVO$_4$ laser was characterized using a flat output mirror 303 with 5% transmission (with the LBO crystal removed). For cavity length 45 mm a maximum of 14.4 W cw output was obtained at maximum pump power (26.3 W) incident on the laser crystal. Note that for cavity length 66 mm, the onset of cavity instability occurred at 20 W pump power.

Self-Raman Operation at the First Stokes Wavelength (1173 nm)

Figure 10:
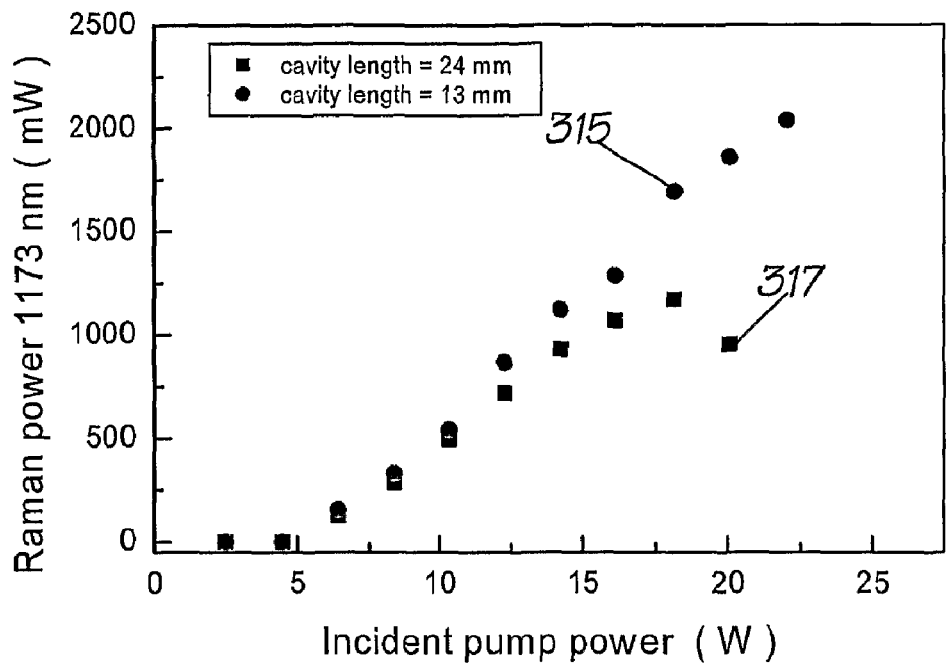
FIG. 10 is a graph of the cw Raman (1173 nm) output powers as a function of incident pump power for 13 and 24 mm physical cavity lengths.

For operation at 1173 nm, laser performance was investigated for 2 cavity lengths: 13 mm and 24 mm. As can be see in FIG. 10, for the shortest physical cavity length possible (13 mm—indicated by filled circles 315) with an output coupler 303 having transmission of 0.4% at 1173 nm, threshold for lasing on the fundamental wavelength was reached at 0.7 W pump power while the threshold for cw Raman oscillation was 4.6 W pump power. Maximum cw output power obtained on the first-Stokes line at 1173 nm was 2.04 W at 22 W pump power, limited by the onset of optical damage to the crystal coatings (rather than the effects of thermal lensing for this shortest of cavities). The observed optical damage was primarily due to the circulating powers in the absence of substantial output coupling.

For the 24 mm-long cavity (indicated by filled squares 317 in FIG. 10), the first-Stokes output power reached a maximum of 1.1 W at 18 W pump power but declined at higher pump powers with the onset of cavity instability. Based on this observation the thermal lens in the Nd:GdVO$_4$ crystal is estimated to be approximately 17 mm (taking account of the refractive index of the crystal itself).

Maximum residual 1063 nm powers, i.e. the 1063 nm output 'leaking' through the end mirror, was ~1.8 W indicating that the output coupling coating was by no way optimized. Substantial increases in Raman power can be expected by increasing the cavity-Q at the fundamental while simultaneously increasing the Raman output coupling to the order of 2-3%. As the non-coupling losses at the Raman wavelength are estimated to be of the order of 1%, it is believed that Raman output powers as high as 4 W could be reached through optimization of the optical coating of the output coupler and yet higher output powers by better thermal lens management.

The spectral characteristics of the fundamental and Stokes output were investigated using an optical spectrum analyzer with 0.06 nm resolution (not shown). The (time-averaged) fundamental spectrum was centered at 1063.2 nm with a bandwidth of 0.5 to 0.8 nm. Typically the output bandwidth increased with pump power and exhibited complex structure which is discussed below. The spectrum of the first-Stokes output was centered at 1173 nm, also with a bandwidth of approximately 0.5 to 0.8 nm. The Raman laser output was linearly polarized for all pump powers with polarization axis parallel to that of the fundamental laser (at 1063 nm which itself was polarized parallel to the crystal c-axis (π-polarized).

Figure 11:
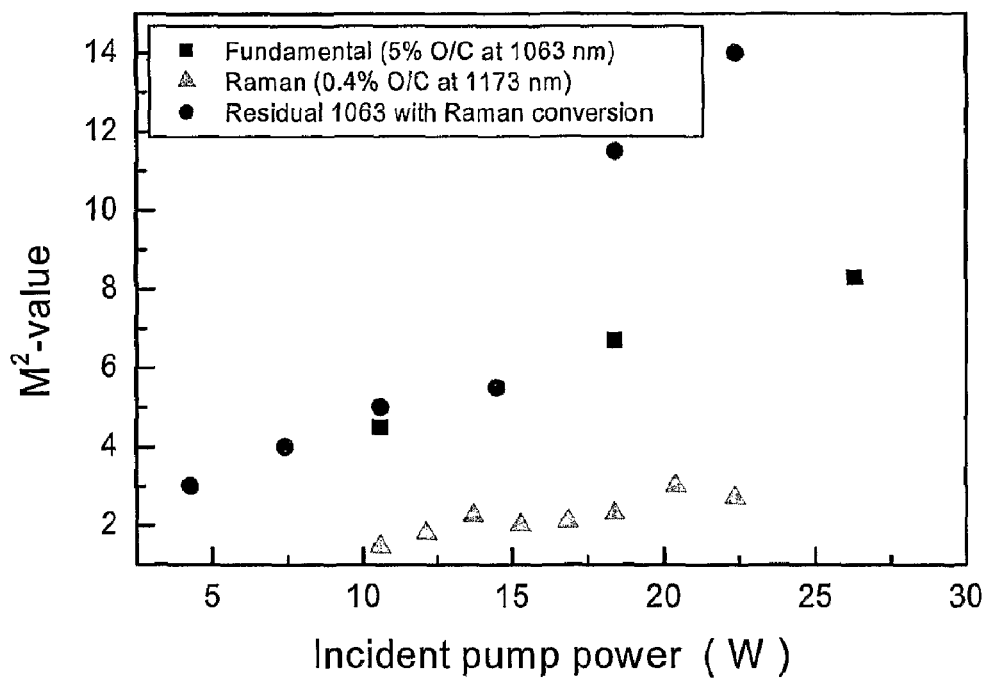
FIG. 11 shows a graph of the beam quality factor (M2) of the optimized fundamental, optimized Raman and residual fundamental in optimized Raman configurations as a function of pump power

Beam quality measurements of the 1173 nm first-Stokes laser output and also of the residual fundamental output showed that the M$^2$-value varied both with pump power and on the level of depletion of the fundamental. Data from these experiments are shown in FIG. 11. For operation at the fundamental wavelength (with a 5% output coupler and SRS not occurring) the output at 1063 nm had a maximum M$^2$-value of 8.3. For increased cavity-Q corresponding to the Raman laser mirror set the beam quality of the fundamental deteriorated rapidly after onset of Raman oscillation, with the M$^2$ value reaching as high as 14 at maximum pump and Raman output power. However, beam quality for the Raman output was much superior, the M$^2$ reaching a maximum value of only 3 at maximum pump/Raman power. This is a consequence of Raman beam clean-up as is known in the context of pulsed Raman lasers.

The peak-to-peak amplitude noise at maximum pump power was measured to be approximately 5% (2σ/av) for frequencies <200 MHz, while the longer-term (10-minute) power stability was determined using a thermal power meter to be better than 3%.

Frequency-Doubled Operation in the Visible (586 nm)

For studies of intracavity frequency-doubling of the Raman optical field the infrared output coupler 303 was replaced with the yellow output coupler (highly reflective at both the fundamental and 1$^{st}$-Stokes wavelengths) and the resonator was extended by 12 mm (to total length 24 mm) to accommodate the LBO frequency-doubling crystal 313. This extended resonator length necessarily lowered the maximum pump power for which resonator stability could be maintained. Despite the added losses arising from the insertion of the LBO crystal in the cavity, the substantially higher Q of the resonator for the infrared wavelengths, resulted in reduction of pump power required to reach 1$^{st}$-Stokes threshold to 2.4 W (cf 4.6 W for the Raman only optimized system).

Figure 12A:
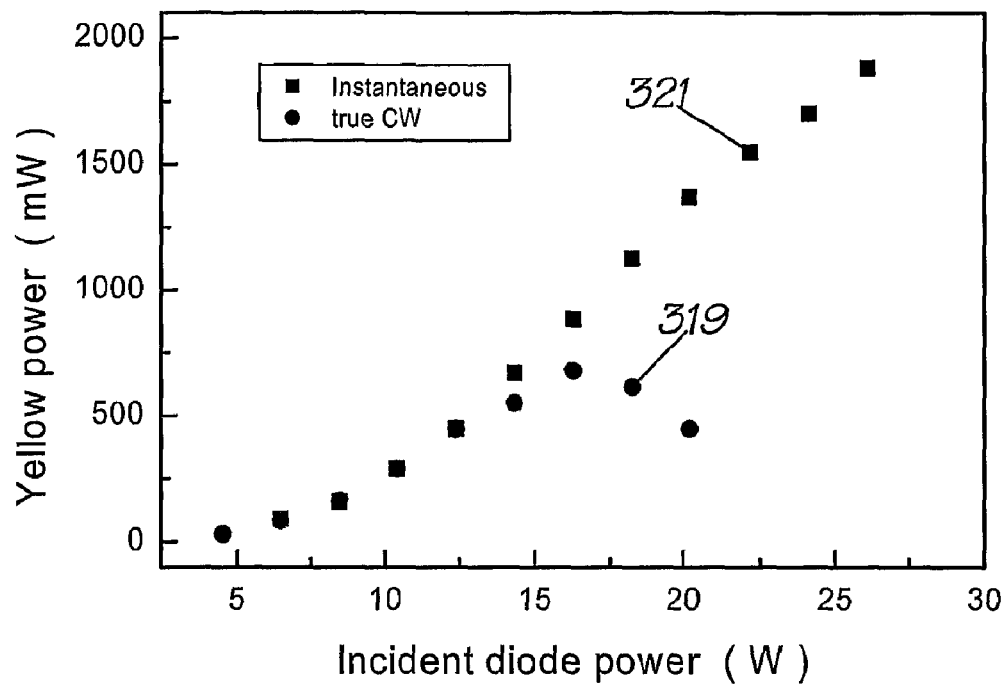
FIG. 12A is a graph of the yellow power as a function of pump power in cw and quasi-cw operation
Figure 12:
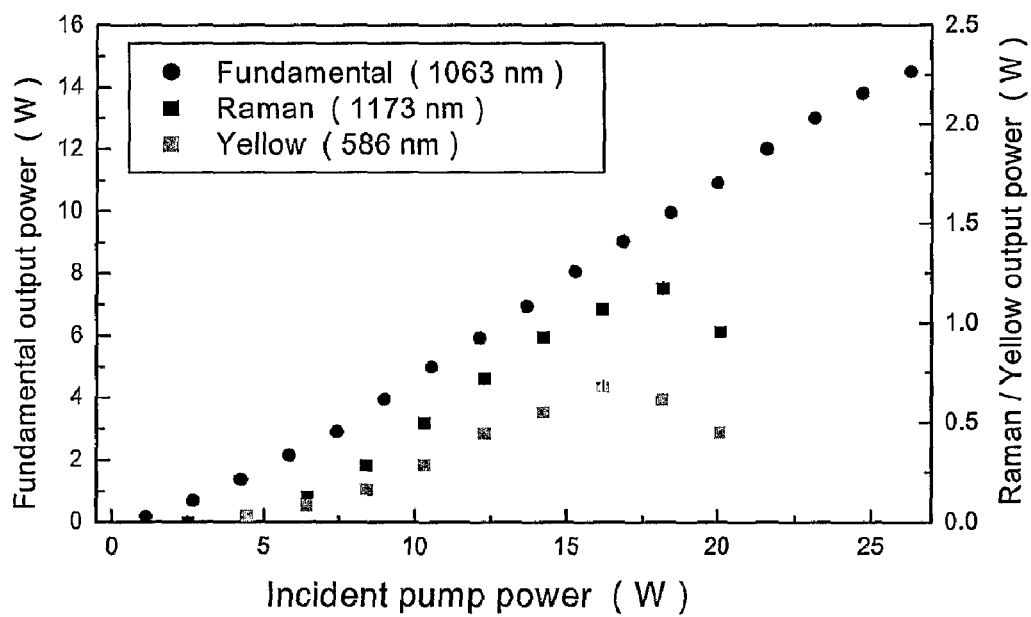
FIG. 12B is a graph of the optimized fundamental, Raman and yellow output power as a function of pump power for a fixed physical cavity length of 24 mm.

The (single-ended) cw powers at 586 nm as a function of diode-pump power incident on the laser crystal are shown in FIG. 12 (filled circles 321). Maximum cw output powers at 586 nm of 678 mW were obtained with incident pump powers of 16.3 W. Residual fundamental and 1$^{st}$-Stokes powers were each less than 200 and 50 mW respectively. We expect that similar powers (at 586 nm) were generated in the opposite direction to those measured and were either absorbed in the Nd:GdVO$_4$ laser crystal (the absorption coefficient at 586 nm was measured to be greater than 2 cm$^{-1}$) or lost through the input mirror. The maximum yellow power was limited by a combination of thermal lensing driving the cavity towards the boundary of resonator stability and the onset of a competing fundamental laser transition (with orthogonal polarization) near 1066 nm. Raman oscillation could not be obtained simultaneously with orthogonal polarization vectors and so operation on this transition acted as a source of loss for both the Raman and second harmonic output. Maximum diode-yellow optical conversion efficiency for fully cw operation was 4.2%, taking account only of the 586 nm power measured outside the coupling mirror. Taking account of the backward-propagating yellow beam, internal diode-yellow efficiency can be estimated to be >8%.

To explore the potential for generating higher cw yellow output powers at higher pump powers (above 17 W) experiments were performed in which the diode pump was operated at reduced (50%) duty cycle using a mechanical chopper inserted in the pump beam path which gave a 200 Hz square-wave pump train. The reduced thermal load in the laser crystal in this quasi-cw mode of operation permitted instantaneous pump powers up to the maximum available without any roll-over in output power (nor any evidence of lasing on the parasitic 1066 nm transition). Data for operation in this quasi-cw mode is included in FIG. 12A (filled squares 321). Maximum (single-ended) yellow output power of 1.88 W (940 mW average) was observed for instantaneous diode pump powers of 26 W (13 W average) with a corresponding diode-to-yellow conversion efficiency of 7.2%.

For pumping at 50% duty cycle the average output power in the yellow was stable over a much larger range of diode powers, consistent with our premise that thermal lensing and associated variations of spatial mode distribution was the primary factor causing the output power instabilities (i.e. the roll-over in the output power). The substantially improved powers and efficiencies achieved for operation with lower thermal loading of the laser/Raman crystal indicate that significantly higher cw output powers can be achieved with further attention to thermal management for the crystal and related optimization of resonator design.

Figure 13:
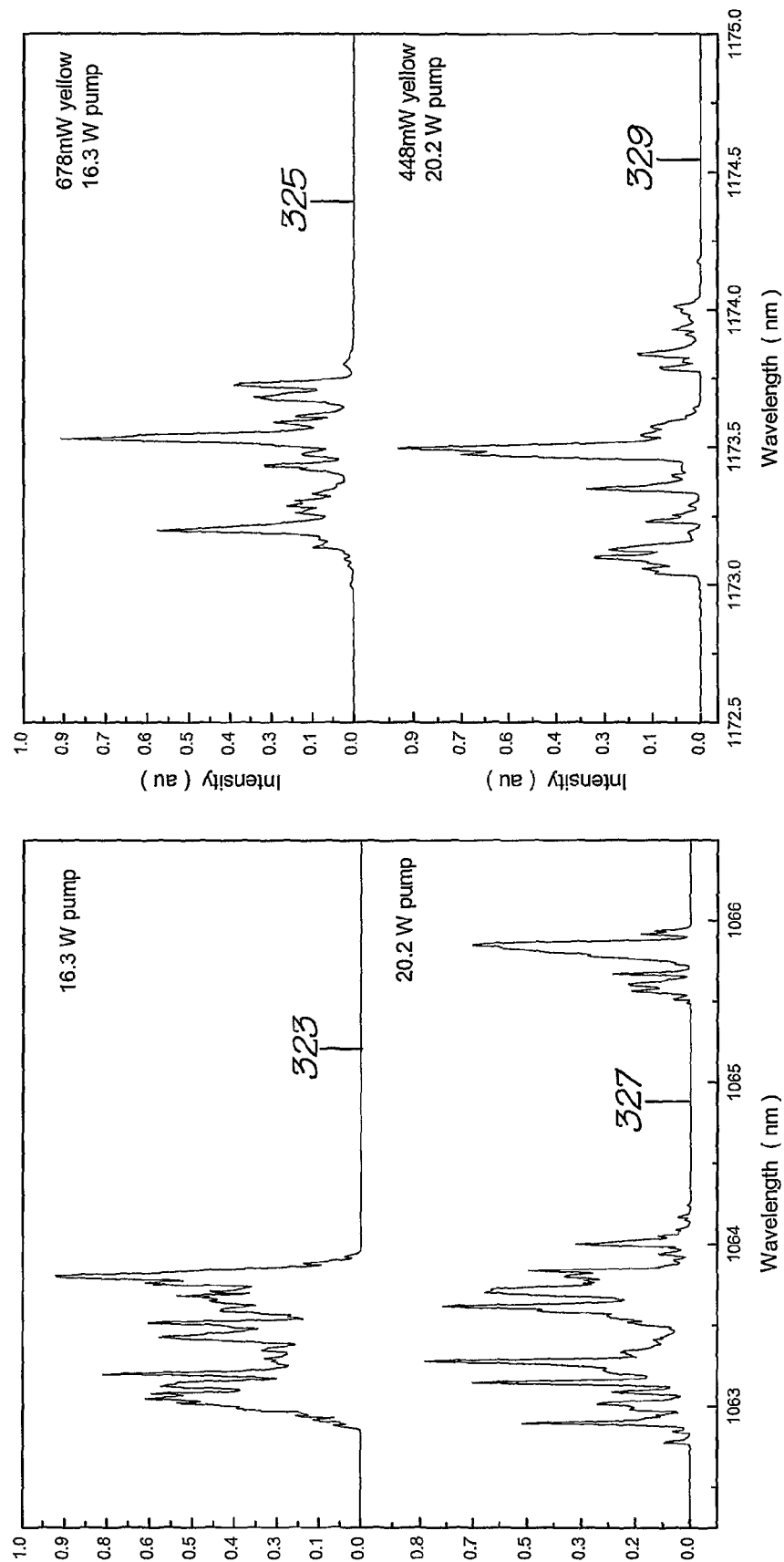
FIG. 13 is a graph of the cw fundamental and Raman spectra at 16 W (maximum yellow output power) and 20.2 W pump power.

Spectral characteristics of the fundamental and 1st-Stokes outputs are shown in FIG. 13 before (upper traces 323 and 325) and after (lower traces 327 and 329) the onset of the parasitic transition at 1066 nm which occurs at approximately 20 W of pump power. Simultaneous operation at 1063 and 1066 nm arises as the increasing loss for the 1063 nm line (as the stokes power increases) results in an increased inversion in the crystal eventually allowing the slightly lower gain 1066 nm line to oscillate. Operation at 1066 nm could be prevented by adding some small polarization dependant loss as the two wavelengths are orthogonally polarized.

Simultaneous operation at 1063 and 1066 nm was unexpected as the 4F3/2-4I11/2 neodymium transition is homogeneously broadened. It is likely that this arises due to strong depletion of the 1063 nm fundamental by the on-axis Raman mode leaves residual off-axis gain which can be accessed by high order transverse modes of the weaker 1065 nm transition whereby the simultaneous operation at 1063 and 1066 nm arises as the increasing loss for the 1063 nm line (as the stokes power increases) results in an increased inversion in the crystal eventually allowing the slightly lower gain 1066 nm line to oscillate. Stricter transverse mode control (by designing the resonator to better accommodate the thermal lens) should prevent 1066 nm oscillation. Operation at 1066 nm could also be prevented by adding some small polarization dependant loss as the two wavelengths are orthogonally polarized.

Figure 14A:
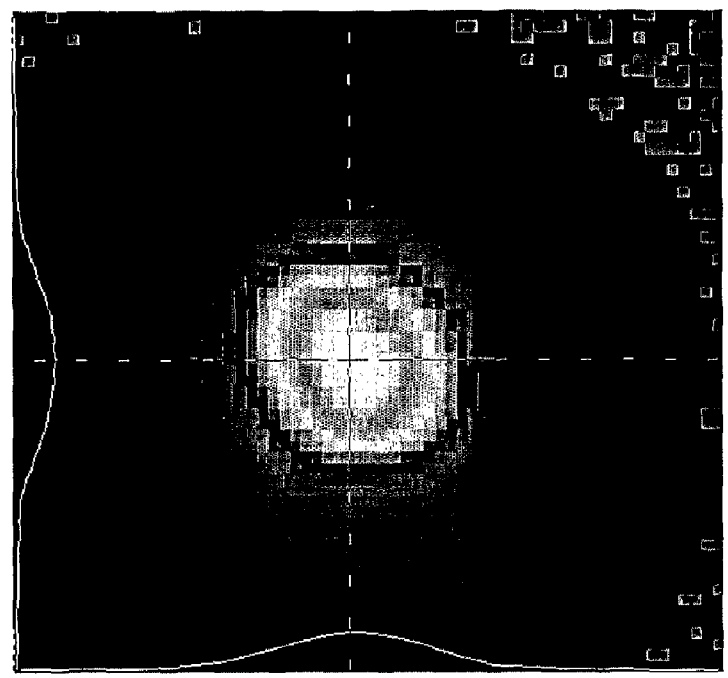
FIGS. 14A and 14B are plots of the near field beam profiles of quasi-cw yellow emission, with near 150 mW output (with ×2 magnification) and near maximum pump with 1.88 W output respectively.
Figure 14B:
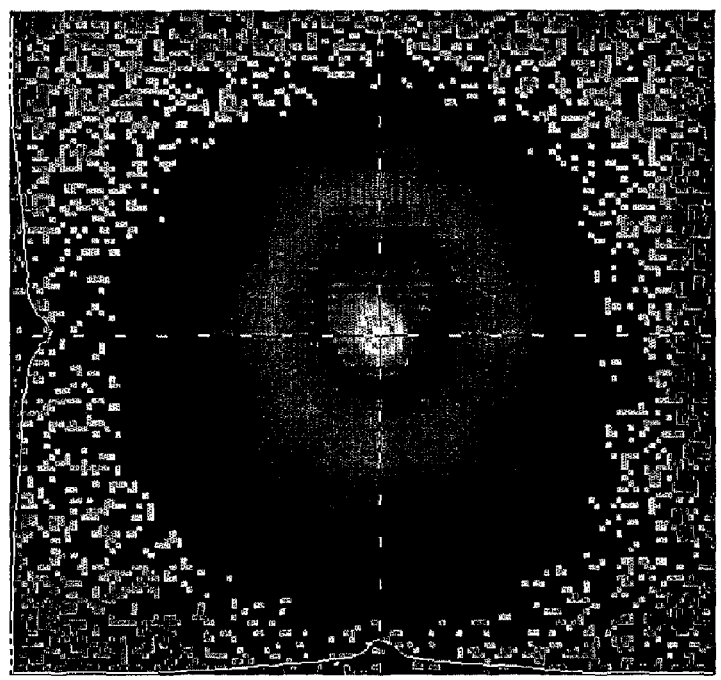

For both cw and quasi-cw modes of operation the beam quality of the yellow emission was dominated by the aberrations induced by the strong thermal lens as well as the large number of transverse modes that reached threshold in the high Q (high finesse) cavity. At low output powers (~150 mW at 586 nm in quasi-cw operation) we obtained Gaussian-like output with $M^2$-values of between 2 to 3. At near maximum output power the spatial mode was strongly peaked with a corresponding higher $M^2$-value of between 5 and 6. Beam profiles and x-y intensity curves near threshold and at maximum pump power are shown in FIGS. 14A and 14B. The reduced beam quality of the yellow emission compared with the Raman only output is predominately attributed to the increased number of transverse modes that were able to oscillate in the substantially higher Q cavity used for operation at 586 nm.

The amplitude stability of the yellow emission (cw and quasi-cw) was dominated by the noise from competing transverse modes. In true cw operation using a photodiode with a 5 ns response time the amplitude stability was measured to be 15% (2σ/av). The long-term noise measured over a 10 minute period (that measured with a thermal power detector) was however only 5.7%. These figures were much improved in the quasi-cw case with a short-term noise value of 8.6% and a variation in average power of only 1.8%. Further improvements are expected by stabilizing the transverse mode structure.

Discussion of Thermal Loading

On the basis of the preceding experimental results, thermal lensing is the main factor limiting further power scaling of the infrared (at 1173 nm) and yellow output. Experimentally, it was observed that (for a fixed cavity length of 24 mm) different output power characteristics resulting from the different thermal loads for systems operating at the fundamental, first Stokes and yellow wavelengths. These results are summarized in FIG. 12B and are discussed further below. It is certainly possible, though challenging, to design a resonator which accommodates the strong thermal lens. However, it is also important to consider and understand the origin of the thermal loading which results in the strong thermal lens. For the case of first Stokes operation thermal loading arises from the absorption of pump light and through the inelastic nature of the SRS process need to be considered, while for yellow optimized operation an additional thermal load from absorption of the backward propagating yellow emission must also be taken into consideration.

The calculated contributions of each of these three thermal loading mechanisms are listed in Table 4 with approximate cumulated thermal lens values for the case of 20 W pump power. Note that it is difficult to assess the relevant mode size for the different thermal loading processes as the exact waist position and effective mode size is not well known. For the diode-pump induced thermal load, the pump spot size was geometrically averaged over the pump absorption length which was 3 mm at 20 W of pump power (the absorption length varied from 5-1 mm between Raman threshold and maximum pump power). For the SRS and yellow absorption loading mechanisms, the mode size used to calculate the thermal lens was obtained by averaging the calculated fundamental-mode (TEM00) size over the GdVO4 crystal length (taking into account the generated thermal lens in a 24 mm resonator), multiplying by SQRT[M2-value] and iterating this process until a self-consistent result was obtained. The thermal load factors were taken to be 0.32 for the pump loading, 0.1 for the SRS process and 0.95 for yellow light absorption (based on a measured absorption coefficient in GdVO4 of 2 cm-1 at 586 nm).

TABLE 4

Calculations of induced thermal lensing by pump loading, SRS and yellow absorption, in $NdGdVO_4$ for the cases of fundamental operation, first Stokes operation and yellow operation absorption, with 20 W of diode pump power.

| | Thermal loading process | | |
|---|---|---|---|
| | Pump loading | SRS | Yellow absorption |
| Wavelength | 808-1063 nm | 1063-1173 nm | 586.5 nm |
| Thermal load factor | 0.32 | 0.1. | 0.95. |
| Optical power | 20 W | 6 W | 0.7 W |
| Thermal load @ 20 W pump | 4.8 W | ~0.6 W | 0.67 |
| $TEM_{oo}$ mode size | $\omega_{av}$(pump) = 414 μm | $M^2(1173) = 3$, $\omega_{TEM00} = 100$ μm $\omega_{1173} = 173$ μm | $M^2(586) = 5$, $\omega_{TEM00} = 88$ μm $\omega_{586} = 341$ μm |
| Predicted thermal lens power | 19 diopters | 10.4 diopters | 8.5 diopters |

| | System optimized for: | | |
|---|---|---|---|
| | Fundamental operation | First Stokes operation | Yellow operation |
| Cumulative thermal lens power | 19 diopters | 29.4 diopters | 37.9 diopters |
| Cumulative lens focal length | 5.2 cm | 3.4 cm | 2.6 cm |

The calculations shown in Table 4 (based on 20 W diode pump powers incident on the laser crystal) indicate that the thermal lens taking only pump induced heating into account has a focal length of approximately 52 mm. This compares reasonably well with earlier estimates of the thermal lens focal length (60 mm) for operation on the fundamental alone at 20 W pump power, and as expected, there is no rollover observed in the output power at the fundamental.

If the additional thermal loading due to Raman heating for laser operation on the 1st-Stokes line is taken into account, the focal length of the thermal lens is calculated to be to be approximately 34 mm. However, as can be seen from FIG. 12B for a resonator length of 24 mm, the 1st-Stokes power passes through a maximum at only 18 W pump power, suggesting that the thermal lens is much stronger (f~20 mm) stronger than the estimate based on pump and Raman heating alone. As previously noted for cw Raman lasers based on discrete laser and Raman crystals there appear to be additional thermal loading processes in play. These may include trace impurity absorption or excited-state absorption in the laser/Raman crystal. It is observed that the $Nd:GdVO_4$ crystal emits a blue fluorescence in operation and this fluorescence increases significantly (possibly also associated with a slight shift in wavelength of the fluorescence) above the Raman threshold indicating the initiation o the Raman conversion in the laser/Raman crystal, and this effect is useful when setting up the laser.

Furthermore, taking into account the backwards generated yellow light, and assuming that 95% of the yellow output is absorbed in the Nd:GdVO4 crystal, it is estimated that the induced thermal lens to have focal length ~26 mm, approximately 30% stronger than for 1st-Stokes-only operation. Based on the data of FIG. 12B it is estimated that the thermal lens power for frequency-doubled operation is indeed ~30% stronger than for 1st-Stokes-only operation, suggesting that the source of unidentified additional heating is associated primarily with the Raman process alone.

It is interesting to note that calculations made using laser resonator modelling software package LASCAD for the present arrangement with a 24 mm length resonator and accounting for the RI of the intracavity crystals predicts that the fundamental $TEM_{00}$ mode size in the self-Raman laser medium $Nd:GdVO_4$ gets smaller as a function of pump power due to the strengthening thermal lens. As the pump mode remains fixed, this reduction in fundamental mode size would largely account for the increased number of transverse modes that begin to oscillate (and hence increased $M^2$-value) at higher pump powers. For the present resonator arrangement, LASCAD calculations also predict that, only when the thermal lens gets stronger than 20 mm does the mode size substantially increase in the laser crystal before reaching cavity instability with a input coupler 301 with a focal length of 13 mm. It is therefore expected that improvements to the amplitude stability and $M^2$-value should be possible with the use of apertures to prevent the onset of unwanted transverse modes and achieve a single transverse mode.

Strategies to reduce the thermal load and hence the induced lens are currently being investigated and include using higher purity crystals, redirecting the yellow light with an intracavity mirror and reducing the intracavity intensity through improved extraction of the Raman optical field. Alternatively, by incorporating the thermal load into resonator design, for example using a convex input mirror to partially offset the thermal lens should improve the resonator stability and hence the power extraction. Alternatively an athermal-cut Nd:KGW crystal may circumvent many of the problems encountered with Nd:GdVO4 and it is expected that this approach will be very successful due to the fact that the fundamental and Raman gains are similar in both the Nd:KGW and Nd:GdVO4 materials.

Summary

The present example demonstrates the first diode-pumped continuous-wave self-Raman $Nd:GdVO_4$ laser with 1st-Stokes output at 1173 nm and intracavity frequency-doubled output at 586.5 nm. A maximum cw power at 1173 nm of 2 W was obtained for diode pump powers of 22 W whilst maximum cw powers at 586 nm of 678 mW were obtained with 16.3 W pump. Infrared and yellow powers were limited by thermal lensing in the gain medium and parasitic oscillations of other neodymium transitions. In quasi-cw operation at 50% duty-cycle much higher maximum yellow output powers were obtained as the reduced thermal load allowed cavity stability to be maintained up to the maximum available pump power. In this case a maximum yellow power of 1.88 W was observed with 25.7 W incident pump power. Increased Raman output powers are expected using a longer Nd:GdVO4 crystal in order to achieve higher Raman gains whilst also accommodating the strong thermal lens, while increased yellow output powers may be obtained by incorporating an intracavity mirror to collect both the forward and backward propagating yellow emission. It is expected that by managing the thermal loading and collecting all the generated yellow emission, cw yellow output powers greater than 3 W can be achieved at >10% diode-yellow conversion efficiency for diode-pump power no greater than 30 W.

Example 4

Low Power Self-Raman CW Laser

One significant disadvantage of self-Raman lasers is that thermal loading effects are more severe than for Raman lasers using discrete laser and Raman crystals, since thermal loading due to diode pump absorption and the deposition of energy via the inelastic SRS process occurs simultaneously in the same volume.

As seen in Example 3 above, the inventors have realised cw self-Raman laser action in a 10 mm length of $Nd:GdVO_4$, with intracavity frequency-doubling to generate a maximum output of 700 mW at 588 nm from 16 W pump power with a diode-to-yellow efficiency of 4.2%. The output power was limited by the extremely strong thermal lensing which occurred in the $Nd:GdVO_4$, which caused the resonator to approach the optical stability limit, and contributed to poor matching of the diode pump spot with the cavity mode. Consequently, the beam quality was relatively poor, with $M^2$~2.5.

In the arrangements of the present example, development of a compact, low power, high-beam quality cw yellow devices, pumped by a 4 W high brightness laser diode is discussed. Through careful resonator design, efficient optical (diode to yellow) conversion (4.3%) and high beam quality ($M^2$~1.1) are realised in a single device. Several resonator designs have been examined in order to optimise output power and beam quality. The small excitation volume offered by the high brightness pump source limits the number of transverse modes within the cavity, and by designing a resonator which allows the cavity mode to be well-matched to the pump spot, high beam-quality yellow emission can be obtained with high slope efficiency.

Experimental Details

In this example, a neodymium-doped yttrium orthovanadate [Nd3+:YVO4] crystal was used as both the laser and Raman medium (a self-Raman medium). Nd:YVO4 has a large stimulated emission cross-section of $25 \times 10^{-19}$ $cm^2$ at 1.064 µm and a high absorption coefficient of 31.4 cm-1 at 810 nm for light polarised along the c-axis. The YVO4 crystal has a Raman gain coefficient of greater than 4.5 cm/GW with a linewidth of ~3 cm-1 and an intense Raman peak at 890 cm-1. For operation on the 1.064 µm line of the Nd3+ ion, the YVO4 host generates a first-order Raman Stokes emission at 1.176 µm.

Figure 15:
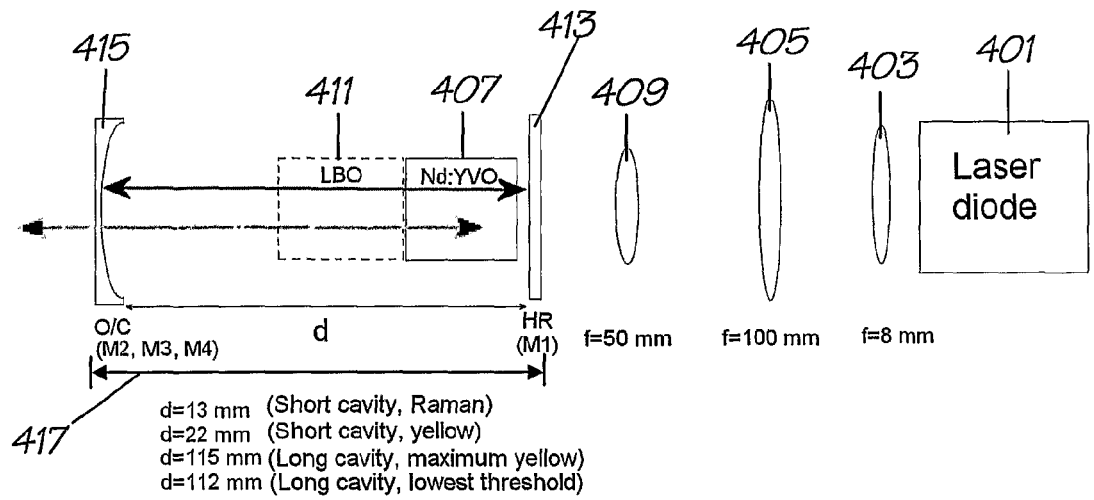
FIG. 15 is a schematic representation of the Raman laser system of the arrangement of Example 4.

FIG. 15 shows the experimental arrangement used for the present experiment. A high-brightness diode laser (4.5 W at 0.81 µm, Unique Mode: UM 4200-M-20-CB-TEC, M2~20) was used as the pump source 401. The diode output was expanded and collimated using a telescope arrangement (lenses 403 and 405) and then focussed into the Nd:YVO4 self-Raman crystal 407 using a 50 mm focal length lens 409. The focal spot in the self-Raman medium 407 was approximately 130 µm in diameter. The Nd:YVO4 crystal 407 (0.3% doping, a-cut, available from Fujian Castech Crystals, Inc., Fujian, P.R.China) had dimensions 3×3×10 mm was coated on both faces with 98% transmission at 0.808 nm and >99.5% transmission at 1.064 µm and 1.176 µm. The LBO crystal 411 (Castech, non-critically phase matched, θ=90°, Φ=0° with dimensions 3×3×10 mm) used to frequency-double the Raman wavelength was maintained at a temperature of ~45° C. and was AR coated at 1.064-1.200 µm. The pump mirror M1 413 was flat and coated R=99.994% at 1.064 µm and R=99.996% at 1.176 µm. Several different mirrors M2-M4 (collectively output coupler 415 in FIG. 15) were used as output couplers for both compact (with the length of the optical resonator 417 ranging from 13 to 22 mm) and extended (with the length of resonator 417 from 112 to 115 mm) cavities. The relevant specifications of mirrors 415 are summarised in Table 5.

TABLE 5

Summary of output couplers 415.

|  | RoC[1] | R at 0.588 µm | R at 0.808 µm | R at 1.063 µm | R at 1.177 µm |
|---|---|---|---|---|---|
| M2 (Raman cavity) | 200 mm | <5% | <15% | 99.914% | 99.607% |
| M3 (Yellow cavity) | 150 mm | 0.015% | 0.032% | 99.994% | 99.996% |
| M4 (Yellow cavity) | 100 mm | 0.015% | 0.032% | 99.994% | 99.996% |

[1]Radius of Curvature (concave)

Results and Discussion
Compact Cavity Configuration

The characteristics of the laser system at the fundamental, first Stokes and its second harmonic were first investigated using a short plano-concave cavity. All components were in close proximity, separated by <1 mm, resulting in a total cavity length of 13 mm. For operation at the fundamental, an output coupler with 10% transmission at 1.064 µm and 500 mm (concave) radius of curvature was used. For the maximum incident diode power (4.2 W), 2.2 W was obtained at the fundamental, with 0.25 W threshold and 53% slope efficiency with respect to power incident on the laser crystal.

Figure 16:
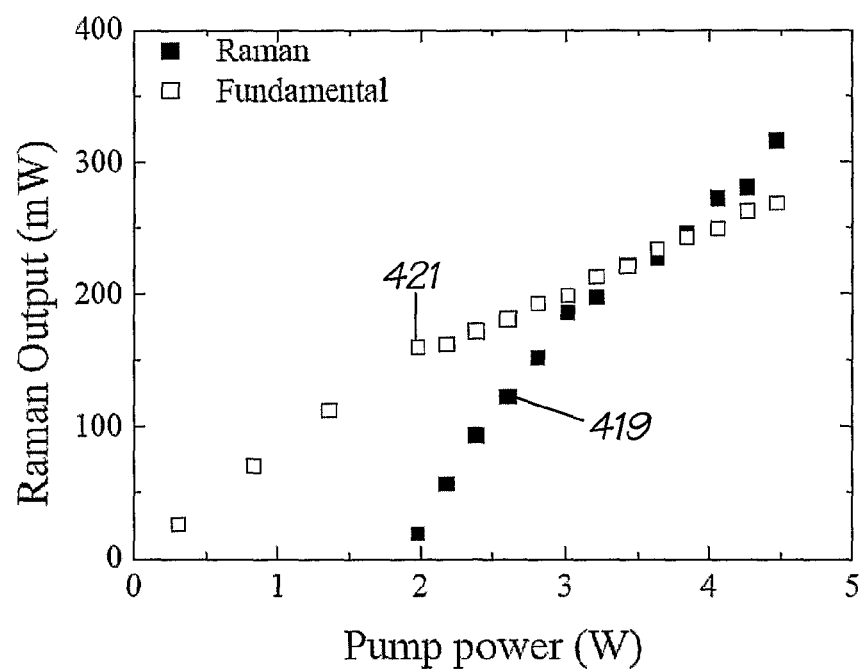
FIG. 16 is a graph of the laser characteristics for first Stokes operation using short cavity for an arrangement of Example 4.

Initially, the operation of the laser at the fundamental and 1st-Stokes wavelengths of 1064 nm and 1176 nm was investigated without the doubling material 411 in the laser resonator cavity 417. Operation on the first Stokes wavelength was obtained with mirror M2 as the output coupler, providing high Q (high finesse) for both the fundamental and Stokes optical fields, and the characteristics of the laser in this arrangement are shown in FIG. 16. Threshold diode-pump power for the fundamental was very low (~100 mW), and for the first-Stokes output was around 1.9 W. A maximum 1.176 µm Raman output power of 320 mW was measured after the output coupler for 4.5 W pump power and slope efficiency was approximately 12%. The first-Stokes power 419 and the residual power of the fundamental at 1064 nm 421 are shown as functions of diode power incident on the laser crystal in FIG. 16. Depletion of the fundamental power 421 above SRS threshold of ~1.9 W is clearly evident.

Figure 17:
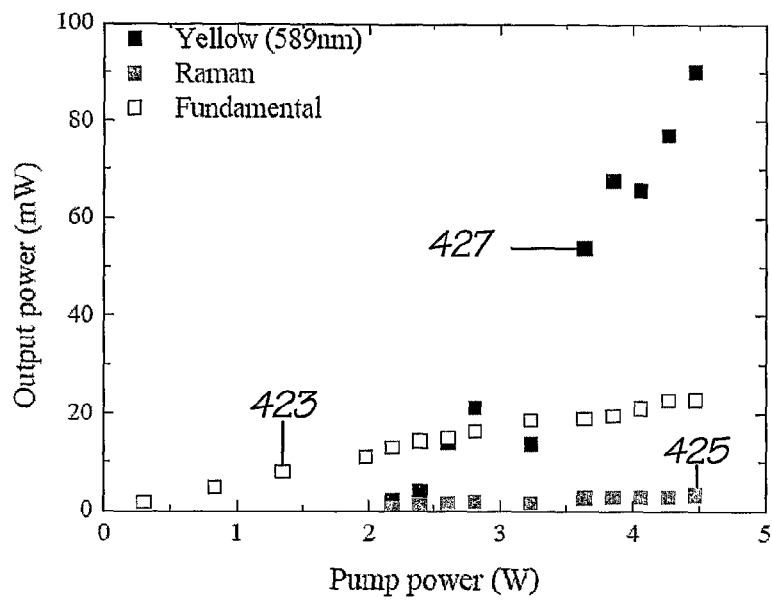
FIG. 17 is a graph of the yellow laser characteristics with residual infrared output for short cavity for a further arrangement of Example 4.

The resonator cavity 417 was then lengthened to 22 mm to accommodate the LBO crystal (nonlinear material 411 of FIG. 15), and mirror M3 selected as the output mirror 415. FIG. 17 shows a graph of the laser output at the fundamental 423 (1064 nm), the 1st-Stokes 425 (1176 nm) and the nonlinear converted 427 (588 nm) wavelengths. The first-Stokes Raman threshold was slightly higher, at 2.2 W because of insertion losses associated with the additional crystal (i.e. the nonlinear crystal 411). However, above threshold the yellow power 427 increased linearly to a maximum of 92 mW at 4.5 W diode-pump power, with a diode-to-yellow slope efficiency of 3.8%. Due to the very high reflectivity of mirror M3 at the fundamental and first Stokes wavelengths, only a small amounts of infrared radiation could be detected, <5 mW at the first Stokes and <25 mW at 1.064 µM.

A Spiricon beam analyzer was used to inspect the spatial properties of the yellow output and the fundamental (the Stokes output was too weak to observe in this case). The yellow output occurred predominantly in the lowest order (TEM$_{00}$) transverse mode, but appeared substantially aberrated with beam quality M$^2$~3. The fundamental at 1.064 µm was observed to comprise many high-order transverse modes, with poor mode stability evident. Optimising the mode-matching between the pumped volume of the Nd:YVO$_4$ and the TEM$_{00}$ resonator mode had little effect on the transverse mode of the fundamental.

From observations of resonator stability, combined with resonator modelling of the compact cavity using the LAS-CAD, it was determined that a positive thermal lens with focal length around 2 cm was formed within the Nd:YVO$_4$ crystal for the maximum incident diode power of 4.2 W. The thermal load which causes the thermal lensing within the Nd:YVO$_4$ crystal arises from several processes. The first and largest thermal load arises from the absorption of the diode pump light, of which approximately 30% goes to heating the laser crystal. The second source of heating arises from the inelastic nature of the SRS process; the heat load per Stokes photon generated is simply the difference between the fundamental and first Stokes photon energies. Thirdly, because the yellow output generated in the LBO crystal propagates in two opposite directions, substantial amounts (comparable to the yellow output power) of yellow light are absorbed in the Nd:YVO$_4$ crystal, which has a measured absorption coefficient of 2 cm$^{-1}$ at 588 nm. The estimated thermal lens is in fact stronger than expected on the grounds of these factors alone, and as discussed previously, we believe additional thermal loading arises from weak absorptions (eg. due to impurity ions, or excited state absorption), from the very high circulating powers (~1 kW) at the fundamental and first-Stokes wavelengths.

Figure 18:
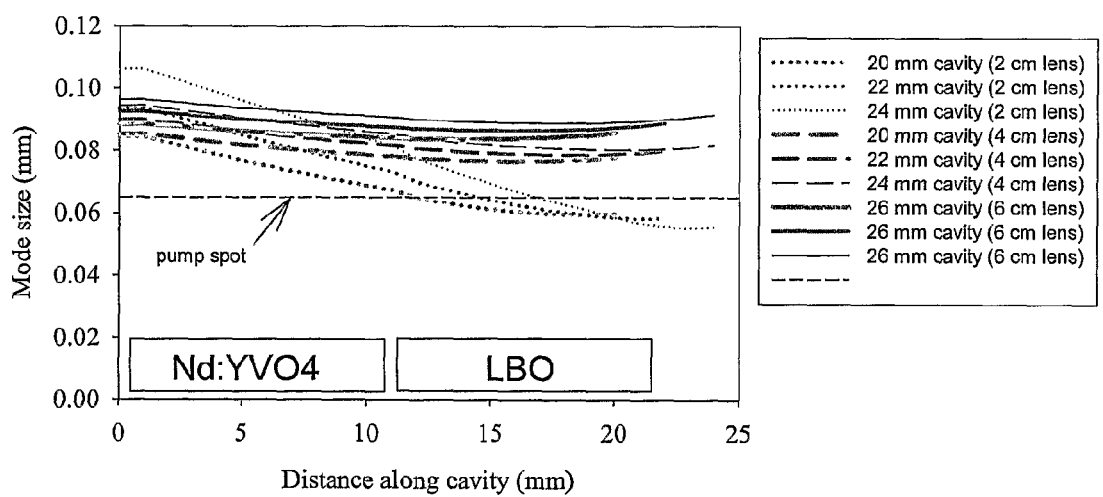
FIG. 18 is a graph of cavity mode size calculations using LASCAD commercial laser design software showing the change in mode size as a function of axial position for the short cavity.

Resonator modelling (using LASCAD) was undertaken to understand how to better optimise the resonator design, in order to improve both conversion efficiency and beam quality. FIG. 18 depicts the resonator mode size along the length of the cavity for thermal lens focal lengths of 2 cm, 4 cm and 6 cm, and for three resonator lengths (20 mm, 22 mm and 24 mm, with the crystals overlaid on the plot for convenience. Four important observations can be made from FIG. 18. First, the cavity mode substantially overfills the pumped volume. Second, increasing the resonator length makes mode-matching in the laser crystal worse. Third, cavities with shorter focal length have larger mode sizes in the laser crystal, and correspondingly worse mode-matching.

The highest yellow output powers were obtained when the cavity was very close to the stability limit; however in this regime, it is usually difficult to obtain robust operation because the spot size is most sensitive to small changes in alignment. Clearly the design is far from optimum, in that the mismatch between pumped volume and cavity mode will result in a strongly aberrated output beam, and there are no degrees of freedom in the "short" resonator design for optimisation.

Long Cavity

Figure 19:
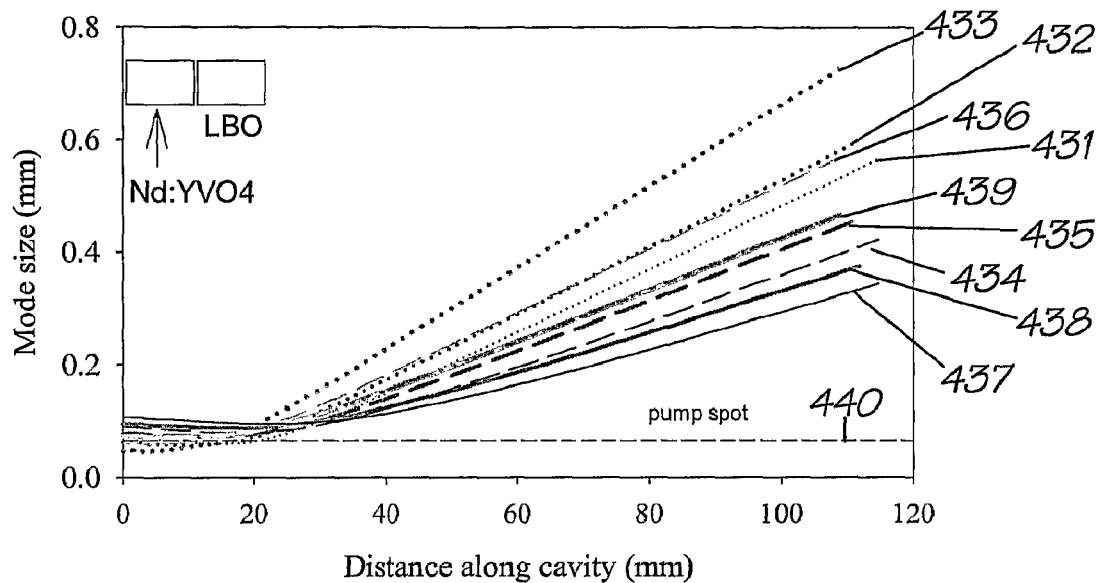
FIG. 19 is a graph of cavity mode size calculations using LASCAD commercial laser design software showing the change in mode size as a function of axial position for the short cavity.

The design of the short cavity was limited in that it was not possible to fully-optimise the mode-matching in the Nd:YVO$_4$. Therefore a further resonator arrangement which would allow this optimisation and hopefully enable improved beam quality and increased output power was designed. A plano-concave cavity was chosen in which the mirror separation was close to the sum of maximum thermal lens (~2 cm) in the NdGdVO$_4$ and the concave radius of curvature of the output coupling mirror M4 (10 cm). FIG. 19 shows the cavity mode for some different cavity lengths and for three thermal lens powers: dotted lines 431, 432 and 433 are plots of the mode size for lengths of resonator 417 of 115 mm, 112, mm and 109 mm respectively in the presence of a thermal lens in the self-Raman medium 407 with a focal length of 2 cm; dashed lines 434, 435 and 436 are plots of the mode size for lengths of resonator 417 of 115 mm, 112, mm and 109 mm respectively in the presence of a thermal lens in the self-Raman medium 407 with a focal length of 4 cm; and solid lines 437, 438 and 439 are plots of the mode size for lengths of resonator 417 of 115 mm, 112, mm and 109 mm respectively in the presence of a thermal lens in the self-Raman medium 407 with a focal length of 6 cm. Also shown is the pump spot radius 440 and the approximate positions of the Nd:GdVO4 and LBO crystals (407 and 411 respectively). Several observations can be made from FIG. 19. First, the cavity mode size is well matched to the fundamental in the Nd:GdVO4 crystal. Second, mode-matching can be optimised by translating the output coupler 415 by only a few mm along the axis of resonator 417. Third, as the thermal lens focal length becomes shorter, the cavity mode size in the Nd:GdVO4 becomes larger, thereby increasing the volume where heat is deposited through the SRS process, and satisfying $d\omega/df_{thermal} > 0$ which is the preferred relationship to mitigate against the effects of thermal lensing.

In operating the Raman laser using the long cavity configuration, an 810 nm band-pass filter (not shown) was inserted in the path of the pump beam from pump laser 401 and served to prevent the substantial amounts of yellow light from reaching, and potentially damaging the laser diode 401; this in turn reduced the maximum available pump power from the pump laser 401 to 3.2 W, compared to the 4.5 W available to the short cavity. As before, the Nd:YVO4 and LBO crystals were positioned as close as possible to one another and to mirror M1 413. As expected from the modelling, the cavity length of resonator 417 was a critical parameter in optimising the resonator for maximum output power, and was varied over the range from approximately 110 to 120 mm using a translation stage.

Figure 20:
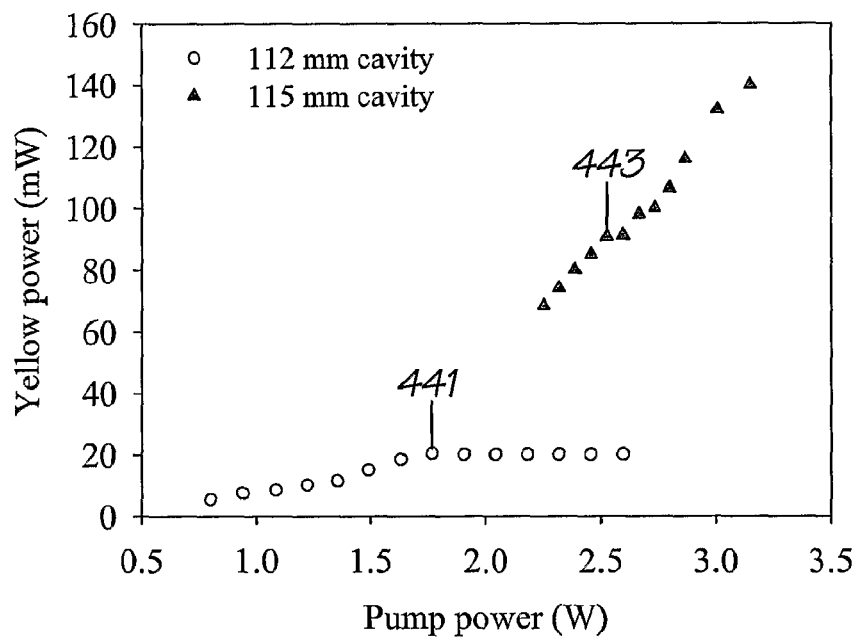
FIG. 20 is a graph of output power as a function of pump power for the 112 mm and 115 mm long cavities of Example 4.

It was observed that the laser operated in two regimes depending on the cavity length, one with a low Raman threshold and low yellow power and another regime with a high Raman threshold and high yellow power, these features are highlighted in Table 6. When the cavity length was set to 112 mm, a low Raman threshold of 0.8 W pump power was observed. When the cavity was extended to 115 mm, the Raman threshold increased to 2.3 W, however, the maximum yellow output power also increased to 140 mW. FIG. 20 shows a plot of the yellow output power as a function of pump power for the 112 mm and 115 mm cavities (441 and 443 respectively).

The plots 441 and 443 demonstrate the importance of the thermal effects. The lowest threshold was achieved for cavity length of 112 nm (plot 441), and the resonator design was such that the cavity mode-sizes in the Nd:GdVO4 and LBO crystals (407 and 411 respectively) were near-optimum for obtaining Stokes output. However, as the pump power was increased above threshold, thermal loading of the Nd:GdVO4 was such that the cavity mode size was no longer optimised, and the yellow power did not increase beyond 20 mW. It is therefore necessary to design and optimise the resonator to correspond the required maximum input and output powers, and in the case of FIG. 19, near-optimum cavity mode sizes for the maximum diode power were obtained for a slightly longer cavity (115 mm) as can be see from plot 443, however, the threshold was considerably higher, at around 2.0 W.

As has been shown, modelling of the resonator using LAS-CAD has indicated that for the given cavity arrangement, an increase in cavity length (shifting the output coupler only) from 112 mm to 115 mm decreases the cavity mode size by 20 µm at the beam waist. This in turn changes the mode size within the Nd:YVO$_4$ crystal enabling better overlap between the pump spot and the cavity mode at the fundamental wavelength.

In comparison with the results obtained using the short cavity, the 115 mm long cavity exhibits a significantly higher diode-to-yellow conversion efficiency of 4.4% (slope efficiency of 7.9% above threshold), and a higher Raman threshold. It should be noted that the measured output power at the Stokes wavelength for both the short and long cavities never exceeded 5 mW, due to the high reflectivity of mirrors M3 and M4 at the Raman wavelength.

The beam quality of the yellow output was substantially improved in comparison to the short cavity with M2~1.2 being recorded. Not only do the thermal effects impact on the stability of the cavity, they also have a deleterious effect on the beam quality, and this much-improved beam quality is attributed to better matching of the pump beam with the cavity mode.

The amplitude noise on the yellow output was investigated using a fast photodiode (Thorlabs: DET10A/M) and 2 GHz oscilloscope and found to be quite high, with peak-to-peak amplitude noise of 15%. By comparison, the fundamental and first Stokes outputs have much lower amplitude noise, around 3%. This "yellow problem" is similar to the well-known "green problem", which arises from the many oscillating longitudinal modes which are coupled through the sum frequency generation process. For the sake of comparison, the fundamental 1064 nm radiation was frequency-doubled (using a 15 mm long LBO crystal cut for type 1 critical phase matching (theta=90, phi=10.6 deg.) from the long cavity and the amplitude noise of the doubled light was analyzed. At maximum pump power (0.5 W green from 3.2 W pump) the green output also had a significant amplitude noise: 17.15% being recorded, which was comparable to the noise observed from the yellow output.

Figure 21:
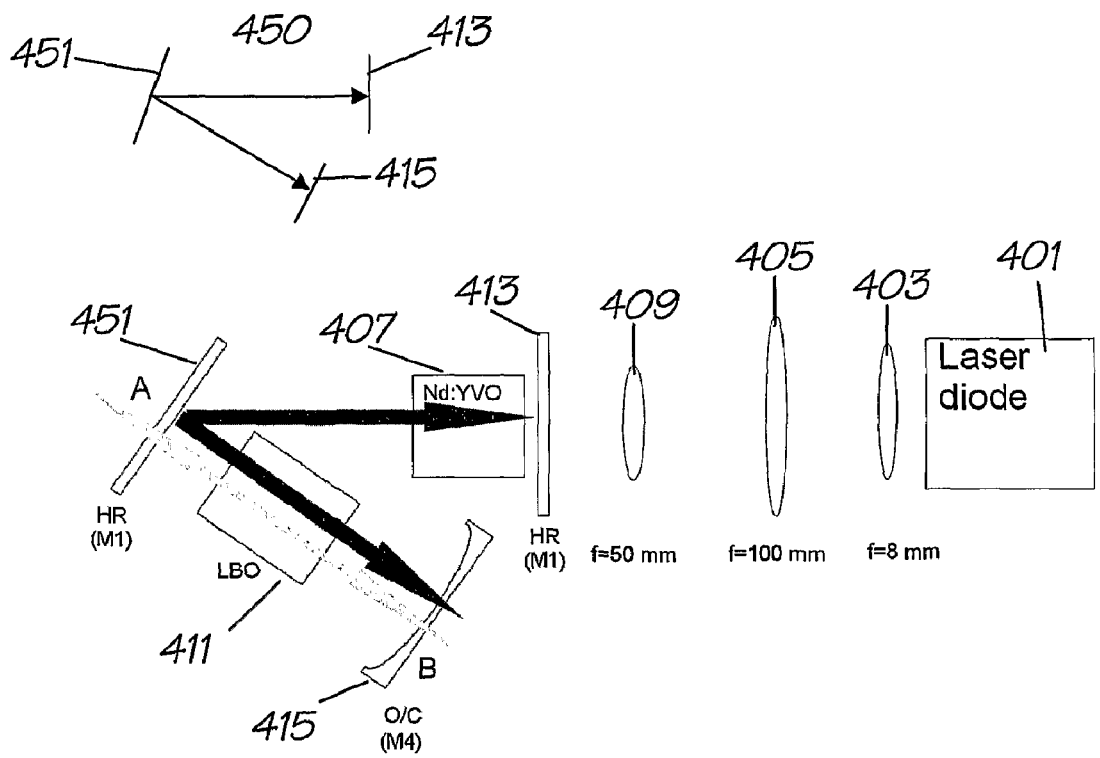
FIG. 21 is a further schematic arrangement of a coupled cavity arrangement of Example 4.

While the long cavity design yielded significant improvements in beam quality and output power over the short cavity design, the yellow output power is substantially limited because only the yellow light generated towards the output coupler is collected. A similar amount of yellow light is generated in the opposite direction, and is either absorbed in the Nd:YVO$_4$ laser crystal (absorption coefficient measured to be 2 cm$^{-1}$) or passes through the input mirror M1 413. Indeed significant powers >10 mW were observed to propagate back towards the laser diode, prompting us use a 810 nm bandpass filter to protect the diode from the effects of this optical feedback, Folded Cavity In order to prevent yellow light from being absorbed in the gain crystal 407 and preventing feedback to the pump diode 401, a folded cavity arrangement 450 was examined and this arrangement is shown in FIG. 21 where like reference numerals indicate like elements. The resonator cavity 450 made use of a dichroic turning mirror 451 with the same dielectric coating as mirror M1 413, which provided high reflectivity at the fundamental and first Stokes wavelengths, and high transmission in the yellow. The turning mirror 451 was angled as close to normal incidence as possible since it became progressively transmissive at the first Stokes wavelength when positioned away from normal incidence. Turning mirror 451 was set at an angle of 15° for these experiments, and the mirror reflectivity was estimated to be ~99.8% at 1.176 µm at this angle. The nonlinear medium 411 (LBO in this arrangement) was also located as close to the beam waist as possible to ensure the tightest possible spot through the crystal 411, however the spot was necessarily somewhat larger than the case of the long linear cavity described earlier.

In common with the long linear cavity, mirror 215 M4 was used as the end mirror in this setup. Both the turning mirror 451 and mirror M4 415 were >99% transmissive at 588 nm, and yellow light was observed through both ends of the folded cavity 450 (at positions marked A and B in FIG. 21). The system had a Raman threshold of 2.5 W and a combined yellow output (collected from positions A and B) at maximum pump power of 134 mW (4.5 W pump) suggesting that the efficiency of the system was not as good as the straight cavity of FIG. 15. The 25% higher threshold is attributed to increased cavity losses at the first Stokes wavelength, associated with the turning mirror 451. The reduction in output power is attributed mainly to the LBO crystal 411 being located further away from its optimal position close to the Nd:YVO crystal 407. The system exhibited excellent beam quality, with M2=1.1 measured at positions A and B. The improved beam quality is attributed to the yellow light being de-coupled from the Nd:YVO crystal 407 which may introduce aberrations to the beam due to its thermal loading. The amplitude noise was also slightly reduced, with a peak-to-peak variation of 8% being observed. Single ended output powers up to 120 mW were achieved by placing a 200 mm radius of curvature mirror (not shown), coated HR at 588 nm mirror, behind the turning mirror 451 at position A to reflect that output beam onto turning mirror 451. The lower total output power is attributed to some yellow leakage occurring from this additional HR mirror.

Single ended output was also obtained at position A by replacing mirror M4 with a dual-HR (R>99.6% at 1.064, R>99.9% at 1.179 µm, R>99.5% at 0.588 µm) 100 mm ROC mirror at position B. This resulted in a higher threshold and lower total yellow power of 20 mW at position A. The significantly lower yellow output is due to the lower reflectivity of the dual-HR mirror used in the cavity at the Raman wavelength.

SUMMARY

In summary, the folded resonator holds clear potential for generating substantially higher yellow output powers in a single beam, once the transmission characteristics of the folding mirror and end mirror are fully-optimised. An alternative resonator design would be the inclusion of an intracavity mirror into the long cavity which has high transmission at the fundamental and first Stokes wavelengths, and high reflectivity in the yellow.

The main experimental results, including threshold, conversion for the various resonator configurations are summarised in Table 6.

We have demonstrated efficient CW yellow generation from a high-finesse (high Q) Nd:YVO laser pumped using a 4 W high-brightness, diode laser. Consistent with previous examples, the key to efficient Raman and yellow generation is the minimisation of intracavity losses and good overlap between the cavity mode and pump spot.

TABLE 6

Summary of key features for each cavity.

| Cavity Configuration | Output coupler | Cavity Length | Threshold (1.064 µm) | Raman Threshold | $M^2$ | Amplitude stability | Max Output Power |
|---|---|---|---|---|---|---|---|
| Short for Stokes | M2 | 13 mm | 50 mW | 1.9 W | — | — | 320 mW at 1.176 µm; 4.5 W pump |
| Short for yellow | M3 | 22 mm | ~500 mW | 2.2 W | 3.0 | — | 92 mW at 0.588 µm; 4.5 W pump |
| Long for Yellow | M4 | 112 mm | ~500 mW | 0.8 W | — | 16% | 20 mW at 0.588 µm; 3.2 W pump |
| Long for Yellow | M4 | 115 mm | 1.35 W | 2.1 W | 1.2 | 15% | 140 mW at 0.588 µm; 3.2 W pump |
| Folded for yellow | M4 | 115 mm | — | 2.5 W | 1.1 | 15% | 134 mW at 0.588 µm; 4.5 W pump |

In the present example, 92 mW of CW yellow output has been demonstrated from a very compact (~22 mm long), intra-cavity, self-Raman Nd:YVO laser, albeit with fairly poor beam quality ($M^2$~3). Major improvements in output power, up to 140 mW and beam quality ($M^2$~1.2) were obtained by designing a longer resonator which enabled good mode-matching between the cavity mode size and the pump spot.

The yellow output exhibits substantial amplitude noise (around 16% peak to peak) which is analogous the so-called "green problem". Amplitude noise increases with output power, and was slightly reduced when an intra-cavity pin hole was inserted in the cavity.

The arrangements of the present example highlight the need for a very high Q (high finesse) cavity for efficient first Stokes generation and low intracavity losses. The extra losses induced by extra elements in the cavity, for example, the turning mirror 451 at position A of FIG. 21, contributed to a reduced laser efficiency and lower total output power. It is anticipated that even greater yellow output power and efficiencies could be realised by applying HR coatings directly onto the faces of the crystals and/or by diffusion bonding the self-Raman gain crystal 407 and the nonlinear crystal 411 together thereby minimising the number of interfaces within the cavity.

Modelling of Continuous-Wave Intracavity Raman Lasers

Disclosed hereunder is modelling for continuous-wave Raman lasers of the type examined in the examples above, and specifically in relation to Example 2, although it will be appreciated that the analysis is equally applicable to the other examples.

Design Considerations

Intracavity Raman lasers involve two simultaneous optical processes within an optical cavity; generation of fundamental radiation in the laser crystal, and SRS in the Raman crystal (in the case of a self-Raman crystal, both of these processes take place in a single crystal.) In the case of an intracavity frequency-doubled Raman laser, a third coupled optical process—that of second harmonic generation (SHG)—must also be considered. Efficient laser operation requires each of these optical processes to be correctly balanced to produce the optimum overall efficiency.

It is at first sight surprising that cw diode powers of a few watts are sufficient to reach Raman threshold in these devices. In order to provide sufficient round-trip Raman gain, intracavity fundamental intensities of the order of 1 MW/cm$^2$ are required. Given a typical beam radius of 150 μm in the Raman crystal, this corresponds to intracavity powers of order 0.5 kW. Diode pumping of a laser crystal can be thought of as an efficient means to couple the broad-band diode pump power into a high Q (high finesse) cavity, resulting in a cavity enhanced, narrow-band fundamental field. The lasing process also serves to convert the low-beam quality output from the laser diode (that may be of order 100-times diffraction limited, particularly for higher power diodes) into a far higher beam quality intracavity fundamental radiation, permitting tight focusing in the Raman crystal. In this way, the low power diode radiation is transformed into an intense intracavity field that is tightly focused in the Raman crystal reaching the megawatt level.

There are a large number of complexities relating to the operation of these Raman laser devices. Strong thermal lensing occurs in both the laser and Raman crystals. The dynamics of these thermal lenses are different, with the thermal lens power of the laser crystal scaling with absorbed diode pump power, and the thermal lens power in the Raman crystal scaling with the number of Stokes photons generated. Other complexities result from the high Q (high finesse) cavity for the fundamental optical field (and also the Stokes optical field, in the case of yellow generation). It is found that the cavity geometries that produce TEM$_{00}$ output when configured with an optimum output coupling for fundamental emission will oscillate on a large number of transverse modes when the output coupler is replaced with a high reflector.

Raman beam clean-up, a well-known phenomenon which occurs in Raman lasers frequently causes the Stokes cavity field to oscillate on a much smaller number of transverse modes; the extent to which Raman beam cleanup enables high beam quality output to be obtained depends on the details of the resonator. Raman beam clean-up is also beneficial as the transverse mode size of the higher quality beam enables higher power densities to be achieved in the nonlinear material compared to the corresponding situation without Raman beam cleanup where the Raman beam has a similar beam quality to that to the fundamental. Typically, with Raman beam cleanup, the M$^2$ of the Raman beam is considerably lower than the M$^2$ of the fundamental beam (i.e. 2 times, three times lower or more). As an example calculation, consider a laser beam resonating in a cavity with 100 kW of intracavity power. If this beam has a spot size with radius of 200 μm, the power density of the beam is approximately 80 kW/cm$^2$. However, if the beam has a spot size with radius of 100 μm, then the power density is about 318 kW/cm$^2$—i.e a spot size of half the size gives rise to a four-fold increase in the power density. Applying this calculation specifically to Raman beam clean-up (considering a Raman conversion efficiency of 50%), if the intracavity power of the fundamental radiation is 200 W with a spot size in the Raman material with radius 200 μm (power density about 160 kW/cm$^2$) and the Raman beam with clean-up has an intracavity power of 100 kW and a spot size of 100 μm, then the power density of the Raman beam in the Raman material will be about 318 kW/cm$^2$.

Another consequence of the high Q (high finesse) resonator is that the optical fields typically become very strong, ground state absorption, two-photon absorption, excited state absorption, and trace absorption in the nonlinear crystals (due for example to small amounts of impurity ions) can become significant in the laser, Raman and/or nonlinear crystals. Higher thermal loading of Raman lasers operating in cw mode is observed compared to the thermal loading of a Raman laser operating in a pulsed mode, and much stronger blue (up-converted) emission from the KGW Raman crystal is also observed. A further complexity relating to the high optical fields may be nonlinear effects such as self-focusing or multi-photon absorption and these may subsequently become significant, although to date this has not been observed.

Description of the Model

Intracavity Raman lasers are extremely complex in nature. A comprehensive model attempting to accurately match experimental results needs to include high-order transverse modes, thermal lensing, spectral effects, polarization effects and losses for high-order modes, all of which rely on poorly-known constants and experimental parameters.

In the present discussion, a simplified model is considered to determine the trends that underlie this complex behaviour. Such a model does not give perfect agreement with experimental measurements, but does reveal the interplay between the many free parameters of Raman lasers, and is a valuable tool for exploring the regimes in which efficient operation is feasible. The present discussion aims to address the broad questions: do the experimental lasers operate with too little or too much Raman conversion per round trip? What is the interplay between the strength of the Raman conversion and the Stokes output coupling? What is the interplay between the strength of Raman conversion and the strength of frequency doubling in a doubled Raman laser? Are the residual losses important? What scope is there for improving these lasers? It has been found by the inventors that the simple model can provide significant insight into these fundamental questions.

Figure 22:
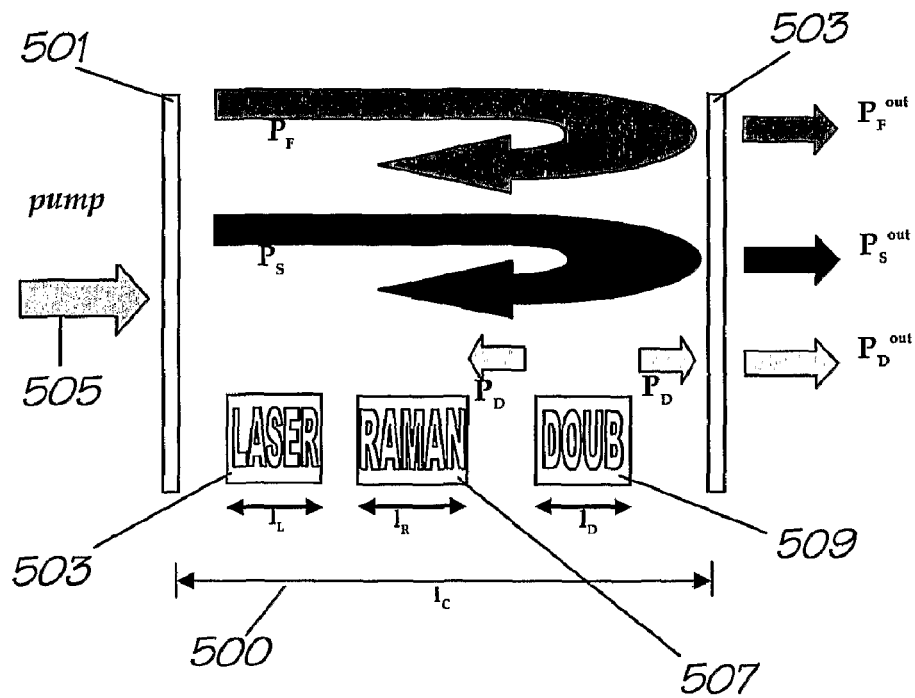
FIG. 22 is a schematic arrangement of a cw Raman laser system used for the numerical analysis.

FIG. 22 shows a schematic depiction of the laser considered in the present model. A cavity 500 bounded by reflectors 501 and 503 containing a laser crystal 503 is pumped by a pump light 505 from a cw laser diode (not shown), a Raman crystal 507, and optionally a doubling crystal 509. Beams with top hat transverse profiles are modelled, and instead of modelling the laser for a specific cavity configuration, the behaviour of the laser is calculated for specific spot radii provided for each of the active elements in the cavity. The spot radius may have a different value in each element, but the radius is assumed to be constant within each of the elements. The pump radiation is also considered to be propagate with a constant radius in the laser crystal.

By modelling the laser behaviour as a function of crystal spot sizes, the underlying behaviour of the laser may be investigated. Once regimes for best laser performance have been identified, one can then address the separate problem of designing a cavity to realize those spot sizes in each crystal (this cavity design process is not addressed in the present discussion).

The differential equations to describe the laser are determined using the method described by J. J. Degnan in IEEE Journal of Quantum Electronics, 1989. 25(2):214-220. It is assumed that all of the interactions (laser gain, Raman gain, frequency doubling, losses and mirror transmissions) are spread smoothly throughout the cavity and occur simultaneously. Such a method is appropriate provided the single pass gain/loss of each interaction is small: if this is true then the order of interactions is not important and it is acceptable to instead model all the interactions simultaneously. The equations governing the change in the power in each field ΔP over one round trip (taking time $\Delta t$) are used to estimate a smoothed dP/dt for that field. This results in one equation for each of the fundamental field and the Stokes field, plus one for the population inversion; these equations can be solved for the steady state solution for cw pumping.

The resulting equations for an intracavity doubled Raman laser are:

$$\frac{dP_F}{dt} = \frac{c\sigma_G N^* P_F l_L}{l} - \frac{cP_F P_S g_R l_R}{l A_R \lambda_P / \lambda_S} - \frac{cP_F(T_F + L_F)}{2l} \quad (4)$$

$$\frac{dP_S}{dt} = \frac{cP_F P_S g_R l_R}{l A_R} - \frac{ck l_D^2 P_S^2}{l A_D} - \frac{cP_S(T_S + L_S)}{2l} \quad (5)$$

$$\frac{dN^*}{dt} = \frac{P_P \lambda_P}{hc A_L l_L} - \frac{2\lambda_F \sigma_G N^* P_F}{hc A_L} - \frac{N^*}{\tau_L} \quad (6)$$

$$k = \frac{2\pi^2 d_{eff}^2}{\varepsilon_0 c n^3 \lambda_D^2} \quad (7)$$

$$l = [l_C + l_L(n_L - 1) + l_R(n_R - 1) + l_D(n_D - 1)] \quad (8)$$

in which $N^*$ in the laser crystal inversion density, $P_F, P_S$ are fundamental and Stokes intracavity powers, $T_F, T_S, L_F, L_S$ are the output coupling transmissions and round-trip losses for the fundamental and Stokes fields.

In the laser, Raman, and doubling crystals: $A_L, A_R, A_D$ are the spot areas (with corresponding spot radii $r_L, r_R, r_D$), $l_L, l_R, l_D$ are the crystal lengths, and $n_L, n_R, n_D$ are the crystal refractive indices (assumed equal at all wavelengths). $l_C$ is the cavity length, l is the optical cavity length, $\sigma_L, \tau_L$ are the laser crystal emission cross section and upper-level lifetime, $g_R$ is the stimulated Raman gain coefficient, $P_p$ is the incident diode pump power, $\lambda_P, \lambda_F, \lambda_S, \lambda_D$ are the wavelengths of the pump, fundamental, Stokes, and doubled-Stokes radiation, and $d_{eff}$ is the effective non-linearity of the doubling crystal. From the one-way intracavity powers we can define the output powers as $$P_F^{out} = P_F T_F \quad (9)$$

$$P_S^{out} = P_S T_S \quad (10)$$

$$P_D^{out} = \frac{k l_D^2 P_S^2 T_D}{A_D} \quad (11)$$

where $T_D$ is the transmission of the output mirror for doubled-Stokes radiation.

The key assumptions made in this model are as follows: It is assumed that the pump energy is completely absorbed by the laser crystal (an accurate assumption for most experiments), and assume that the pumped volume and laser mode overlap perfectly, as do the fundamental, Stokes, and doubled Stokes modes in the cavity. The spontaneous emission and spontaneous Raman scattering into the cavity mode is neglected (these terms would be required in order to solve for the time-dependent behavior of the laser.). Perfect phase matching in the doubling crystal is also assumed for doubling the Stokes radiation, and the fundamental field is not doubled. The doubled Stokes radiation is not resonated in the cavity; therefore there is no need to model the doubled Stokes field in the cavity, but it is sufficient to simply represent the doubling as a loss to the Stokes field.

Results

In the following, the model equations are solved for their steady-state values for constant pump power $P_p$, appropriate for comparison with the output of experimental cw lasers. The laser configurations simulated are based on the laser arrangements of the examples described above. Table 7 lists the relevant material parameters appropriate for these devices.

Estimates of the parameters of the laser resonator are also required and it is estimated that the $TEM_{00}$ spot radius in the laser crystal is 150 μm, the spot size in the Raman crystal is 125 μm, and the round-trip losses at the fundamental and Stokes wavelengths is 1%. These estimates apply to both the simple Raman laser and the doubled Raman laser configurations: the addition of the doubling crystal to the cavity has very little effect of the threshold of the laser. While there is some uncertainty about the exact value of the parameters, we aim here to determine broad trends rather than provide precise numerical predictions; these estimates are sufficient for the present discussion.

TABLE 7

Parameter values for Nd: GdVO4, KGW (901 cm-1 shift), and LBO (Type I doubling using non-critical phase matching)

| Parameter | Value |
| --- | --- |
| $\lambda_P$ | 808 nm |
| $\lambda_F$ | 1063 nm |
| $\lambda_S$ | 1176 nm |
| $\lambda_D$ | 588 nm |
| $n_L$ | 2.1 |
| $n_R$ | 2.0 |
| $n_D$ | 1.6 |
| $\tau_L$ | 100 μs |
| $\sigma_L$ | $7.6 \times 10^{-19}$ cm$^2$ |
| $\sigma_R$ | $5 \times 10^{-9}$ cm/W |
| $d_{eff}$ | $8.4 \times 10^{-13}$ m/V |

Threshold for Stokes Oscillation

Designing a Raman laser to have a low Raman threshold is vital for achieving high efficiency, and allows the use low power pump diodes.

The fundamental field strength in the laser cavity builds to very high levels as the pump power is raised towards the Raman threshold, since the fundamental field experiences a cavity with a very high Q (high finesse). For most cavity designs, the intensity of the fundamental field at Raman threshold is much greater than the saturation intensity for the laser material: for Nd:GdVO$_4$ the saturation intensity is just 2.5 kW·cm$^{-2}$. In this regime, the diode pump energy supplied to the laser crystal is then efficiently converted to fundamental radiation and power loss to spontaneous emission is low. The model equations may be simplified by neglecting $\tau_L$ to obtain an analytic expression for the diode pump power required to reach Stokes threshold:

$$P_P = \frac{A_R}{g_R l_R} \frac{\lambda_F}{\lambda_P} \frac{(T_S + L_S)(T_F + L_F)}{2} \quad (12)$$

Note that the same threshold formula applies equally to intracavity doubled Raman lasers: addition of the doubling crystal in the cavity does not affect the Raman threshold, except for any additional passive round trip losses, since at Raman threshold the Stokes field is very small and the doubling crystal does not deplete the Raman field.

Equation (12) is valid provided the total intensity of the fundamental field at Raman threshold (and above) is much greater than the saturation intensity of the laser transition; this condition is equivalent to the following condition relating the mode areas in laser and Raman crystals:

$$A_L \ll A_R \left[ \frac{(T_S + L_S)\lambda_L \sigma_L \tau_L}{hc g_R l_R} \right] \quad (13)$$

The condition in Equation (13) may be evaluated for the arrangement of Example 2 above, to obtain $A_L \ll 580 A_R$ for mirror set A ($T_F$=0.2%, $T_S$=0.8%) and $A_L \ll 290 A_R$ for mirror set B ($T_F$=0.005%, $T_S$=0.005%). These inequalities are well satisfied and so neglecting $\tau_L$ is justified and the approximation for the Raman threshold given by Equation (12) is valid for the lasers under consideration. Equation (12) gives for mirror set B a Raman threshold of 2.6 W, compared to the measured threshold of 2.5 W. For mirror set A, Equation (12) gives a Raman threshold of 5.6 W, compared to a measured threshold of 6.6 W for the simple Raman laser, and 6.9 W for the doubled Raman.

An important point revealed by Equation (12) is that the mode area in the laser crystal $A_L$ does not affect the threshold. Provided $r_L$ is matched to the pump spot size, increasing $r_L$ to up to five times larger than $r_R$ will still satisfy Equation (13) for mirror set B, and so will not affect the threshold. This is significant for laser design, since it is problematic to focus the radiation from pump diodes to very small spots owing to their poor beam quality. With a cavity design that achieves a small spot size in the Raman crystal and a far larger spot size in the laser crystal, lower Raman thresholds may be achieved without requiring a pump laser diode with improved beam quality.

Equation (12) indicates that reducing losses for the fundamental and Stokes radiation can strongly reduce the Raman threshold. With cavity design to further reduce the spot size in the Raman crystal, there is scope for reducing the Raman threshold for these lasers to a few hundred milliwatts.

Efficiency of cw Intracavity Raman Lasers

The parameters that determine the efficiency of an intracavity Raman laser are now considered. The parameters that we can control are the Stokes output coupling, spot size in the Raman crystal, and the choice of Raman crystal length and material.

The overall efficiency of a Raman laser may be split into three sequential efficiencies. Firstly, the diode pump power deposited in the laser crystal must be efficiently extracted into the fundamental laser field. Secondly, the fundamental photons must be converted efficiently to Stokes photons, and finally the Stokes photons must be efficiently coupled out of the cavity into the output beam. In practice this means that the round-trip conversion from fundamental to Stokes photons should be well in excess of the fundamental field cavity losses; too high a conversion however prevents the fundamental field from building up to a sufficient level to efficiently extract the energy in the population inversion (this occurs if Equation (13) is not satisfied.) The Stokes output coupling should also be well in excess of the cavity losses for the Stokes field; too high an output coupling prevents the Stokes field from building up to achieve efficient Raman conversion and results in a high Raman threshold.

Figure 23:
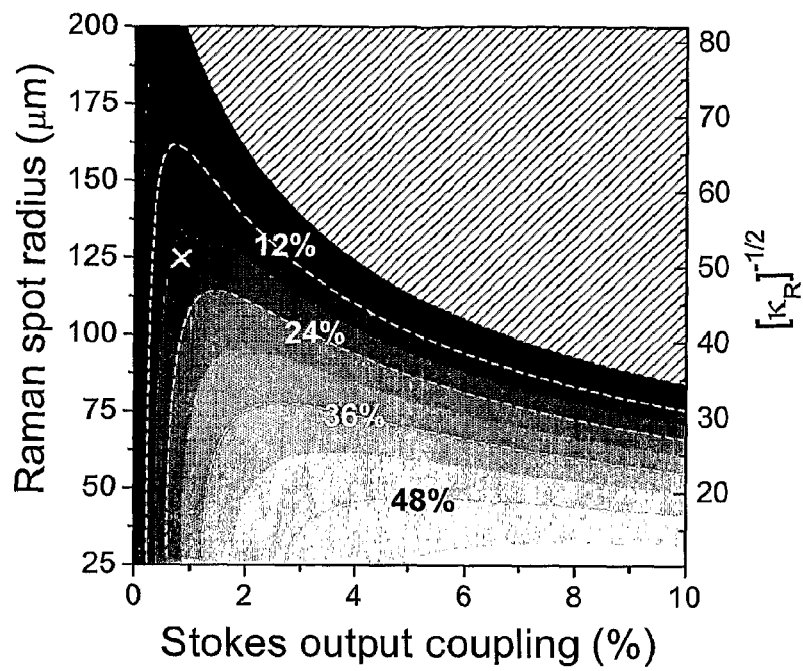
FIG. 23 is a plot of the output efficiency $P_S^{OUT}/P_P$ for a simple Raman laser, as a function of Stokes output coupling and spot radius in the Raman crystal for a calculation using a 150 μm spot in the laser crystal, and 1% round trip losses for fundamental and Stokes radiation, and a 0.2% output coupling for the fundamental, and for a diode pump power of 15 W.

FIG. 23 shows how the calculated total efficiency ($P_S^{OUT}/P_P$) of a Raman laser depends on the Raman spot size and the Stokes output coupling. The following parameters were used based on the work of Dekker: a 10 mm Nd:GdVO4 laser crystal with a diode pump radius and mode radius in the crystal of 150 µm, a 25 mm KGW Raman crystal, ($L_F$+ $T_F$)=1.2%, and $L_S$=1%. The diode pump power incident on the laser crystal is 15 W. The material parameters are given in Table 7.

The key feature of FIG. 23 is the strong increase in output efficiency as Raman spot size is reduced—for best efficiency the cavity should be designed to minimize the Raman spot size. The output coupling for the fundamental field provided by the Raman conversion is lower than its optimum value for the entire parameter range here. The shape of the graph is determined predominantly by the best balance between a low Stokes output coupling that enhances the Stokes field and increases the output coupling for the fundamental, and a high Stokes output coupling that achieves efficient extraction of the Stokes field from the cavity. As the Raman spot size is reduced, the optimal output coupling is shifted to higher values, and overall higher efficiencies are achieved.

The laser of Example 2 above operated with a spot size of the order 125 µm in the Raman crystal, with a total output coupling of 0.8% including the output from both laser end mirrors. The corresponding point in FIG. 23 is marked by the white cross; it is estimated from the model that the laser operated with an efficiency of 20%, compared with an experimental efficiency of 13% for 15 W of diode pump power. The intracavity power at the fundamental and Stokes wavelengths are both approximately 800 W. It is clear that strong improvements to the experimental efficiency will likely be achieved by decreasing the spot size in the Raman crystal whilst simultaneously increasing the output coupling for the Stokes field.

FIG. 23 can be used to predict more than just the dependence of the efficiency on Raman spot size. The spot size, Raman coefficient, and Raman crystal length appear in the model equations always in the term $g_R l_R / A_R$ (note that while $l_R$ appears implicitly in the optical cavity length l, the cavity length does not affect the steady-state solutions). Doubling either the crystal length or the Raman gain coefficient has therefore an exactly equivalent effect to decreasing the spot radius by $\sqrt{2}$.

A simple analytic expression can be determined for the overall efficiency again using the assumption that spontaneous emission from the laser crystal may be neglected. The fundamental field is clamped at its value at Raman threshold for higher pump powers, and so Equation (13) is the still the correct condition for this assumption to be valid above Raman threshold. It follows that:

$$P_S^{OUT}/P_P = \frac{T_S}{(T_S + L_S)} \frac{\lambda_P}{\lambda_S} - \frac{T_S(T_F + L_F)}{2} \frac{\lambda_F}{\lambda_S} \frac{A_R}{P_P g_R l_R} \quad (14)$$

where the expression is valid for diode pump powers $P_P$ in excess of the Raman threshold defined by Equation (12). The first term in Equation (14) represents the limiting maximum efficiency that can be obtained, set by the overall quantum efficiency and the fraction of generated Stokes photons that are usefully coupled out of the cavity. The second term determines how closely the laser system approaches this theoretical maximum. With this approximation the efficiency is determined by the Raman coupling parameter $\kappa_R = P_P g_R l_R / A_R$ which is a unitless parameter. The graph of FIG. 23 is shown with a right axis labelled in terms of $\kappa_R$. The effect on the efficiency of doubling the diode pump power is thus closely approximated by considering a spot radius decreased by $\sqrt{2}$.

The importance of the residual round-trip losses are now considered. Round-rip losses affect both the efficiency as well as threshold of Raman lasers, as shown in Equation (12) and (14). These losses may be due to unwanted mirror transmission and absorption, losses at intracavity surfaces, and scattering and absorption losses in the crystals. Some of these losses may be non-linear, and depend upon the inversion density in the laser crystal or the strength of the fundamental or Stokes optical fields; note that the model includes only linear losses.

Figure 24:
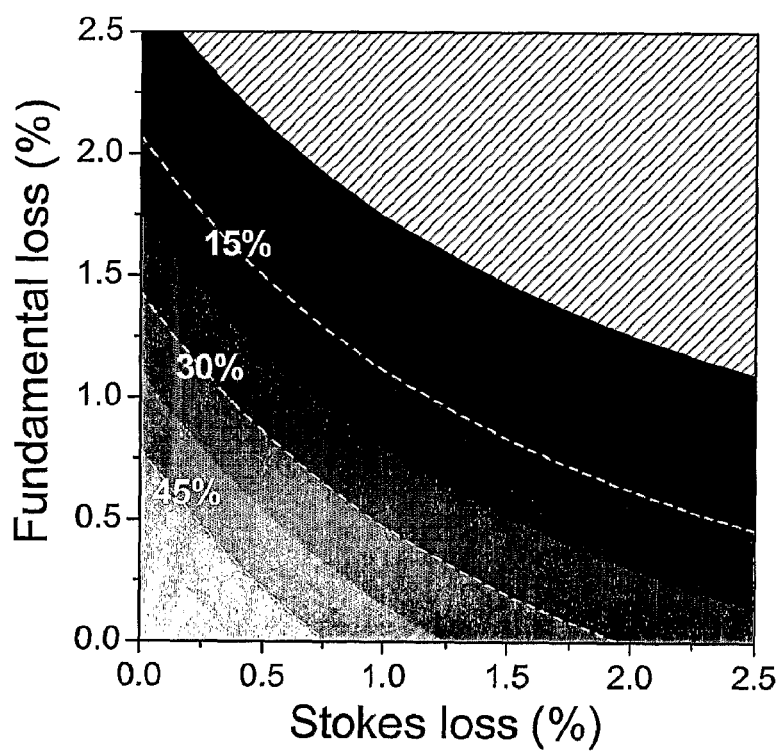
FIG. 24 is a plot of the output efficiency $P_S^{OUT}/P_P$ for a simple Raman laser, as a function of the Stokes and fundamental round trip losses for a calculation using a 150 μm spot in the laser crystal, 125 μm spot in the Raman crystal, a 2% output coupling for the Stokes radiation and a 0.2% output coupling for the fundamental radiation, and a diode pump power of 15 W.

FIG. 24 shows the total efficiency of a intracavity Raman laser as a function of fundamental and Stokes round-trip losses. The spot radius in the Raman crystal is set to 125 μm, and the Stokes output coupling is 2%. All other parameters are as in FIG. 23 and Table 7. FIG. 24 shows that the losses for the Stokes and fundamental radiation are equally important, with a strong increase in efficiency associated with a reduction in losses. Decreasing the round trip losses for the fundamental and Stokes from 1% to 0.5% increases the efficiency of Raman generation from 18% to 39%.

In summary, it can be seen that that the route to achieving far higher efficiencies for cw intracavity Raman lasers lies in increasing the Raman coupling parameter while also increasing the output coupling for Stokes radiation. Further reduction of the round-trip losses below 1% will also bring a strong increase in efficiency. The spot size in the laser crystal is not important within reason, and can be designed to suit the output beam parameters of the pump diode. Similarly, the cavity length has no effect on the steady-state behaviour, and can be treated as a free parameter when designing the laser cavity.

Efficiency of cw Intracavity Raman Lasers with Intracavity Frequency-Doubling

The dynamics of intracavity doubled Raman lasers are now discussed. For such a laser, reduction of the losses and mirror output coupling transmissions for the Stokes and fundamental radiation as much as possible is desired. The doubling process then frequency-doubles the Stokes field, and the doubled radiation exits the cavity through the end mirror with low loss. The effective output coupling fraction per round trip experienced by the Stokes field is then equal to twice the single pass conversion efficiency of the Stokes to yellow conversion. From FIG. 23 is may be seen that the optimum output coupling for the Stokes radiation is of the order a few percent: a value that can be obtained with a doubling crystal in a high Q (high finesse) cavity. A non-linear crystal is in many ways an ideal output coupler for a Raman laser system. At Raman threshold there is no output coupling, and so the Raman threshold can be extremely low. As the pumping is increased, the increasing output coupling can enable highly efficient operation.

Figure 25:
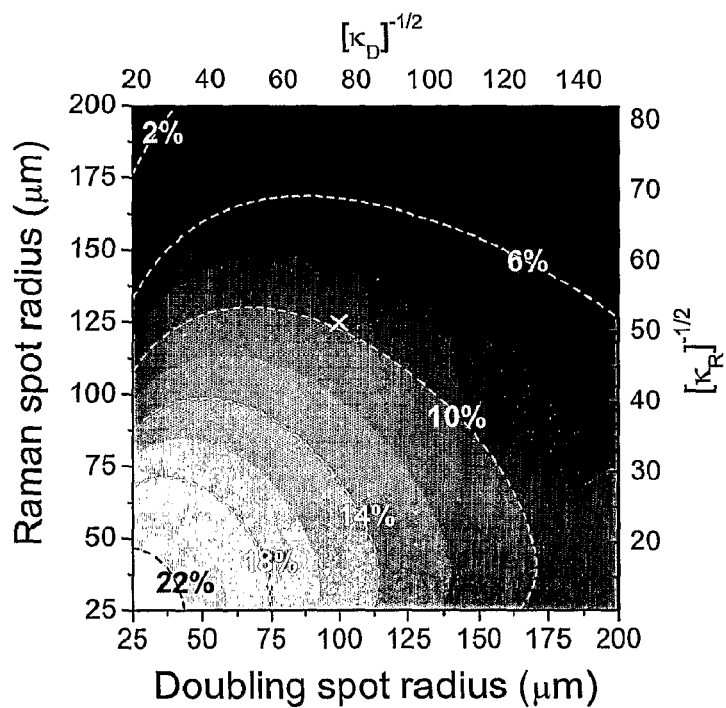
FIG. 25 is a plot of the output efficiency $P_D^{OUT}/P_P$ for a doubled Raman laser, as a function of the spot size in the doubling and Raman crystal for a calculation using a 150 μm spot in the laser crystal, and 1.0% round trip losses for fundamental and Stokes, and $T_D=90\%$, and a diode pump power of 15 W.

FIG. 25 shows the calculated total efficiency $P_D^{OUT}/P_P$ of an intracavity doubled Raman laser as a function of the spot sizes in the Raman and doubling crystals. The following parameters are used: a 10 mm Nd:GdVO4 laser crystal with a diode pump radius and mode radius in the crystal of 150 μm, a 25 mm KGW Raman crystal, a 10 mm long LBO crystal, $L_F$ and $L_S$ equal to 1%, and $T_F$ and $T_S$ equal to 0.01%. The doubled Stokes radiation generated by the crystal in the direction of the adjacent cavity end mirror exits the cavity with 90% efficiency; the radiation generated in the other direction is absorbed by the laser crystal. The diode pump power incident on the laser crystal was 15 W. These parameters are similar to the laser of Example 2 using mirror set B. For estimated TEM$_{00}$ spot size for the laser of Example 2 of 125 μm in the KGW crystal and 100 μm in the LBO crystal an efficiency of 9.7% is predicted (marked by a cross in FIG. 25). This is significantly higher than the 4.5% efficiency measured for 15 W of pump power in Example 2; however expect the experimental laser is expected to operate less that optimally due mainly to the fact that the laser operates on many transverse modes.

In a similar way as for the simple intracavity Raman laser, it can be immediately seen from the model equations that the efficiency of doubled output is determined by the parameters $g_R l_R/A_R$ and $kl_D^2/A_D$. For the approximation that spontaneous emission from the laser crystal can be neglected (a reasonable assumption for the ranges plotted in FIG. 25), the efficiency can be defined as function of the unitless Raman and doubling coupling parameters $\kappa_R=P_P g_R l_R/A_R$ and $\kappa_D=P_P kl_D^2/A_R$: the right and top axes of FIG. 25 are labelling in terms of the coupling parameters. It can then be inferred from FIG. 25 not only the scaling behaviour as a function of mode areas in the doubling and Raman crystals, but also as a function of crystal lengths, non-linear parameters, and diode pump power. It is also noted that the analytic expressions for the efficiency are too complex to directly provide insight into the laser behaviour, and so are not considered in the present model.

FIG. 25 reveals that for higher efficiency operation both coupling parameters $\kappa_R=P_P g_R l_R/A_R$ and $\kappa_D=P_P kl_D^2/A_R$ need to be increased as much as possible. A balance between the two is also required: if the doubling parameter $\kappa_D$ is too high compared to the Raman parameter $\kappa_R$ a decrease in efficiency is observed as the doubling crystal presents too high a loss to the Stokes field, preventing sufficient build up of the Stokes field for efficient conversion from the fundamental field to the Stokes field. For too high a Raman parameter, a small decrease in the efficiency is observed as the output coupling presented to the fundamental field exceeds its optimum value. Increasing the Raman and doubling parameters together allows the effective output coupling for the Stokes radiation to be increased whilst still maintaining an appropriate effective output coupling for fundamental photons.

Figure 26:
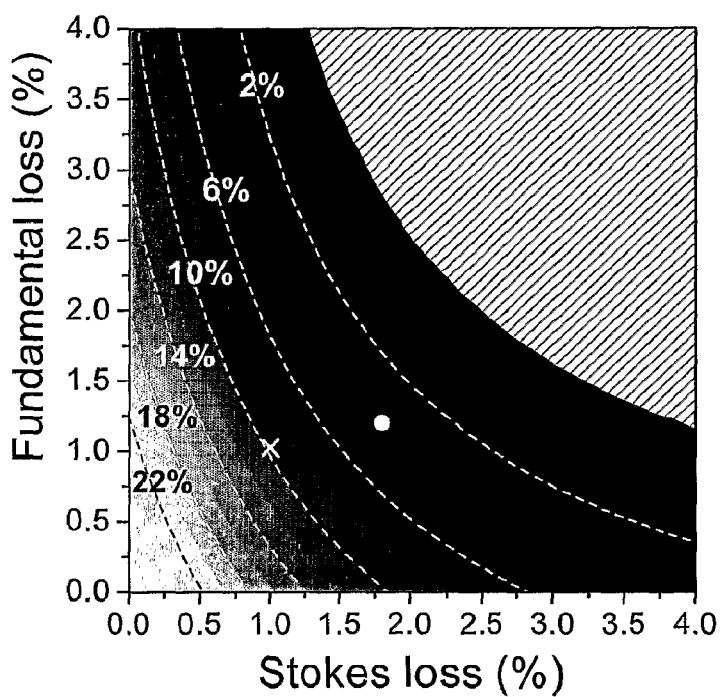
FIG. 26 is a plot of the output efficiency $P_D^{OUT}/P_P$ for a doubled Raman laser, as a function of the round trip loss for the fundamental and Stokes radiation for a calculation using a 150 μm spot in the laser crystal, 125 μm spot size in the Raman crystal, 100 μm spot size in the doubling crystal, and $T_D=90\%$

The importance of the residual round-trip losses are now considered. FIG. 26 shows the calculated efficiency of generating doubled Stokes radiation as a function of losses for Stokes and fundamental fields (note that for this calculation we can count $T_F$ and $T_S$ as losses). The calculation used the same parameters as FIG. 25, with the spot radius in the Raman and doubling crystal set to 125 μm and 100 μm respectively. For these parameters, the efficiency is more sensitive to the Stokes losses than the fundamental losses; this is simply because the effective output coupling for the Stokes radiation is far lower than optimal, and so additional Stokes losses are more detrimental than for the laser modelled in FIG. 24. In Example 2 above, an efficiency of 4.5% for a cavity with $T_F+L_F=1.01\%$ and $T_S+L_S=1.01\%$ (mirror set B) was measured; the model predicts 9.7% efficiency (indicated by the white cross in FIG. 26). For a cavity with $T_F+L_F=1.2\%$ and $T_S+L_S=1.8\%$ (mirror set A), an efficiency of 1.6% was measured in Example 2; the model predicts 3.7% (indicated by the white circle in FIG. 26).

These results highlight the importance of reducing the cavity losses as much as possible, and indicate that even at the 1% level, losses are still strongly limiting the performance of these lasers. If losses could be reduced further from 1% to 0.5% the model predicts an increase in efficiency from 10% to 19%.

In summary, by increasing the coupling parameters for the Raman and doubling processes along with reducing the round trip losses, the above model suggests it should be possible to increase the efficiency of the doubled Raman lasers to more than 20%. Recall also that the modelled laser design only couples half of the generated yellow photons out of the cavity. With an improved cavity design incorporating an intracavity polarizer or dichroic mirror, we can approximately double the output power of the laser. For a cavity in which the doubled Raman photons are resonated once through the crystal the doubling coupling parameter can also be increased owing to the seeding of the second pass through the doubling crystal. In this way efficiencies of more that 40% may be attainable.

Implications for Laser Design

Here some of the implications of the results of the model are considered, and how they can be applied to laser design.

For the intracavity Raman laser the efficiency can be improved by increasing the non-linear coupling parameter in the Raman crystal. Often, only a fixed pump power is available, and a specific Raman material is used in order reach a certain wavelength. In order to increase the Raman coupling parameter then the ratio $l_R/A_R$ must be increased through a combination of decreasing the mode size and increasing the crystal length. There is of course a limit to improvements reaped in this way. The diffraction of the beams must be accounted for and the value of $1/A_R$ averaged over the length of the crystal should also be considered. As the pump beam is so tightly focussed within the crystal that the confocal parameter of the beam waist becomes comparable with the crystal length, then that small mode radius is no longer maintained for the whole length of the crystal. Focusing more and more tightly now brings far less advantage. The laser of Example 2 above uses a 2.5 cm Raman crystal, and a mode size of 125 µm with an associated confocal parameter of 9 cm. For this case then there are still substantial benefits to be obtained by either increasing the crystal length or decreasing the mode size in the Raman crystal.

For the doubled intracavity Raman laser, it is desired to increase both the Raman and the doubling coupling parameter to improve the efficiency. Increasing $\kappa_D$ is most easily achieved in practice by increasing the crystal length, making use of the $l_D^2$ dependence of the coupling parameter. Example 2 used a 1 cm long LBO nonlinear crystal, used for type I non-critical phase matching. LBO crystals of up to 4 cm are routinely used for this type of phase matching; such a crystal offers a simple way of achieving a 16-fold increase in $\kappa_D$, equivalent to a 4-fold reduction in the doubling spot radius in FIGS. 25 and 26.

To achieve efficient operation in a low number of transverse modes it is essential to match the cavity mode size in the laser crystal with the spot size of the pump diode. While it is difficult to tightly is focus the output from diodes that typically have extremely poor beam quality, the model suggests that successful operation may be observed with a relatively large mode size in laser crystal while still using a smaller mode size in the Raman crystal. Designing such a cavity will enable improved matching between the laser mode and the diode output, and still achieve a low Raman threshold and high efficiency.

Having decided what spot sizes, one can begin to design a cavity. The design must take account of the thermal lenses that are established in the laser and Raman crystals; the strength of these lenses will depend on the incident pump power, and so the cavity must be designed for a specific range of pump powers. The length of the cavity is not a factor determining the threshold or efficiency of the lasers, but is an important consideration for determining the stability of simple two-mirror cavities: the cavities are generally kept short in order to maintain cavity stability when the thermal lens in the laser crystal becomes strong. A cavity design with a larger spot size in the laser crystal has a second advantage that the strength of the thermal lens for a given pump power is reduced, easing the constraints on the cavity design. A more complex cavity such as a folded three or four mirror cavity may allow more control over the spot sizes in each of the crystals in the cavity, and also permits cavity designs that are stable for stronger thermal lenses. A design with optimized spot sizes in each of the crystals combined with improved stability against the thermal lenses will allow the lasers to be operated with greatly increased efficiency.

Further investigation of the dominant sources of the round-trip losses may reveal the best approach for reducing these losses; possible approaches include coating dielectric mirrors directly on the crystal end faces, improving the quality of the anti-reflection coatings on the crystals, and investigating and reducing the scattering losses in each of the crystals.

Modelling Summary

Disclosed above is a plane wave model of intracavity Raman lasers and intracavity doubled Raman lasers. For most parameter ranges, the power deposited in the laser crystal by the pump laser diode is very efficiently extracted into the fundamental laser field. The role of the laser crystal is considered to be a means to efficiently transfer the power from the low beam quality diode to the high-beam quality, strongly cavity-enhanced fundamental field. The threshold and efficiencies of the intracavity Raman laser can be approximated by simple analytic expressions that indicate the importance of each of the design parameters of these lasers. One important implication is that the pump diode spot area and mode area in the laser crystal are not a factor determining the Raman threshold or laser efficiency, provided they are matched. Cavity designs with significantly smaller spots in the Raman crystal than in the laser crystal can lead to a laser with a low Raman threshold that can be pumped using pump diodes with poor beam quality.

The efficiency of Raman and doubled Raman laser system has been calculated and it is observed that the results scale with the Raman and doubling coupling parameters, and with cavity losses. For the intracavity Raman laser of the Examples above, the results generally indicate that a large increase in the Raman coupling parameter is the best approach to achieve high efficiency operation. For intracavity doubled Raman lasers, it may be concluded that both Raman and doubling coupling parameters must be increased strongly in order increase the laser efficiency; the parameters must however be increased in tandem to maintain the optimum balance between the non-linear processes. It is predicted that intracavity doubled Raman lasers with efficiencies of order 40% could be realized with new cavity designs that maximize the coupling parameters and minimizing resonator losses.

Laser Design Process

In broad terms, this is how one might approach the design of a intracavity-doubled cw Raman laser from scratch on the basis of the description, modelling and examples above.

First, the fundamental and Raman gain media are chosen so as to provide an output wavelength in the desired range. Sometimes a particular wavelength is required, and only one combination of crystals will achieve this wavelength, but more usually, it is possible to choose between several materials.

Laser materials such as $NdYVO_4$ and $NdGdVO_4$ are suitable choices in many arrangements, because they each have a high stimulated emission cross-section, wide absorption bandwidths, good thermal properties and produce polarised fundamental output, although it will be appreciated by the skilled addresses that other laser materials may also be employed. For example, NdYAG is also a suitable choice, although it produces unpolarised output unless a polarising element is used, and such elements can result in significant undesirable depolarisation losses. On the other hand, NdYAG has highly desirable thermal properties and can be successfully implemented in a cw Raman laser system without a polariser if desired, although only one polarisation of the fundamental beam in the resonator cavity is converted by SRS.

There are many possible solid state Raman-active media which may be chosen depending on the system to be designed. The main selection criteria includes cost, size, damage threshold, Raman gain coefficient and thermal properties. Preferred crystals for many arrangements are YVO4, GdVO4, KGd(WO4)2 and KY(WO4)2 on the basis of there moderately high Raman gain coefficients, good thermal properties and high damage threshold, although it will be appreciated by the skilled addresses that other Raman media may also be employed. For example, Ba(NO3)2 and Ba(WO4) have higher Raman gain, and may be preferred for lower power systems where low threshold is required. Diamond is a further alternative material, having highest Raman gain and a very high damage threshold, but at a high cost.

There are many possible doubling crystals, and the main selection criteria are cost, size, damage threshold, nonlinear coefficient, birefringence walkoff, acceptance angle and temperature bandwidth, and the ability to phase-match the one or more wavelengths of interest. Preferred crystals in many arrangements are KTP, RTP, LBO and BBO, although it will be appreciated by the skilled addresses that other nonlinear materials may also be employed. KTP and RTP have high nonlinear coefficients, but are not suitable for tuning to generate wavelength-selectable output. LBO and BBO have lower nonlinear coefficients but can be angle and/or temperature tuned over a wide range of wavelengths.

Having selected the crystals, the resonator must be designed. It is critical that the total resonator losses (i.e. mirror losses at the wavelengths in the resonator, scattering/reflection losses from the elements of the resonator cavity or other round-trip losses) are kept low to obtain high circulating powers at the fundamental and Raman wavelengths, as the efficiency on the nonlinear processes (SRS and SHG) depend critically on these powers. Of these losses, mirror losses at the fundamental and Raman wavelengths are most important so the resonator cavity needs to be a high Q (high finesse) cavity at these wavelengths. Simultaneously, the resonator cavity needs to efficiently output the wavelength of the frequency converted Raman beam, so the mirrors transmission at this wavelength should be very high (>90%). Thus, the resonator cavity mirrors need to be designed such that the cavity is simultaneously a high Q (high finesse) cavity at the fundamental and Raman wavelengths and also a low Q (low finesse) cavity at the frequency converted wavelength to be outputted.

Other losses which should be minimised include AR coatings (good quality coatings required, and losses can be minimised by orienting crystal faces perpendicular to resonator axis), and absorption losses in the crystals at the fundamental and Raman wavelengths (can be minimised by using good quality crystals with low impurity levels). The losses at the fundamental and Raman wavelengths can be determined from spectrophotometer measurements of transmission, absorption and/or reflection, and/or by operational measurements such as Findlay Clay techniques.

Figure 27A:
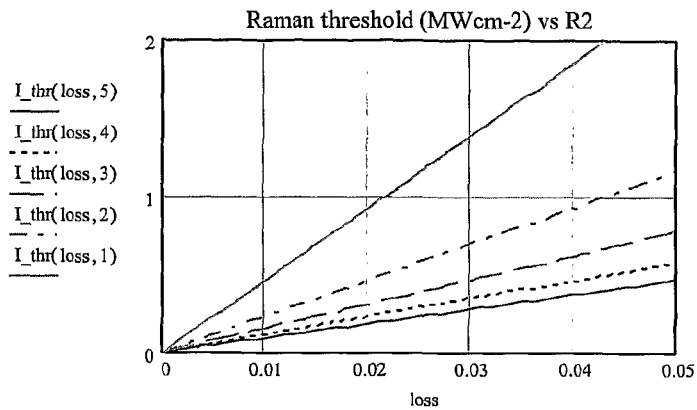
FIGS. 27A and 27B are graphs of the continuous wave intracavity intensity (in MW/cm$^2$) of the fundamental beam in the Raman material required to achieve continuous wave Raman operation (the Raman threshold) for a laser system containing $Ba(NO_3)_2$ as the Raman material for crystal lengths of 1, 2, 3, 4, and 5 mm and for resonator roundtrip loss of 0 to 5% and 0 to 0.5% respectively.
Figure 27B:
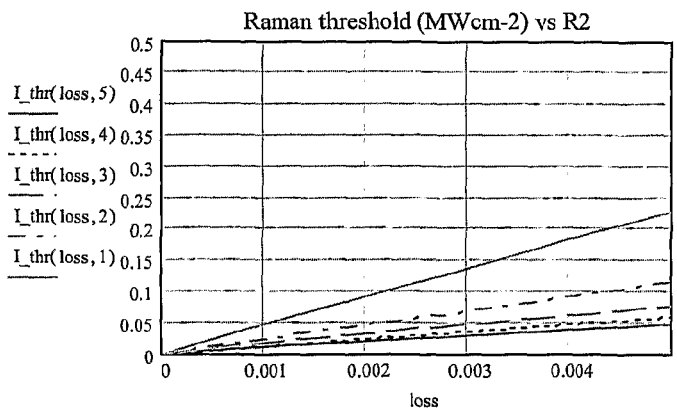
Figure 27C:
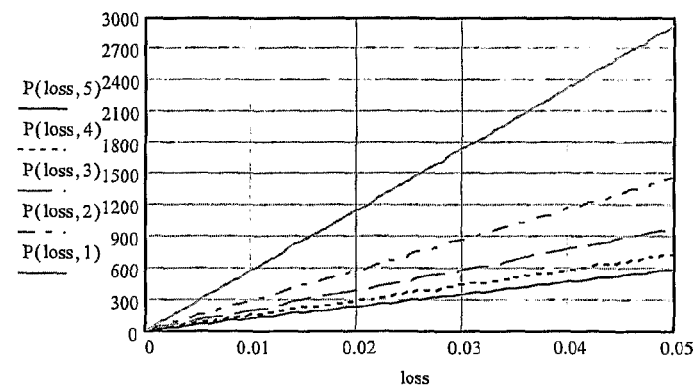
FIGS. 27C and 27D are graphs of the continuous wave intracavity circulating Raman power in the resonator cavity at the Raman threshold for a laser system with $Ba(NO_3)_2$ as the Raman material and for crystal lengths of 1, 2, 3, 4, and 5 mm and for resonator roundtrip loss of 0 to 5% and 0 to 0.5% respectively.
Figure 27D:
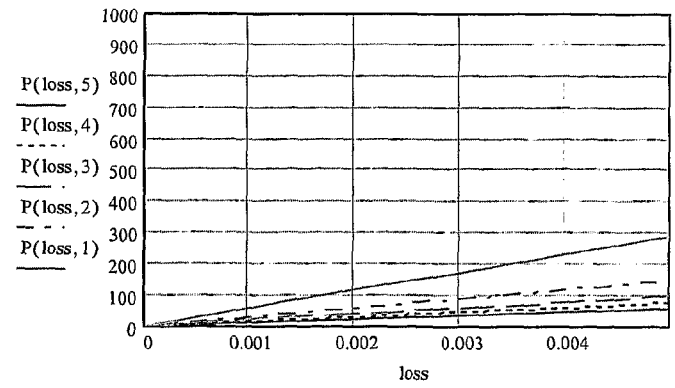
Figure 28A:
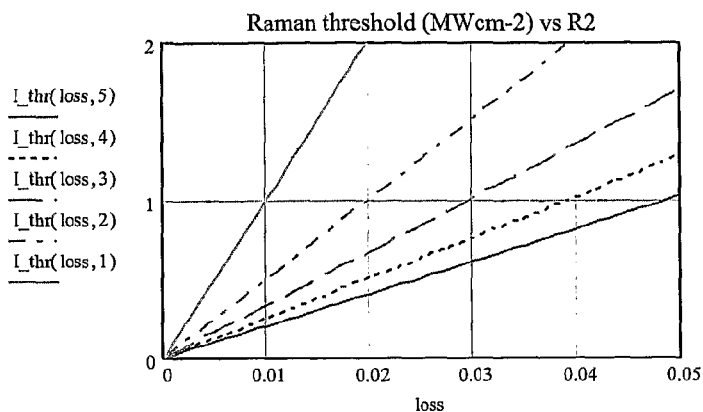
FIGS. 28A and 28B are graphs of the continuous wave intracavity intensity (in W/cm$^2$) of the fundamental beam in the Raman material required to achieve continuous wave Raman operation (the Raman threshold) for a laser system containing KGW as the Raman material for crystal lengths of 1, 2, 3, 4, and 5 mm and for resonator roundtrip loss of 0 to 5% and 0 to 0.5% respectively.
Figure 28B:
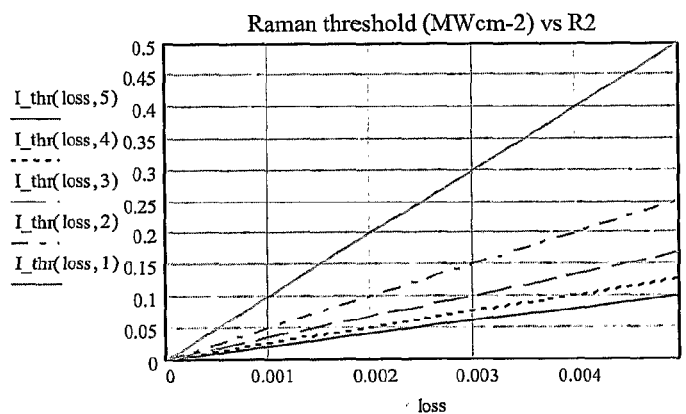
Figure 28C:
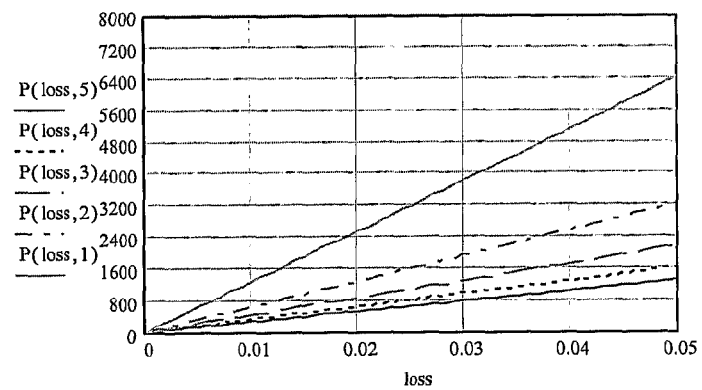
FIGS. 28C and 28D are graphs of the continuous wave intracavity circulating Raman power in the resonator cavity at the Raman threshold for a laser system with KGW as the Raman material and for crystal lengths of 1, 2, 3, 4, and 5 mm and for resonator roundtrip loss of 0 to 5% and 0 to 0.5% respectively.
Figure 28D:
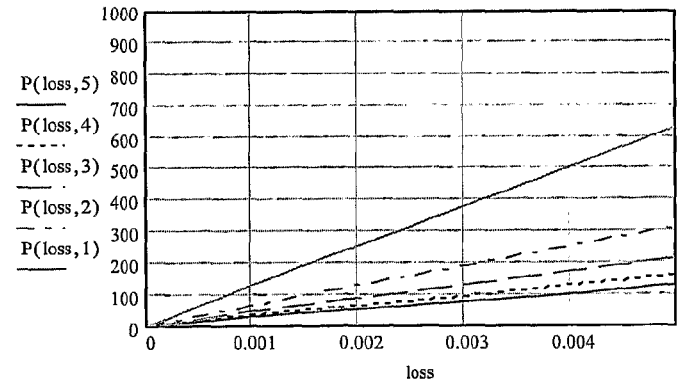
Figure 29A:
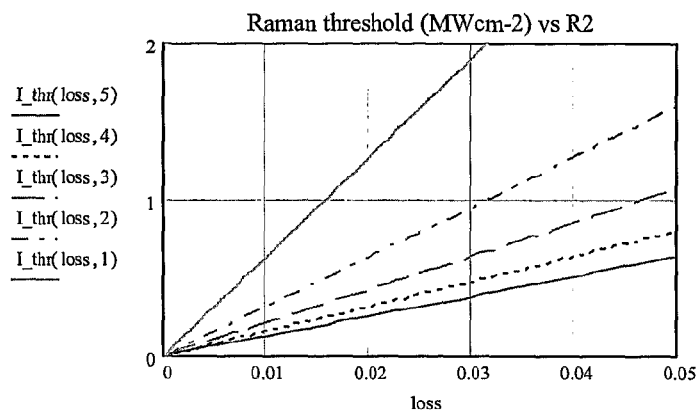
FIGS. 29A and 29B are graphs of the continuous wave intracavity intensity (in MW/cm$^2$) of the fundamental beam in the Raman material required to achieve continuous wave Raman operation (the Raman threshold) for a laser system containing $Ba(WO_4)$ as the Raman material for crystal lengths of 1, 2, 3, 4, and 5 mm and for resonator roundtrip loss of 0 to 5% and 0 to 0.5% respectively.
Figure 29B:
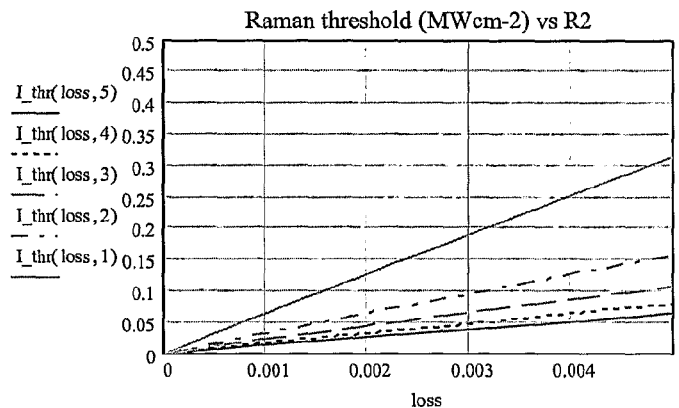
Figure 29C:
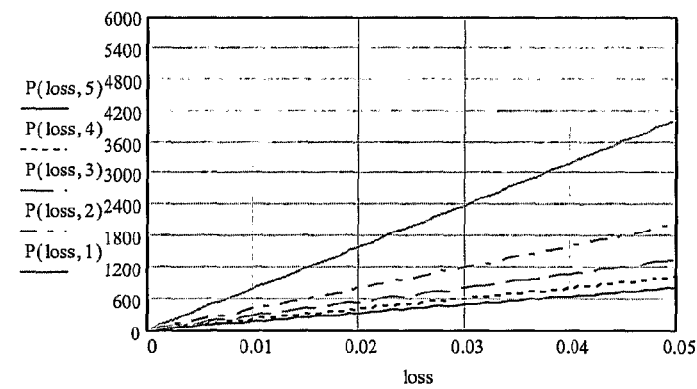
FIGS. 29C and 29D are graphs of the continuous wave intracavity circulating Raman power in the resonator cavity at the Raman threshold for a laser system with $Ba(WO_4)$ as the Raman material and for crystal lengths of 1, 2, 3, 4, and 5 mm and for resonator roundtrip loss of 0 to 5% and 0 to 0.5% respectively.
Figure 29D:
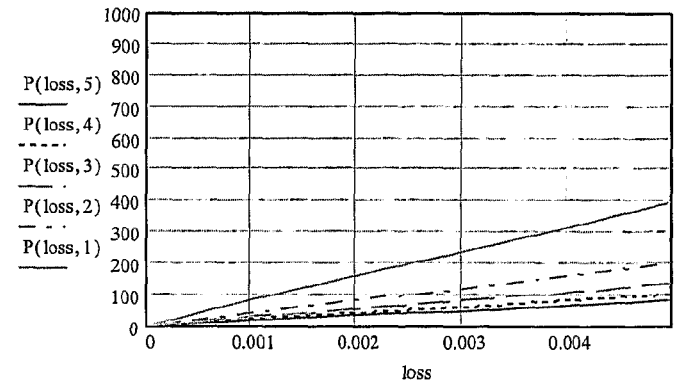
Figure 30A:
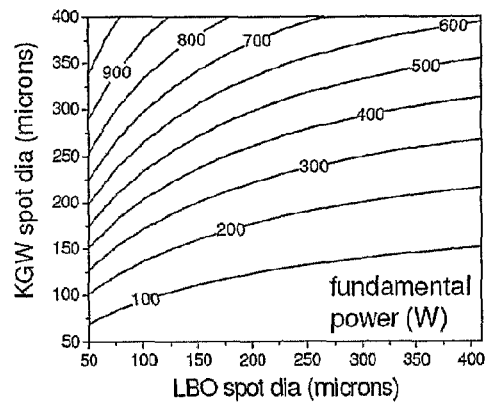
FIGS. 30A to 30D are respectively the modelled intracavity circulating power at the fundamental wavelength ($P_F$), the intracavity circulating power at the Stokes (Raman shifted fundamental) wavelength ($P_S$), the output power at the frequency converted (doubled) wavelength ($P_D^{out}$) in the visible, and the nonlinear conversion efficiency as a function of spot size in the Raman and nonlinear crystals (KGW and LBO respectively and a pump power of 115 W.
Figure 30B:
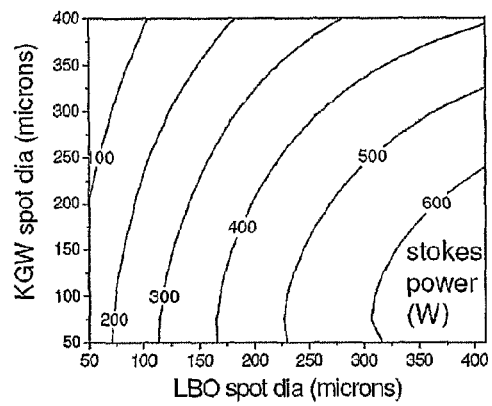
Figure 30C:
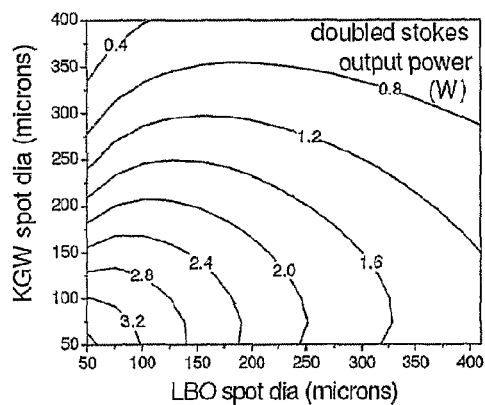
Figure 30D:
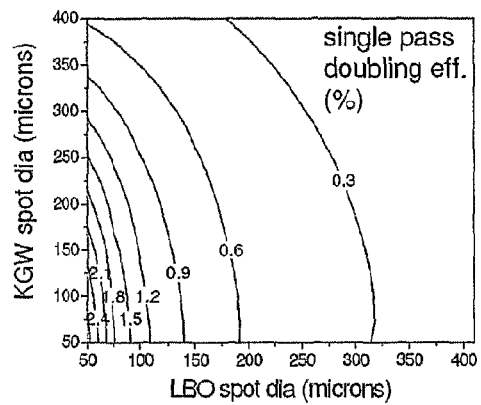
Figure 31A:
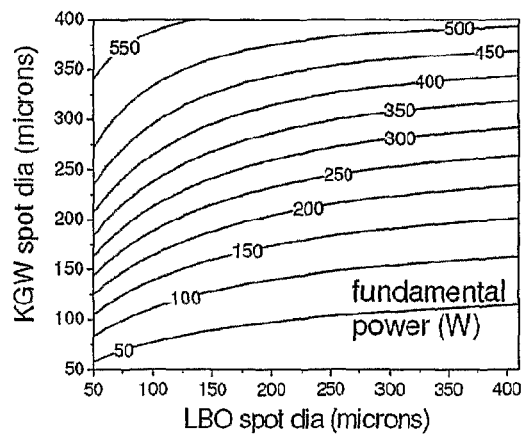
FIGS. 31A to 31D are respectively the modelled intracavity circulating power at the fundamental wavelength ($P_F$), the intracavity circulating power at the Stokes (Raman shifted fundamental) wavelength ($P_S$), the output power at the frequency converted (doubled) wavelength ($P_D^{out}$) in the visible, and the nonlinear conversion efficiency as a function of spot size in the Raman and nonlinear crystals (KGW and LBO respectively and a pump power of 7.5 W.
Figure 31B:
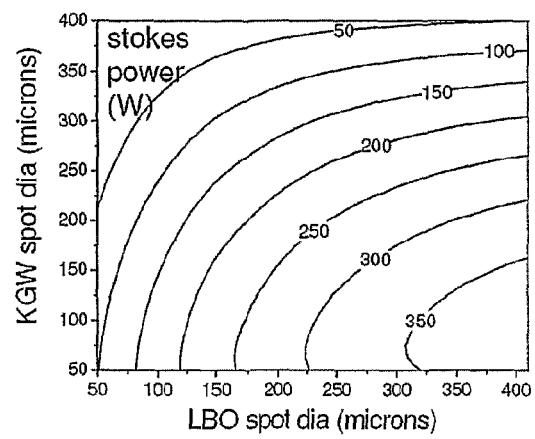
Figure 31C:
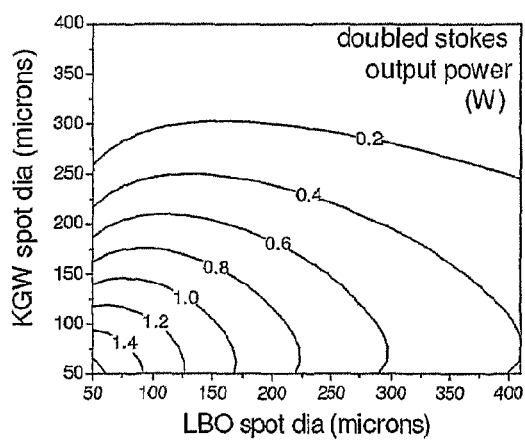
Figure 31D:
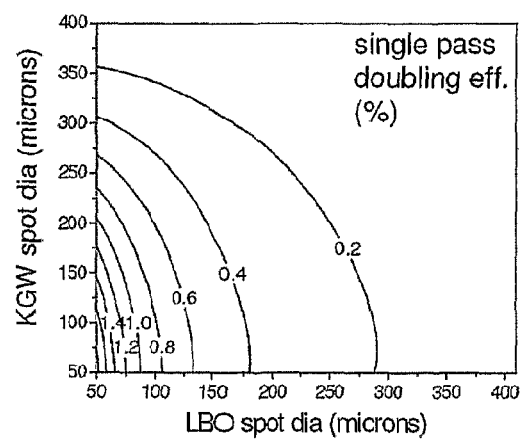

As described above in the modelling discussion, the threshold for SRS is achieved when the Raman gain exceeds the resonator losses for the Stokes wavelength i.e. $(1-\text{roundtriploss})\exp(2g_R I_L l) \geq 1$. $I_L$, the intensity of the fundamental in the Raman crystals required for SRS, depends on the length of the Raman crystal. This threshold condition may be calculated numerically and FIGS. 27 to 29 show numerical calculations of the continuous wave Raman threshold and intracavity circulating power at the threshold for the Raman crystals barium nitrate Ba(NO3)2, KGW, and Ba(WO4) respectively. FIGS. 27A, 27B, 28A, 29B and 29A, 29B are plots of the continuous wave Raman threshold for crystal lengths of 1, 2, 3, 4, and 5 mm and for resonator roundtrip loss of 0 to 5% (FIGS. 27A, 28A, 29A) and 0 to 0.5% (FIGS. 27A, 28A, 29A). FIGS. 27C, 27D, 28C, 28D 29C and 29D are plots of the intracavity circulating power for crystal lengths of 1, 2, 3, 4, and 5 mm and for resonator roundtrip loss of 0 to 5% (FIGS. 27C, 28C, 29C) and 0 to 0.5% (FIGS. 27D, 28D, 29D). The resonator finesse at the roundtrip losses of FIGS. 27 to 29 can be obtained with reference to FIGS. 37B and 37C. The Raman threshold $I_L$ is calculated using the formula:

$$I_L = \frac{1}{2g_R l} \cdot \ln\left(\frac{1}{1 - \text{roundtriploss}}\right) \quad (15)$$

where l is the length of the Raman material.

The circulating power at the Stokes wavelength is then calculated from the formula:

$$P_S = I_L(\pi \omega_F^2) \quad (16)$$

where $\omega_F$ is the radius of the fundamental resonator mode in the Raman material.

The preferred length of the Raman crystal is often around 1 to 2 cm for most arrangements of the laser system. Longer crystals may be used in lower power lasers to reduce the threshold intensity, while shorter Raman crystals enable more compact lasers to be designed. Shorter crystals may also be desirable in linear resonators where strong thermal lensing in the laser crystal is a limitation to power scaling. In that case, higher output powers are possible because the cavity length can be made shorter. Typically $I_L$ is around 100 kW/cm² or higher. (Such a figure is most typical for Ba(NO3)2 and Ba(WO4). Higher intensities, >200 kW/cm² are usually required for YVO4, GdVO4, KGd(WO4)2 and KY(WO4)2. Example threshold intensities for selected crystals, lengths and resonator losses are shown in Table 8.

TABLE 8

Typical intracavity Raman threshold intensity ($I_L$ kW/cm²) for selected Raman crystals with various crystal lengths fro 0.5% and 1% round trip (RT) resonator losses.

| Crystal | Length (cm) | RT Loss | $I_L$(kW/cm²) |
| --- | --- | --- | --- |
| BNO | 1 | 1% | 457 |
| BNO | 1 | 0.5% | 228 |
| BNO | 3 | 1% | 152 |
| BNO | 3 | 0.5% | 76 |
| KGW/YVO4 | 1 | 1% | 1000 |
| KGW/YVO4 | 1 | 0.5% | 501 |
| KGW/YVO4 | 3 | 1% | 335 |
| KGW/YVO4 | 3 | 0.5% | 167 |

Of course, as would be appreciated by the skilled addressee, the intensity of the fundamental beam $I_L$ in the Raman crystal should be maintained below the damage threshold of the Raman material. Indicative damage threshold intensities for a number of solid state Raman materials are shown in Table 9, although it, as would be appreciated by the skilled addressee that these are subject to the particular parameters of the laser.

TABLE 9

Typical intracavity Raman damage threshold intensities
($I_L$ kW/cm2) for selected crystals.

| Raman Crystal | Damage Threshold Intensity |
|---|---|
| Lithium iodate | 100 MW/cm$^2$ |
| Barium nitrate | 400 MW/cm$^2$ |
| LiNbO$_3$ | 100 MW/cm$^2$ |
| KGW, KYW | 10 GW/cm$^2$ |
| Other tungstates | 10 GW/cm$^2$ |
| Nd: YVO4, Nd: GdVO4 | 10 GW/cm$^2$ |
| YVO4, GdVO4 | 10 GW/cm$^2$ |
| KTP | 30 GW/cm$^2$ |
| LBO | 19 GW/cm$^2$ |
| BBO | 10 GW/cm$^2$ |

For reasonably efficient operation, the single pass frequency doubling conversion efficiency should be at least 0.1%. The intensity of the Raman power in the doubling crystal which is required to achieve this depends on the SHG crystal selected, but is typically 100 kW/cm$^2$ or higher. (This number is most typical of KTP or RTP. For LBO, intensities of around 200 kW/cm$^2$ are required for 0.1% single-pass conversion.) The conversion efficiency as a function of the intracavity Stokes power can be calculated by the equation:

$$\eta = k \cdot l_D \cdot \frac{P_S}{\pi \omega_D^2} \quad (17)$$

where $l_D$ is the length of the nonlinear doubling crystal, $\omega_D$ is the radius of the Stokes resonator mode size in the nonlinear crystal and k is the nonlinear parameter.

$$k = 2\pi^2 \frac{d_{eff}^2}{\varepsilon_o c n^3 \lambda_D^2}$$

where n is the refractive index of the nonlinear crystal, $d_{eff}$ is the non-linear second-order coefficient for the nonlinear crystal and $\lambda_D$ is the wavelength of the frequency doubled output.

From these equations, the intracavity circulating power at the Stokes wavelength can be calculated to achieve efficient nonlinear conversion efficiency of ~0.1% using $I_L = P_S/(\pi \cdot \omega_D 2)$. Table 10 show the intensity in the nonlinear crystal $P_S$ and the circulating power in the resonator cavity at the Stokes wavelength $I_S$ for a number of nonlinear crystals at 0.1% nonlinear conversion efficiency.

TABLE 10

Intensity and circulating power of the Stokes wavelength
in the nonlinear doubling crystal assuming a nonlinear
conversion efficiency of 0.1%

| Crystal | Spot diameter LBO (µm) | $I_S$ (kW/cm2) | $P_S$ (W) |
|---|---|---|---|
| LBO | 120 | 272 | 123 |
| BBO | 120 | 190 | 86 |
| KTP | 120 | 88 | 40 |

It will be appreciated by the skilled addressee that these figures will change depending on a large number of variables. Alternatively, graphs such as those shown in FIGS. 30 and 31 (calculated for pump powers of 15 W and 7.5 W respectively) may be generated by the modelling described herein to provide an indication of the resonator mode sizes in both the Raman and the nonlinear material may be adjusted to provide efficient laser output at the doubled Stokes wavelength (i.e. visible output from the laser system). Tables 11 and 12 summarise FIGS. 30 and 31 respectively for a few example combinations of the spot sizes in the Raman (i.e. KGW) and the nonlinear (i.e. LBO) materials.

TABLE 11

Intracavity circulating Stokes power ($P_S$), Stokes intensity in the
nonlinear material ($I_S$), frequency doubled output power ($P_D$)
and nonlinear doubling efficiency at 15 W of input pump power

| Spot diameter KGW (µm) | Spot diameter LBO (µm) | $P_S$ (W) | $I_S$ (kW/cm2) | $P_D$ (W) | Single-pass doubling efficiency |
|---|---|---|---|---|---|
| 150 | 150 | 345 | 1950 | 2.3 | 0.75% |
| 250 | 200 | 370 | 1180 | 1.5 | 0.45% |
| 300 | 300 | 440 | 620 | 0.95 | 0.25% |

TABLE 12

Intracavity circulating Stokes power ($P_S$), Stokes intensity in the
nonlinear material ($I_S$), frequency doubled output power ($P_D$)
and nonlinear doubling efficiency at 7.5 W of input pump power

| Spot diameter KGW (µm) | Spot diameter LBO (µm) | $P_S$ (W) | $I_S$ (kW/cm2) | $P_D$ (W) | Single-pass doubling efficiency |
|---|---|---|---|---|---|
| 150 | 150 | 210 | 1190 | 0.84 | 0.45% |
| 250 | 200 | 180 | 570 | 0.36 | 0.225% |
| 300 | 300 | 180 | 250 | 0.15 | 0.10% |
| 400 | 400 | 51 | 40 | 0.01 | 0.015% |

Figure 32:
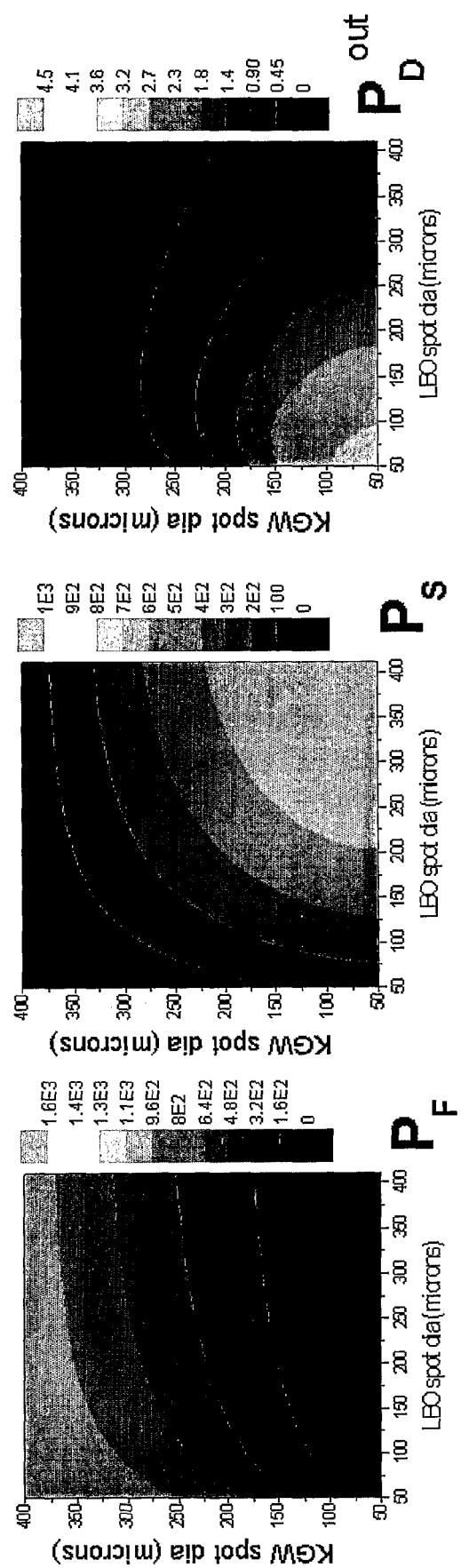
FIG. 32 is a collection of three contour plots respectively showing the intracavity circulating power at the fundamental wavelength ($P_F$), the intracavity circulating power at the Stokes (Raman shifted fundamental) wavelength ($P_S$), and the output power at the frequency converted (doubled) wavelength ($P_D^{out}$) in the visible, where the roundtrip losses at the fundamental wavelength are 1.5% and roundtrip losses at the Raman/Stokes wavelength are 1.5%.
Figure 33:
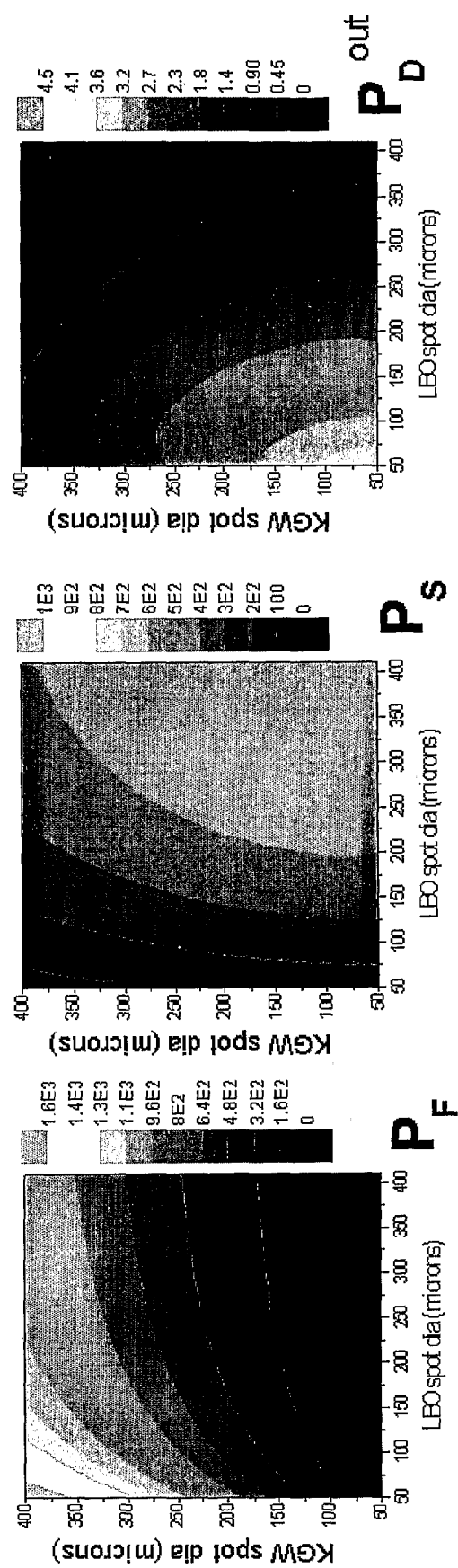
FIG. 33 is a collection of three contour plots similar to those of FIG. 32, where the roundtrip losses at the fundamental wavelength are 0.5% and roundtrip losses at the Raman/Stokes wavelength are 1.5%.
Figure 34:
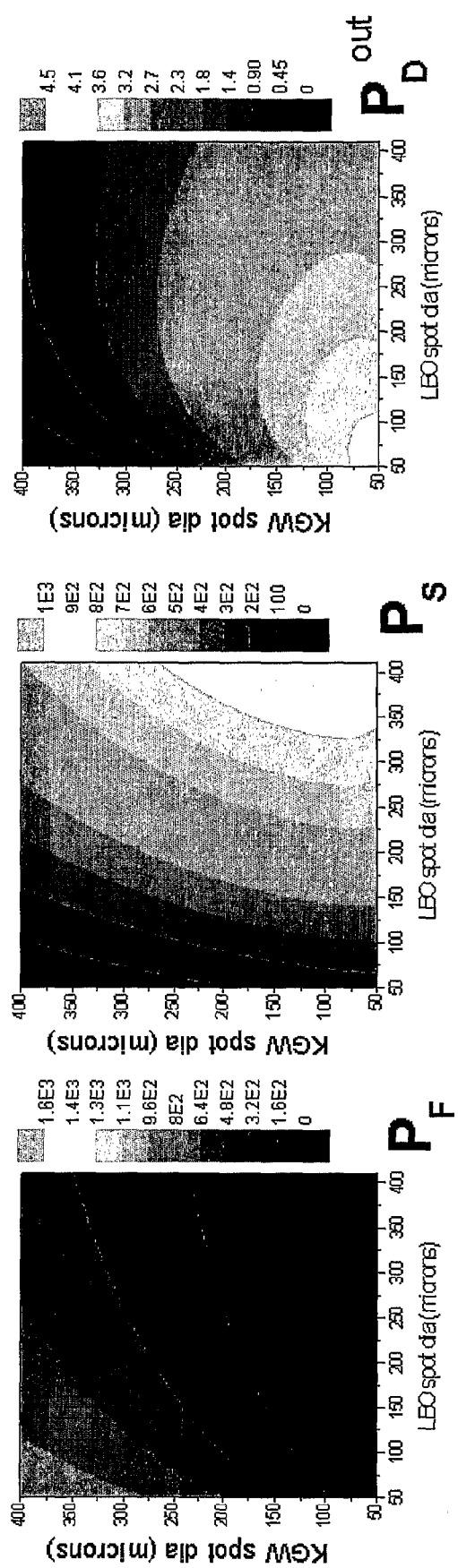
FIG. 34 is a collection of three contour plots similar to those of FIG. 32, where the roundtrip losses at the fundamental wavelength are 1.5% and roundtrip losses at the Raman/Stokes wavelength are 0.5%.
Figure 35:
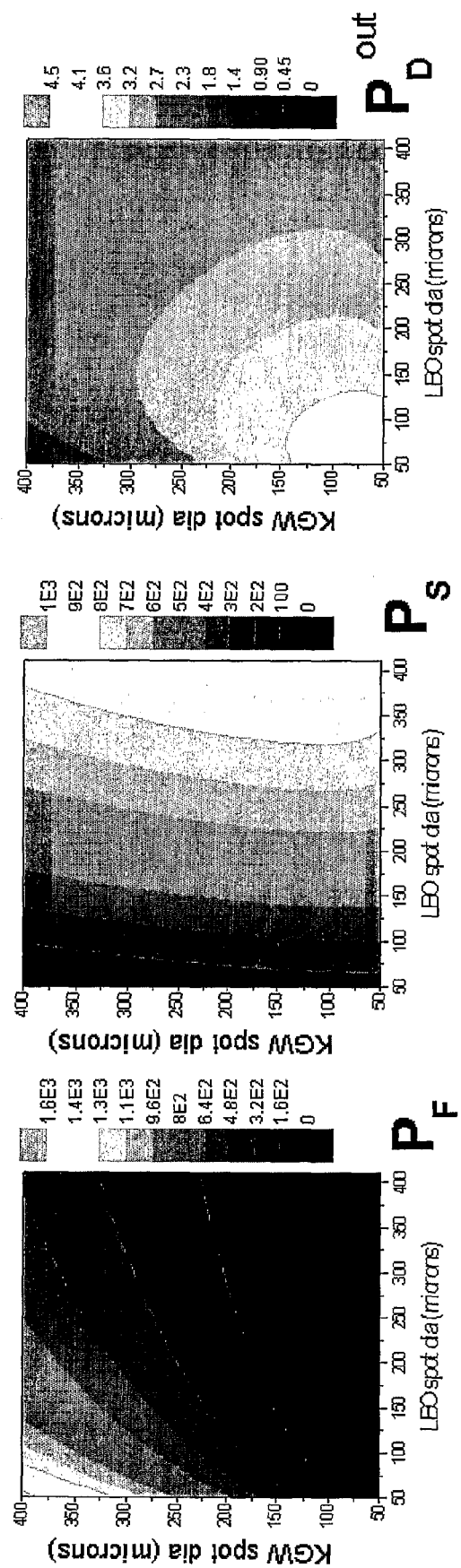
FIG. 35 is a collection of three contour plots similar to those of FIG. 32, where the roundtrip losses at the fundamental wavelength are 0.5% and roundtrip losses at the Raman/Stokes wavelength are 0.5%.

The effect of varying the intracavity roundtrip (RT) losses (i.e. the cavity finesse or Q factor) of the resonator cavity can be seen in FIGS. 32 to 35 as a function of the resonator mode (spot) sizes in both the Raman and the nonlinear materials. FIGS. 32 to 35 each include three contour plots respectively showing the intracavity circulating power at the fundamental wavelength ($P_F$), the intracavity circulating power at the Stokes (Raman shifted fundamental) wavelength ($P_S$), and the output power at the frequency converted (doubled) wavelength ($P_D^{out}$) in the visible. These plots have been calculated using the above-described modelling for a three crystal CW Raman laser with a KGW Raman-active material and an LBO nonlinear frequency doubling crystal for generation of output radiation in the yellow region of the optical spectrum (580-595 nm). The contour plots of FIG. 32 are calculated for roundtrip losses at the fundamental wavelength of 1.5% and roundtrip losses at the Raman/Stokes wavelength of 1.5%. The contour plots of FIG. 33 are calculated for roundtrip losses at the fundamental wavelength of 0.5% and roundtrip losses at the Raman/Stokes wavelength of 1.5%. The contour plots of FIG. 34 are calculated for roundtrip losses at the fundamental wavelength of 1.5% and roundtrip losses at the Raman/Stokes wavelength of 0.5%. The contour plots of FIG. 35 are calculated for roundtrip losses at the fundamental wavelength of 0.5% and roundtrip losses at the Raman/Stokes wavelength of 0.5%.

The key points that can be derived from FIGS. 32 to 35 are that:

It is important to reduce the cavity roundtrip losses at both the fundamental and the Raman wavelengths i.e. increase the resonator finesse at these wavelengths—for 250 µm diameter spots in the Raman and nonlinear doubling crystals the yellow output is about 0.7 W for 1.5% RT losses, compared with about 2.7 W for 0.5% RT losses.

For mid range spot sizes (say 200 μm) with 1.5% RT losses, the fundamental laser is already operating quite efficiently (65%) while the doubling efficiency is running at just 35%. For smaller spot sizes (say 100 μm) the fundamental laser is at 90%, with the doubling efficiency still only 50%.

Decreasing the fundamental losses (i.e. increasing the finesse at the fundamental wavelength) tends to increase the efficiency of the fundamental laser, also increasing the doubling efficiency if the stokes field is enhanced. For the smaller spot sizes in the Raman crystal (KGW), the fundamental laser is already operating very efficiently and so the decrease in RT losses has very little effect. For larger spot sizes in the Raman crystal for which the fundamental laser was under-output coupled, there is an increase in the fundamental laser efficiency and this in turn enhances the stokes field and increases the doubling efficiency. So, the effect of the reduction in fundamental losses (increase in resonator finesse) is to stretch the overall efficiency graph out to larger spot sizes in the Raman material, but it does not raise the overall level.

There is much more to be gained by increasing the doubling efficiency. This cannot be achieved by decreasing the spot size in the nonlinear doubling crystal (LBO) too much since that just unbalances the couplings and reduces the efficiency of the fundamental laser. Instead, the coupling efficiency of the doubling process is increased in a way which also increases the Raman coupling so that the two stay in good balance. This is exactly what is achieved by decreasing the RT losses at the stokes wavelength. The stokes field is greatly enhanced, strongly increasing both the doubling and Raman processes, raising the doubling efficiency while maintaining high efficiency operation of the fundamental laser.

Figure 36:
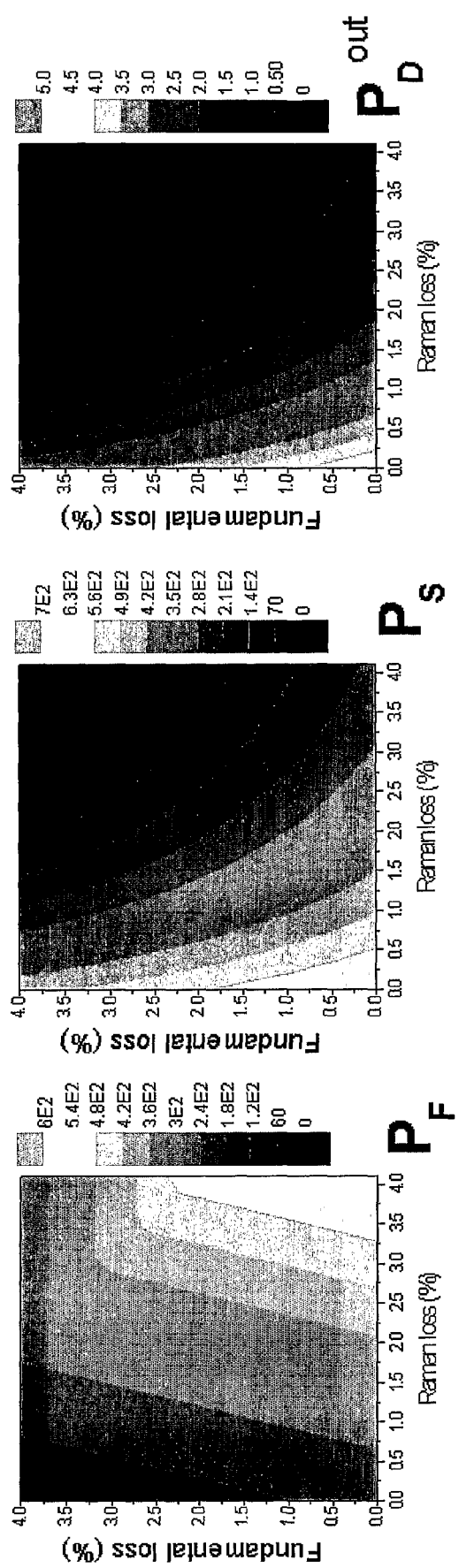
FIG. 36 is a collection of three contour plots respectively showing the intracavity circulating power at the fundamental wavelength ($P_F$), the intracavity circulating power at the Stokes (Raman shifted fundamental) wavelength ($P_S$), and the output power at the frequency converted (doubled) wavelength ($P_D^{out}$), each as a function of the roundtrip resonator losses at the Raman and fundamental wavelengths at 15 W of pump power and for spot sizes in the Raman and nonlinear materials (KGW and LBNO respectively) of 200 μm.
Figure 37A:
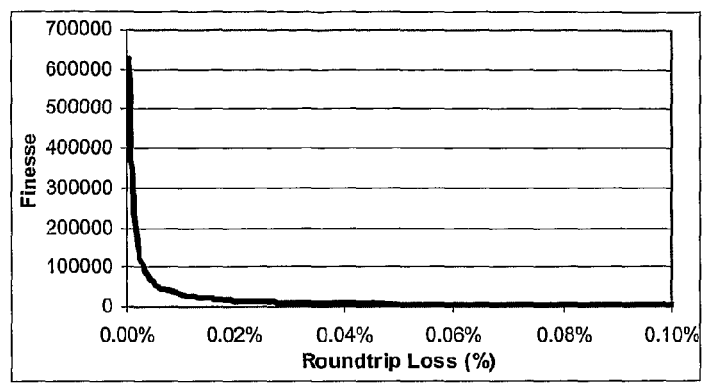
FIGS. 37A to 37D are graphs showing the resonator finesse as a function of roundtrip resonator losses.
Figure 37B:
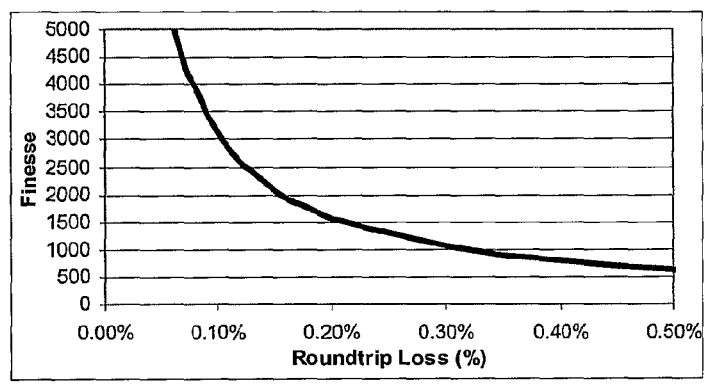
Figure 37C:
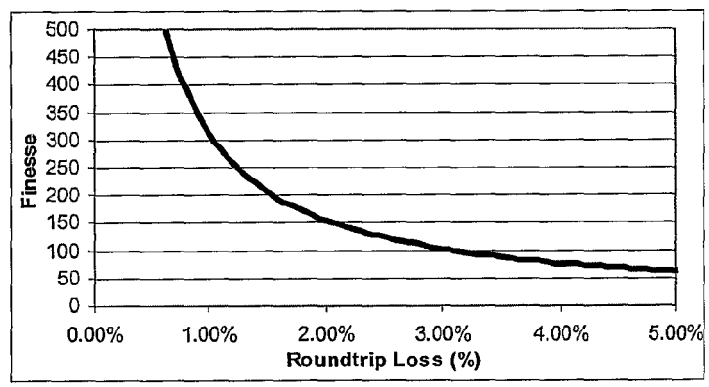
Figure 37D:
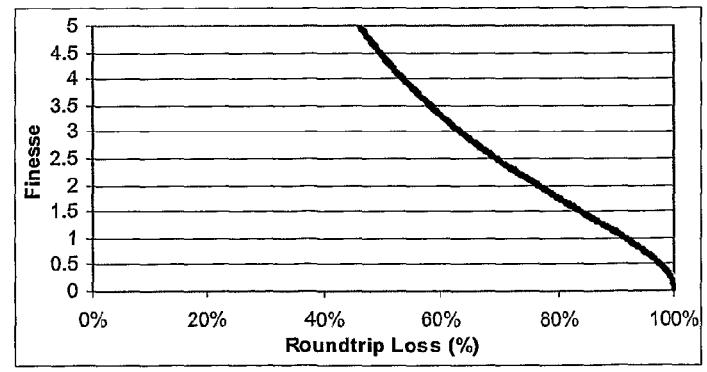

The modelling above can also be used to generate contour plots such as those shone in FIG. 36 showing the intracavity circulating power at the fundamental wavelength ($P_F$), the intracavity circulating power at the Stokes (Raman shifted fundamental) wavelength ($P_S$), and the output power at the frequency converted (doubled) wavelength ($P_D^{out}$) in the visible, all as a function of the total roundtrip losses (i.e. the resonator finesse) at the fundamental and the Raman wavelengths.

Knowing the intensities which are required for SRS and SHG, the resonator mirror curvatures and their separation may be selected, and the crystals positioned in the resonator, so that the intensity of the fundamental beam in the Raman crystal and the intensity of the Raman beam inside the doubling crystal both exceed the theoretically-determined required intensities. In practice, this step involves arranging the resonator such that the resonator mode sizes in the crystals are sufficiently small. Nominal mode sizes for the resonator modes in each of the Raman and the nonlinear crystals may be determined using the modelling process described above and by generating figures such as FIG. 23-26 or 30-34.

This can be done empirically, or by carrying out an ABCD resonator analysis to predict the mode sizes. For the latter, it is necessary to determine (by calculation or experiment) the focal length of the thermal lens formed in the laser and Raman crystals. LASCAD is commercially-available software for performing such an ABCD analysis of the resonator.

CLOSING COMMENTS

In accordance with the disclosures above, the inventors consider that higher output powers at yellow wavelengths, and improved temporal stability of the laser may be achieved. Arrangements of the present laser systems have application in ophthalmic laser products, and as low power lasers for biomedicine, instrumentation and visual display applications. Further arrangements of the present laser systems may also have application as a yellow laser pointer for general use.

It will be appreciated that the methods/apparatus/devices/systems described/illustrated above at least substantially provide a continuous wave Raman laser providing output in the visible region of the optical spectrum The laser arrangements, devices, systems, and methods described herein, and/or shown in the drawings, are presented by way of example only and are not limiting as to the scope of the invention. Unless otherwise specifically stated, individual aspects and components of the laser arrangements, devices, systems, and methods may be modified, or may have been substituted therefore known equivalents, or as yet unknown substitutes such as may be developed in the future or such as may be found to be acceptable substitutes in the future. The laser arrangements, devices, systems, and methods may also be modified for a variety of applications while remaining within the scope and spirit of the claimed invention, since the range of potential applications is great, and since it is intended that the present laser arrangements, devices, systems, and methods be adaptable to many such variations.

The invention claimed is:

1. A continuous wave laser comprising:
   a resonator cavity;
   at least a first reflector and a second reflector said first and second reflectors being located at opposite ends of the resonator cavity;
   a laser gain medium located in the resonator cavity for generating a continuous wave fundamental beam which resonates within the resonator cavity when pumped by a pump beam from a pump source external to the resonator cavity;
   a solid Raman-active medium positioned in the resonator cavity for Raman shifting the fundamental beam to produce a continuous wave Raman beam which resonates within the resonator cavity;
   a non-linear medium positioned in the resonator cavity for frequency converting the continuous wave Raman beam to a converted wavelength to produce a continuous wave converted beam;
   wherein the resonator cavity is a high finesse resonator cavity at the wavelength of the continuous wave fundamental beam and the Raman beam and a low finesse resonator cavity at the wavelength of the continuous wave converted beam.

2. A continuous wave laser as claimed in claim 1 wherein, in operation, the intracavity intensity of the continuous wave fundamental beam in the solid Raman-active medium is greater than 80 kW/cm² and the intracavity intensity of the continuous wave Raman beam in the nonlinear material is greater than 80 kW/cm².

3. A continuous wave laser as claimed in claim 2 wherein the reflectivity of both the first and second reflectors at the wavelength of both the fundamental and Raman beams is in the range of 99.95% to 99.999%.

4. A continuous wave laser as claimed in claim 1 further comprising an output coupler configured for output of the converted beam from the resonator cavity.

5. A continuous wave laser as claimed in claim 4 wherein either the first or the second reflectors is the output coupler.

6. A continuous wave laser as claimed in claim 1 wherein:
the laser gain medium, the Raman-active medium and the nonlinear medium are each plane-parallel solid state materials;
the resonator cavity has a resonator axis along which the fundamental and Raman beams propagate within the cavity in a respective cavity mode along the resonator axis, the plane-parallel surfaces of the plane-parallel solid state Raman material lying on the resonator axis such that the angular offset of the normal to each of the plane-parallel surfaces of the Raman crystal with the resonator axis is in the range of about 0 to 1 degree; and
the plane-parallel surfaces are aligned to be substantially perpendicular to the resonator axis such that any optical reflections of the fundamental and the Raman beams from the plane-parallel surfaces of the Raman crystal are reflected into the respective cavity mode and continue to propagate within the resonator cavity.

7. A continuous wave laser as claimed in claim 1 wherein the round trip losses of the resonator cavity at both the fundamental and the Raman wavelengths is in the range of 0.001% to 2%.

8. A continuous wave laser as claimed in claim 1 wherein the laser gain medium and the Raman-active medium are each selected from the group of $YVO_4$, $GdVO_4$, $BaWO_4$ or KGW and the laser gain medium is doped with an active dopant ion.

9. A continuous wave laser as claimed in claim 1 wherein the laser medium and the Raman-active medium are provided in a Raman-active gain medium which generates both the continuous wave fundamental beam and the continuous wave Raman beam.

10. A continuous wave laser as claimed in claim 1 further comprising a tuner for tuning the non-linear medium to enable switching between frequency doubling the Raman beam, frequency doubling the fundamental beam and sum frequency mixing of the fundamental and Raman wavelengths.

11. A continuous wave laser as claimed in claim 1 further comprising more than one non-linear medium and more than one tuners for tuning the non-linear media to enable switching between frequency doubling the Raman beam, frequency doubling the fundamental beam and sum frequency mixing of the fundamental and Raman wavelengths.

12. A continuous wave laser as claimed in claim 1 further comprising a third reflector located in the resonator cavity, the gain material and the Raman material are located intermediate the first and the third reflectors and the nonlinear material is located intermediate the third and the second reflectors, wherein the third reflector is configured for high reflectivity at the optical wavelengths of both the fundamental beam and the Raman beam, and the third reflector is also configured for high transmission of the wavelength of the frequency converted beam.

13. A continuous wave laser as claimed in any one of claims 1 to 11 further comprising a third reflector located in the resonator cavity, wherein the gain material and the Raman material are located intermediate the first and the third reflectors and the nonlinear material is located intermediate the third and the second reflectors, wherein the third reflector is configured for high transmission at the optical wavelengths of both the fundamental beam and the Raman beam, and the third reflector is also configured for high reflectivity of the wavelength of the frequency converted beam.

14. A continuous wave laser as claimed in any one of claims 1 to 11 wherein the resonator cavity has a resonator mode and the laser further comprises a third and a fourth reflector each located in the resonator cavity, wherein the laser gain medium is located intermediate the third and fourth reflectors, the Raman-active medium is located intermediate the first and third reflectors and the nonlinear medium is located intermediate the fourth and second reflectors such that the resonator mode size is independently configurable in each of the laser gain medium, the Raman-active medium and the nonlinear medium.

15. A continuous wave laser as claimed in claim 12 wherein the second reflector is an output coupler configured to output the frequency converted beam from the resonator cavity.

16. A continuous wave laser as claimed in claim 13 wherein the third reflector is an output coupler configured to output the frequency converted beam from the resonator cavity.

17. A continuous wave laser as claimed claim 1 wherein the first and second reflectors, the laser gain medium, the Raman-active medium, and the nonlinear medium elements are each positioned such that the separation between selected adjacent elements is in the range from 0.1 and 2 mm.

18. A continuous wave laser as claimed in claim 1 wherein the continuous wave converted beam has a wavelength in the range of 550 to 600 nm.

19. A method for producing continuous wave laser output, said method comprising
providing a resonator cavity comprising at least first and second reflectors each located at opposite ends of the resonator cavity;
optically pumping a laser gain medium located in the resonator cavity with a pump source located external to the resonator cavity thereby generating a continuous wave fundamental beam which resonates within the resonator cavity;
Raman shifting the fundamental beam with a solid Raman-active medium positioned in the resonator cavity to produce a continuous wave Raman beam which resonates within the resonator cavity;
frequency converting the continuous wave Raman beam to a converted wavelength with a non-linear medium positioned in the resonator cavity to produce a continuous wave converted beam;
wherein the resonator cavity is a high finesse resonator cavity at the wavelength of the continuous wave fundamental beam and the Raman beam and a low finesse resonator cavity at the wavelength of the continuous wave converted beam; and
outputting the continuous wave converted beam from the resonator cavity to provide a continuous wave laser output.

20. A method as claimed in either claim 19, wherein reflectivity of both the first and second reflectors at both the first and second optical wavelengths is in the range from 99.5% to 99.99%.

* * * * *